United States Patent
Xing

(10) Patent No.: US 10,813,045 B2
(45) Date of Patent: Oct. 20, 2020

(54) ACCESS CONTROLLER, STATION, ACCESS POINT, AND CONTROL METHOD

(71) Applicant: Huawei Technologies Co., Ltd., Shenzhen, Guangdong (CN)

(72) Inventor: Zhihao Xing, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 129 days.

(21) Appl. No.: 15/442,553

(22) Filed: Feb. 24, 2017

(65) Prior Publication Data

US 2017/0171811 A1    Jun. 15, 2017

Related U.S. Application Data

(63) Continuation of application No. PCT/CN2014/085333, filed on Aug. 27, 2014.

(51) Int. Cl.
*H04W 52/02* (2009.01)
*H04W 48/12* (2009.01)
(Continued)

(52) U.S. Cl.
CPC ... *H04W 52/0206* (2013.01); *H04W 28/0221* (2013.01); *H04W 48/06* (2013.01);
(Continued)

(58) Field of Classification Search
CPC .......... H04W 52/0206; H04W 72/048; H04W 72/085; H04W 48/06; H04W 28/0221
See application file for complete search history.

(56) References Cited

U.S. PATENT DOCUMENTS 6,584,330 B1 * 6/2003 Ruuska ............ H04W 52/0206
                                                           455/574
7,603,146 B2    10/2009 Benveniste
(Continued)

FOREIGN PATENT DOCUMENTS

CN         101541068 A    9/2009
CN         101557414 A    10/2009
(Continued)

OTHER PUBLICATIONS

Luo Chao, Study of Fast Handoff Mechanism Based on AP in WLAN. China Excellent Masters Thesis Full-text Database, Feb. 2012. total 70 pages. With English abstract.

*Primary Examiner* — Andrew Lai
*Assistant Examiner* — Sumitra Ganguly
(74) *Attorney, Agent, or Firm* — Kilpatrick Townsend & Stockton LLP

(57) ABSTRACT

Embodiments of the present invention relate to the communications field, and disclose an AC, a STA, an AP, and a control method to solve a problem that a STA located in a coverage hole area of a Wi-Fi network cannot access the Wi-Fi network. A specific solution is: a receiving unit receives an access request message sent by a STA; a determining unit determines, sleeping APs managed by the AC and having access ranges covering the STA as first candidate APs; an allocation unit allocates the first candidate AP to the STA as a target AP; and a sending unit sends a wake-up control message to the target AP, and sends an access permission message to the STA. The present invention is used in a control process.

9 Claims, 19 Drawing Sheets

(51) Int. Cl.
*H04W 28/02* (2009.01)
*H04W 48/06* (2009.01)
*H04W 72/04* (2009.01)
*H04W 72/08* (2009.01)
*H04W 84/02* (2009.01)

(52) U.S. Cl.
CPC ......... *H04W 48/12* (2013.01); *H04W 72/048* (2013.01); *H04W 72/085* (2013.01); *H04W 84/02* (2013.01); *Y02D 70/142* (2018.01)

(56) References Cited

U.S. PATENT DOCUMENTS

| | | | | |
|---|---|---|---|---|
| 2008/0137621 A1* | 6/2008 | Bheda | ................ | H04W 24/04 370/338 |
| 2008/0152034 A1* | 6/2008 | Liu | ................ | H04W 48/16 375/295 |
| 2010/0003981 A1* | 1/2010 | Ahluwalia | ................ | H04W 36/02 455/436 |
| 2010/0177717 A1* | 7/2010 | Sung | ................ | H04W 72/042 370/329 |
| 2012/0028674 A1* | 2/2012 | Zhao | ................ | H04W 52/0235 455/522 |
| 2012/0236826 A1* | 9/2012 | Roy | ................ | H04W 36/0061 370/331 |
| 2014/0242991 A1* | 8/2014 | Yanover | ................ | H04W 36/22 455/436 |
| 2014/0269499 A1* | 9/2014 | Pang | ................ | H04W 36/0033 370/328 |
| 2014/0349647 A1* | 11/2014 | Chen | ................ | H04W 36/30 455/436 |
| 2015/0043563 A1* | 2/2015 | Guan | ................ | H04W 48/16 370/338 |
| 2015/0358909 A1* | 12/2015 | Lee | ................ | H04W 76/27 370/329 |

FOREIGN PATENT DOCUMENTS

| | | |
|---|---|---|
| CN | 101801051 A | 8/2010 |
| CN | 103068019 A | 4/2013 |
| CN | 103379586 A | 10/2013 |
| CN | 103916816 A | 7/2014 |
| WO | 2013022213 A1 | 2/2013 |

* cited by examiner

# ACCESS CONTROLLER, STATION, ACCESS POINT, AND CONTROL METHOD

CROSS-REFERENCE TO RELATED APPLICATIONS

This application is a continuation of International Application No. PCT/CN2014/085333, filed on Aug. 27, 2014, the disclosure of which is hereby incorporated by reference in its entirety.

TECHNICAL FIELD

The present invention relates to the communications field, and in particular, to an access controller (AC), a station (STA), an access point (AP), and a control method.

BACKGROUND

Currently, Wireless Fidelity (Wi-Fi) generally uses a networking mode with an infrastructure basic service set (Infrastructure BSS) to access the Internet. One access point (AP) and several stations (STA) exist in this networking mode. To provide wider Wi-Fi coverage, a Wi-Fi network may include multiple Infrastructure BSSs, that is, multiple APs exist in the Wi-Fi network. In addition, to implement centralized management for multiple APs, an access controller (AC) is introduced in the Wi-Fi network.

When an STA needs to access Wi-Fi by using an AP, to ensure that the STA can discover the AP, or to enable the AP to respond to an access request of the STA in time, the AP needs to always maintain an active state even if no STA is associated. Therefore, utilization of the AP is low, and network resources are wasted severely. To solve the problem of low utilization of the AP, the prior art provides two solutions. In the prior art 1, a sleep condition and a wake-up condition are preset on the AC. When the AP meets the sleep condition, the AC controls the AP to enter a sleep state. When the AP meets the wake-up condition, the AC controls the AP to switch from the sleep state to the active state. The sleep condition is that a preset sleep time arrives or that a time within which no STA is associated with the AP exceeds a threshold. The wake-up condition is that a preset wake-up time arrives or that other active APs find that their load exceeds a preset threshold. In the prior art 2, two operation modes, which are respectively an intensive coverage mode and a weak coverage mode, are predefined on the AC for the Wi-Fi network, and an operation mode of the Wi-Fi network is controlled by monitoring load of the Wi-Fi network. When the operation mode of the Wi-Fi network switches from the intensive coverage mode to the weak coverage mode, the AC controls a proportion of APs to enter the sleep state; when the operation mode of the Wi-Fi network switches from the weak coverage mode to the intensive coverage mode, the AC controls a certain proportion of APs to switch from the sleep state to the active state, where the load of the Wi-Fi network refers to a quantity of STAs associated with the certain proportion of APs or average traffic of the certain proportion of APs.

The following problem exists in the process of controlling the AP to sleep and wake up: In the Wi-Fi network, after a part of APs enter the sleep state, a coverage hole may occur in an original coverage area of the Wi-Fi network, and therefore, a STA located in the coverage hole area cannot access the Wi-Fi network.

SUMMARY

The present invention provides an AC, an STA, an AP, and a control method to solve a problem that an STA located in a coverage hole area of a Wi-Fi network cannot access the Wi-Fi network.

To achieve the foregoing objective, the following technical solutions are used in the present invention:

A first aspect of the present invention provides an access controller AC, including a receiving unit, a determining unit, an allocation unit, and a sending unit, where the receiving unit is configured to receive an access request message sent by a station STA;

the determining unit is configured to determine, according to location information of the STA stored by the AC or carried in the access request message received by the receiving unit, sleeping APs managed by the AC and having access ranges covering the STA as first candidate APs;

the allocation unit is configured to allocate the first candidate AP to the STA as a target AP if a quantity of the first candidate APs determined by the determining unit is 1, or allocate, to the STA, a first candidate AP closest to the STA as a target AP if a quantity of the first candidate APs is greater than 1; and the sending unit is configured to send a wake-up control message to the target AP, where the wake-up control message is used to cause the target AP to enter an active state; and send an access permission message to the STA, where the access permission message includes information about the target AP, and the access permission message is used for the STA to associate with the target AP according to the information about the target AP.

With reference to the first aspect of the present invention, in a first possible implementation manner, the access request message further includes quality of service QoS requirement information of the STA, where the QoS requirement information of the STA includes an average communication rate expected by the STA; and the AC further includes a selection unit, where the selection unit is configured to select, after the determining unit determines, according to the location information of the STA stored by the AC or carried in the access request message, the sleeping APs managed by the AC and having access ranges covering the STA as the first candidate APs, a first candidate AP that meets the following condition:

a preset upper threshold for an average throughput of the first candidate AP is greater than or equal to the average communication rate expected by the STA.

With reference to the first aspect of the present invention or the first possible implementation manner of the first aspect, in a second possible implementation manner, the access permission message further includes a special value, where the special value indicates that, in a current location of the STA, the STA can associate with the target AP.

With reference to any one of the first aspect of the present invention to the second possible implementation manner of the first aspect, in a third possible implementation manner, if the quantity of the first candidate APs is 0, the AC further includes a calculation unit; where the determining unit is further configured to determine second candidate APs, where the second candidate APs include all or a part of APs that are managed by the AC and whose distances from the STA are within a preset range;

the calculation unit is configured to calculate suitability of each second candidate AP according to location information of each second candidate AP, load information of each second candidate AP, and the QoS requirement information of the STA; and the allocation unit is further configured to allocate, to the STA, a second candidate AP with highest suitability as a target AP.

With reference to the third possible implementation manner of the first aspect, in a fourth possible implementation manner, the selection unit is further configured to select, before the calculation unit calculates the suitability of each second candidate AP, a second candidate AP that meets at least one of the following conditions:

a preset upper threshold for an average throughput of the second candidate AP is greater than or equal to a sum of a current average throughput of the second candidate AP and the average communication rate expected by the STA; or a current average channel access delay of the second candidate AP is shorter than an average channel access delay expected by the STA.

With reference to any one of the first aspect of the present invention to the fourth possible implementation manner of the first aspect, in a fifth possible implementation manner, the information about the target AP includes a basic service set identifier BSSID of the target AP, a Media Access Control MAC address of the target AP, and location information of the target AP.

A second aspect of the present invention provides an access controller AC, including a receiving unit, an allocation unit, and a sending unit, where the receiving unit is configured to receive a load notification message sent by an AP, where the load notification message includes information about communication load between the AP and first stations STAs, where the first STAs are STAs currently associated with the AP;

the allocation unit is configured to allocate at least one target AP to each first STA if the AC determines, according to the information about the communication load, that the AP meets a sleep trigger condition; and the sending unit is configured to send an offload control message to the AP, where the offload control message includes information about the target AP allocated by the AC to the first STA, and the offload control message is used for the first STA to associate with the target AP according to the information about the target AP; and after a preset time, send a sleep control message to the AP, where the sleep control message is used to cause the AP to enter a sleep state.

With reference to the second aspect of the present invention, in a first possible implementation manner, the allocation unit includes a first determining module and a second determining module; or the allocation unit includes a first determining module, a calculation module, and an allocation module; where the first determining module is configured to determine that all active APs managed by the AC and having access ranges covering at least one of the first STAs, except the AP, are candidate APs; and if a quantity of the candidate APs determined by the first determining module is 1, the second determining module is configured to determine that the candidate AP is a target AP for all the first STAs; or if a quantity of the candidate APs determined by the first determining module is greater than 1, the calculation module is configured to calculate suitability of each candidate AP according to location information of each candidate AP, load information of each candidate AP, and quality of service QoS requirement information of one of the first STAs; and the allocation module is configured to allocate, to a corresponding first STA, a candidate AP with highest suitability as a target AP.

With reference to the first possible implementation manner of the second aspect of the present invention, in a second possible implementation manner, the QoS requirement information of the first STA includes at least one of an average communication rate expected by the first STA or an average access delay expected by the first STA; and the allocation unit further includes a selection module; where the selection module is configured to select, before the calculation module calculates the suitability of each candidate AP, the candidate AP that meets at least one of the following conditions:

a preset upper threshold for an average throughput of the candidate AP is greater than or equal to a sum of a current average throughput of the candidate AP, a Sum, and an average communication rate expected by the corresponding first STA, where the Sum is a sum of average communication rates expected by all first STAs preassociated with the candidate AP; or a current average channel access delay of the candidate AP is shorter than an average channel access delay expected by the first STA.

With reference to the first possible implementation manner or the second possible implementation manner of the second aspect of the present invention, in a third possible implementation manner, the suitability of the candidate AP is inversely proportional to a distance between the candidate AP and the corresponding first STA; and the suitability of the candidate AP is inversely proportional to load of the candidate AP.

With reference to the second aspect of the present invention to the third possible implementation manner of the second aspect, in a fourth possible implementation manner, the sleep trigger condition is that an average throughput of the AP within a preset time is less than a preset lower threshold for the average throughput of the AP.

A third aspect of the present invention provides an access controller AC, including a receiving unit, a calculation unit, an allocation unit, and a sending unit, where the receiving unit is configured to receive an access request message sent by a station STA, where the access request message includes associable APs scanned by the STA;

the calculation unit is configured to calculate suitability of each associable AP according to location information of each associable AP, load information of each associable AP, and quality of service QoS requirement information of the STA;

the allocation unit is configured to allocate, to the STA, an associable AP with highest suitability as a target AP; and the sending unit is configured to send an access permission message to the STA, where the access permission message includes information about the target AP, and the access permission message is used for the STA to associate with the target AP according to the information about the target AP.

With reference to the third aspect of the present invention, in a first possible implementation manner, the QoS requirement information of the STA includes at least one of an average communication rate expected by the STA or an average access delay expected by the STA; and the AC further includes a selection unit, where the selection unit is configured to select, before the calculation unit calculates the suitability of each associable AP, an associable AP that meets at least one of the following conditions:

a preset upper threshold for an average throughput of the associable AP is greater than or equal to a sum of a current average throughput of the associable AP and the average communication rate expected by the STA; or a current average channel access delay of the associable AP is shorter than an average channel access delay expected by the STA.

With reference to the third aspect of the present invention or the first possible implementation manner of the third aspect, in a second possible implementation manner, the access permission message further includes a special value, where the special value indicates that, in a current location of the STA, the STA can associate with the target AP.

With reference to any one of the third aspect of the present invention to the second possible implementation manner of the third aspect, in a third possible implementation manner, the information about the target AP includes a basic service set identifier BSSID of the target AP, a Media Access Control MAC address of the target AP, and location information of the target AP.

A fourth aspect of the present invention provides an access controller AC, including a receiving unit, a determining unit, a first allocation unit, and a sending unit, where the receiving unit is configured to receive a load notification message sent by an access point AP, where the load notification message includes information about communication load between the AP and first stations STAs, where the first STAs are STAs currently associated with the AP;

the determining unit is configured to determine, according to the information about the communication load received by the receiving unit, that the AP meets an overload trigger condition;

the first allocation unit is configured to allocate a first target AP in active APs to the first STAs one by one according to a preset order; and the sending unit is configured to send an offload control message to the AP, where the offload control message includes information about the first target AP, and the offload control message is used for the AP to notify the corresponding first STA to associate with the first target AP according to the information about the first target AP.

With reference to the fourth aspect of the present invention, in a first possible implementation manner, the preset order is a descending order of distances from the first STAs to the AP.

With reference to the fourth aspect of the present invention or the first possible implementation manner of the fourth aspect, in a second possible implementation manner, the AC further includes a judging unit and a processing unit, where the judging unit is configured to determine, after the first allocation unit allocates a first target AP in the active APs to a current first STA and the sending unit sends an offload control message to the AP, whether the AP still meets the overload trigger condition; and if yes, the first allocation unit is further configured to continue to allocate a first target AP in the active APs to a next first STA; or if no, the processing unit is configured to stop allocating a first target AP to the first STAs; where the first allocation unit includes a determining module and a first allocation module, where the determining module is configured to determine candidate APs corresponding to the current first STA, where the candidate APs include all active APs managed by the AC and having access ranges covering the current first STA, except the AP; and the first allocation module is configured to allocate, to the current first STA, a candidate AP meeting a preset condition as a first target AP.

With reference to the second possible implementation manner of the fourth aspect of the present invention, in a third possible implementation manner, the first allocation module is specifically configured to allocate, to the current first STA, a candidate AP meeting at least one of the following preset conditions as a first target AP:

a preset upper threshold for an average throughput of the candidate AP is greater than or equal to a sum of a current average throughput of the candidate AP and an average communication rate expected by the current first STA; or a current average channel access delay of the candidate AP is shorter than or equal to an average channel access delay expected by the current first STA.

With reference to any one of the fourth aspect of the present invention to the third possible implementation manner of the fourth aspect, in a fourth possible implementation manner, the AC further includes a second allocation unit, where if the first allocation unit does not successfully allocate a first target AP in the active APs to all or a part of the first STAs, and the judging unit determines that the AP still meets the overload trigger condition, the second allocation unit is configured to allocate a second target AP in sleeping APs to at least one second STA, where the second STA is a first STA that is not successfully associated with a first target AP, and the second STA is a second STA that can be offloaded to the second target AP;

the judging unit is further configured to determine, after the second allocation unit allocates the second target AP to the at least one second STA and the sending unit sends an offload control message to the AP, whether the AP still meets the overload trigger condition; and if yes, the second allocation unit is further configured to continue to allocate a second target AP to other second STAs; or if no, the processing unit is further configured to stop allocating a second target AP to the second STAs.

With reference to the fourth possible implementation manner of the fourth aspect of the present invention, in a fifth possible implementation manner, the second allocation unit includes a calculation module, a second allocation module, and a sending module, where the calculation module is configured to calculate suitability of each sleeping AP;

the second allocation module is configured to allocate, to the at least one second STA, a sleeping AP with highest suitability as a second target AP; and the sending module is configured to send a wake-up control message to the currently allocated second target AP, where the wake-up control message is used to cause the currently allocated second target AP to enter an active state; and send an offload control message to the AP, where the offload control message includes information about the currently allocated second target AP, and the offload control message is used for the AP to notify the at least one second STA to associate with the currently allocated second target AP according to the information about the currently allocated second target AP.

With reference to the fifth possible implementation manner of the fourth aspect of the present invention, in a sixth possible implementation manner, the suitability of the sleeping AP is proportional to offloadable traffic after the sleeping AP enters the active state, and the suitability of the sleeping AP is proportional to integrated communication quality between the sleeping AP and the at least one second STA.

With reference to the sixth possible implementation manner of the fourth aspect of the present invention, in a seventh possible implementation manner, that the suitability of the sleeping AP is proportional to offloadable traffic after the sleeping AP enters the active state, and the suitability of the sleeping AP is proportional to integrated communication quality between the sleeping AP and the at least one second STA includes:

offloadable traffic after an $AP_i$ enters the $$\text{active state} = \sum_{STA \in \{Set\_Pending \cap Set\_Coverage(AP_i)\}}$$

average communication rate expected by the second STA; and integrated communication quality between the $AP_i$ and the second $$STA = \sum_{STA \in \{Set\_Pending \cap Set\_Coverage(AP_i)\}} \frac{1}{Dist(AP_i, STA)^n};$$

where the APi is one of the sleeping APs, the Set_Pending is a set of the second STAs, and the Set_Coverage(APi) is a set of STAs covered by an access range of the APi.

With reference to any one of the fourth aspect of the present invention to the seventh possible implementation manner of the fourth aspect, in an eighth possible implementation manner, the overload trigger condition is at least one of the following:

an average throughput of the AP within a preset time is greater than a preset upper threshold for the average throughput of the AP; or an average channel access delay of the AP is greater than a preset delay threshold.

A fifth aspect of the present invention provides a station STA, including a sending unit, a receiving unit, and an association unit, where the sending unit is configured to send an access request message to an access controller AC;

the receiving unit is configured to receive an access permission message sent by the AC, where the access permission message includes information about a target AP, and the target AP is determined by the AC according to location information of the STA stored by the AC or carried in the access request message, from sleeping APs managed by the AC and having access ranges covering the STA, or the target AP is determined by the AC from all or a part of APs managed by the AC, and the part of APs include APs whose distances from the STA are within a preset range; and the association unit is configured to associate with the target AP according to the information about the target AP received by the receiving unit.

With reference to the fifth aspect of the present invention, in a first possible implementation manner, the access request message further includes quality of service QoS requirement information of the STA, where the QoS requirement information of the STA includes an average communication rate expected by the STA.

With reference to the fifth aspect of the present invention or the first possible implementation manner of the fifth aspect, in a second possible implementation manner, the access permission message further includes a special value, where the special value indicates that, in a current location of the STA, the STA can associate with the target AP.

With reference to the fifth aspect of the present invention to the second possible implementation manner of the fifth aspect, in a third possible implementation manner, the information about the target AP includes a basic service set identifier BSSID of the target AP, a Media Access Control MAC address of the target AP, and location information of the target AP.

A sixth aspect of the present invention provides an access point AP, including a sending unit, a receiving unit, and a processing unit, where the sending unit is configured to send a load notification message to an access controller AC, where the load notification message includes information about communication load between the AP and first stations STAs, where the first STAs are STAs currently associated with the AP;

the receiving unit is configured to receive an offload control message sent by the AC, where the offload control message is sent after the AC determines, according to the information about the communication load, that the AP meets a sleep trigger condition, and the offload control message includes information about a target AP allocated by the AC to the first STA;

the sending unit is further configured to send a reassociation notification message to the first STA, where the reassociation notification message includes the information about the target AP, and the reassociation notification message is used to notify the first STA to associate with the target AP according to the information about the target AP; and send an offload control response message to the AC after a preset time, where the offload control response message includes identity information of a first STA currently associated with the AP;

the receiving unit is further configured to receive a sleep control message sent by the AC, where the sleep control message is sent after the AC determines that the offload control response message does not include identity information of any first STA; and the processing unit is configured to enter a sleep state.

With reference to the sixth aspect of the present invention, in a first possible implementation manner, the sleep trigger condition is that an average throughput of the AP within a preset time is less than a preset lower threshold for the average throughput of the AP.

A seventh aspect of the present invention provides an access point AP, including a sending unit and a receiving unit, where the sending unit is configured to send a load notification message to an access controller AC, where the load notification message includes information about communication load between the AP and first stations STAs, where the first STAs are STAs currently associated with the AP;

the receiving unit is configured to receive an offload control message sent by the AC, where the offload control message is sent after the AC determines, according to the information about the communication load, that the AP meets an overload trigger condition, and the offload control message includes information about a first target AP allocated to the first STA; and the sending unit is further configured to send a reassociation notification message to the first STA, where the reassociation notification message includes the information about the first target AP allocated to the first STA, and the reassociation notification message is used for the first STA to associate with the first target AP according to the information about the first target AP.

With reference to the seventh aspect of the present invention, in a first possible implementation manner, the receiving unit is further configured to receive an offload control message sent by the AC, where the offload control message includes information about a currently allocated second target AP, the offload control message is used for the AP to notify at least one second STA to associate with the currently allocated second target AP according to the information about the currently allocated second target AP, the offload control message is sent after the AC does not successfully allocate a first target AP in active APs to all or a part of the first STAs and the AC determines that the AP still meets the overload trigger condition, and the second STA is a first STA that is not successfully associated with a first target AP.

With reference to the seventh aspect of the present invention or the first possible implementation manner of the seventh aspect, in a second possible implementation manner, the overload trigger condition is at least one of the following:

an average throughput of the AP within a preset me is greater than a preset upper threshold for the average throughput of the AP; or an average channel access delay of the AP is greater than a preset delay threshold.

An eighth aspect of the present invention provides an access point AP wake-up method, including:

receiving, by an access controller AC, an access request message sent by a station STA;

determining, by the AC according to location information of the STA stored by the AC or carried in the access request message, sleeping APs managed by the AC and having access ranges covering the STA as first candidate APs;

if a quantity of the first candidate APs is 1, allocating, by the AC, the first candidate AP to the STA as a target AP, or if a quantity of the first candidate APs is greater than 1, allocating, by the AC, to the STA, a first candidate AP closest to the STA as a target AP;

sending, by the AC, a wake-up control message to the target AP, where the wake-up control message is used to cause the target AP to enter an active state; and sending, by the AC, an access permission message to the STA, where the access permission message includes information about the target AP, and the access permission message is used for the STA to associate with the target AP according to the information about the target AP.

With reference to the eighth aspect of the present invention, in a first possible implementation manner, the access request message further includes quality of service QoS requirement information of the STA, where the QoS requirement information of the STA includes an average communication rate expected by the STA; and after the determining, by the AC according to location information of the STA stored by the AC or carried in the access request message, sleeping APs managed by the AC and having access ranges covering the STA as first candidate APs, the method further includes:

selecting, by the AC, a first candidate AP that meets the following condition:

a preset upper threshold for an average throughput of the first candidate AP is greater than or equal to the average communication rate expected by the STA.

With reference to the eighth aspect of the present invention or the first possible implementation manner of the eighth aspect, in a second possible implementation manner, the access permission message further includes a special value, where the special value indicates that, in a current location of the STA, the STA can associate with the target AP.

With reference to any one of the eighth aspect of the present invention to the second possible implementation manner of the eighth aspect, in a third possible implementation manner, if the quantity of the first candidate APs is 0, the method further includes:

determining, by the AC, second candidate APs, where the second candidate APs include all or a part of APs that are managed by the AC and whose distances from the STA are within a preset range;

calculating, by the AC, suitability of each second candidate AP according to location information of each second candidate AP, load information of each second candidate AP, and the QoS requirement information of the STA; and allocating, by the AC, to the STA, a second candidate AP with highest suitability as a target AP.

With reference to the third possible implementation manner of the eighth aspect of the present invention, in a fourth possible implementation manner, before the calculating, by the AC, suitability of each second candidate AP, the method further includes:

selecting, by the AC, a second candidate AP that meets at least one of the following conditions:

a preset upper threshold for an average throughput of the second candidate AP is greater than or equal to a sum of a current average throughput of the second candidate AP and the average communication rate expected by the STA; or a current average channel access delay of the second candidate AP is shorter than an average channel access delay expected by the STA.

With reference to any one of the eighth aspect of the present invention to the fourth possible implementation manner of the eighth aspect, in a fifth possible implementation manner, the information about the target AP includes a basic service set identifier BSSID of the target AP, a Media Access Control MAC address of the target AP, and location information of the target AP.

A ninth aspect of the present invention provides an access point AP sleep method, including:

receiving, by an access controller AC, a load notification message sent by the AP, where the load notification message includes information about communication load between the AP and first stations STAs, where the first STAs are STAs currently associated with the AP;

if determining, according to the information about the communication load, that the AP meets a sleep trigger condition, allocating, by the AC, at least one target AP to each first STA;

sending, by the AC, an offload control message to the AP, where the offload control message includes information about the target AP allocated by the AC to the first STA, and the offload control message is used for the first STA to associate with the target AP according to the information about the target AP; and after a preset time, sending, by the AC, a sleep control message to the AP, where the sleep control message is used to cause the AP to enter a sleep state.

With reference to the ninth aspect of the present invention, in a first possible implementation manner, the allocating, by the AC, at least one target AP to each first STA, includes:

determining, by the AC, that all active APs managed by the AC and having access ranges covering at least one of the first STAs, except the AP, are candidate APs; and if a quantity of the candidate APs is 1, determining, by the AC, that the candidate AP is a target AP for all the first STAs; or if a quantity of the candidate APs is greater than 1, calculating, by the AC, suitability of each candidate AP according to location information of each candidate AP, load information of each candidate AP, and quality of service QoS requirement information of one of the first STAs; and allocating, by the AC, to a corresponding first STA, a candidate AP with highest suitability as a target AP.

With reference to the first possible implementation manner of the ninth aspect of the present invention, in a second possible implementation manner, the QoS requirement information of the first STA includes at least one of an average communication rate expected by the first STA or an average access delay expected by the first STA; and before the calculating, by the AC, suitability of each candidate AP, the method further includes:

selecting, by the AC, the candidate AP that meets at least one of the following conditions:

a preset upper threshold for an average throughput of the candidate AP is greater than or equal to a sum of a current average throughput of the candidate AP, a Sum, and an average communication rate expected by the corresponding first STA, where the Sum is a sum of average communication rates expected by all first STAs preassociated with the candidate AP; or a current average channel access delay of the candidate AP is shorter than an average channel access delay expected by the first STA.

With reference to the first possible implementation manner or the second possible implementation manner of the ninth aspect of the present invention, in a third possible implementation manner, the suitability of the candidate AP is inversely proportional to a distance between the candidate AP and the corresponding first STA; and the suitability of the candidate AP is inversely proportional to load of the candidate AP.

With reference to any one of the ninth aspect of the present invention to the third possible implementation manner of the ninth aspect, in a fourth possible implementation manner, the sleep trigger condition is that an average throughput of the AP within a preset time is less than a preset lower threshold for the average throughput of the AP.

A tenth aspect of the present invention provides an access point AP selection method, including:

receiving, by an access controller AC, an access request message sent by a station STA, where the access request message includes associable APs scanned by the STA;

calculating, by the AC, suitability of each associable AP according to location information of each associable AP, load information of each associable AP, and quality of service QoS requirement information of the STA;

allocating, by the AC, to the STA, an associable AP with highest suitability as a target AP; and sending, by the AC, an access permission message to the STA, where the access permission message includes information about the target AP, and the access permission message is used for the STA to associate with the target AP according to the information about the target AP.

With reference to the tenth aspect of the present invention, in a first possible implementation manner, the QoS requirement information of the STA includes at least one of an average communication rate expected by the STA or an average access delay expected by the STA; and before the calculating, by the AC, suitability of each associable AP, the method further includes:

selecting, by the AC, an associable AP that meets at least one of the following conditions:

a preset upper threshold for an average throughput of the associable AP is greater than or equal to a sum of a current average throughput of the associable AP and the average communication rate expected by the STA; or a current average channel access delay of the associable AP is shorter than an average channel access delay expected by the STA.

With reference to the tenth aspect of the present invention or the first possible implementation manner of the tenth aspect, in a second possible implementation manner, the access permission message further includes a special value, where the special value indicates that, in a current location of the STA, the STA can associate with the target AP.

With reference to any one of the tenth aspect of the present invention to the second possible implementation manner of the tenth aspect, in a third possible implementation manner, the information about the target AP includes a basic service set identifier BSSID of the target AP, a Media Access Control MAC address of the target AP, and location information of the target AP.

An eleventh aspect of the present invention provides an overload control method, including:

receiving, by an access controller AC, a load notification message sent by an access point AP, where the load notification message includes information about communication load between the AP and first stations STAs, where the first STAs are STAs currently associated with the AP;

determining, by the AC according to the information about the communication load, that the AP meets an overload trigger condition;

allocating, by the AC, a first target AP in active APs to the first STAs one by one according to a preset order; and sending, by the AC, an offload control message to the AP, where the offload control message includes information about the first target AP, and the offload control message is used for the AP to notify the corresponding first STA to associate with the first target AP according to the information about the first target AP.

With reference to the eleventh aspect of the present invention, in a first possible implementation manner, the preset order is a descending order of distances from the first STAs to the AP.

With reference to the eleventh aspect of the present invention or the first possible implementation manner of the eleventh aspect, in a second possible implementation manner, the allocating, by the AC, a first target AP in active APs to the first STAs one by one according to a preset order, includes:

after allocating a first target AP in the active APs to a current first STA and sending an offload control message to the AP, determining, by the AC, whether the AP still meets the overload trigger condition; and if yes, continuing to allocate a first target AP in the active APs to a next first STA; or if no, stopping allocating a first target AP to the first STAs; where the allocating, by the AC, a first target AP in active APs to the first STAs, includes the following steps:

determining, by the AC, candidate APs corresponding to the current first STA, where the candidate APs include all active APs managed by the AC and having access ranges covering the current first STA, except the AP; and allocating, by the AC, to the current first STA, a candidate AP meeting a preset condition as a first target AP.

With reference to the second possible implementation manner of the eleventh aspect of the present invention, in a third possible implementation manner, the allocating, by the AC, to the current first STA, a candidate AP meeting a preset condition as a first target AP, includes:

allocating, by the AC, to the current first STA, a candidate AP meeting at least one of the following preset conditions as a first target AP:

a preset upper threshold for an average throughput of the candidate AP is greater than or equal to a sum of a current average throughput of the candidate AP and an average communication rate expected by the current first STA; or a current average channel access delay of the candidate AP is shorter than or equal to an average channel access delay expected by the current first STA.

With reference to any one of the eleventh aspect to the third possible implementation manner of the eleventh aspect, in a fourth possible implementation manner, the method further includes:

if the AC does not successfully allocate a first target AP in the active APs to all or a part of the first STAs, and the AC determines that the AP still meets the overload trigger condition, allocating, by the AC, a second target AP in sleeping APs to at least one second STA, where the second STA is a first STA that is not successfully associated with a first target AP; and after allocating the second target AP to the at least one second STA and sending an offload control message to the AP, determining, by the AC, whether the AP still meets the overload trigger condition; and if yes, continuing to allocate a second target AP to other second STAs; or if no, stopping allocating a second target AP to the second STAs.

With reference to the fourth possible implementation manner of the eleventh aspect, in a fifth possible implementation manner, the allocating, by the AC, a second target AP in sleeping APs to at least one second STA, includes:

calculating, by the AC, suitability of each sleeping AP;

allocating, by the AC, to the at least one second STA, a sleeping AP with highest suitability as a second target AP;

sending, by the AC, a wake-up control message to the currently allocated second target AP, where the wake-up control message is used to cause the currently allocated second target AP to enter an active state; and sending, by the AC, an offload control message to the AP, where the offload control message includes information about the currently allocated second target AP, and the offload control message is used for the AP to notify the at least one second STA to associate with the currently allocated second target AP according to the information about the currently allocated second target AP.

With reference to the fifth possible implementation manner of the eleventh aspect of the present invention, in a sixth possible implementation manner, the suitability of the sleeping AP is proportional to offloadable traffic after the sleeping AP enters the active state, and the suitability of the sleeping AP is proportional to integrated communication quality between the sleeping AP and the at least one second STA.

With reference to the sixth possible implementation manner of the eleventh aspect of the present invention, in a seventh possible implementation manner, that the suitability of the sleeping AP is proportional to offloadable traffic after the sleeping AP enters the active state, and the suitability of the sleeping AP is proportional to integrated communication quality between the sleeping AP and the at least one second STA includes:

offloadable traffic after an $AP_i$ enters the $$\text{active state} = \sum_{STA \in \{Set\_Pending \cap Set\_Coverage(AP_i)\}}$$

average communication rate expected by the second STA; and integrated communication quality between the $AP_i$ and the second $$STA = \sum_{STA \in \{Set\_Pending \cap Set\_Coverage(AP_i)\}} \frac{1}{Dist(AP_i, STA)^n};$$

where the APi is one of the sleeping APs, the Set_Pending is a set of the second STAs, and the Set_Coverage(APi) is a set of STAs covered by an access range of the APi.

With reference to any one of the eleventh aspect of the present invention to the seventh possible implementation manner of the eleventh aspect, in an eighth possible implementation manner, the overload trigger condition is at least one of the following:

an average throughput of the AP within a preset time is greater than a preset upper threshold for the average throughput of the AP; or an average channel access delay of the AP is greater than a preset delay threshold.

A twelfth aspect of the present invention provides an access point AP wake-up method, including:

sending, by a station STA, an access request message to an access controller AC;

receiving, by the STA, an access permission message sent by the AC, where the access permission message includes information about a target AP, and the target AP is determined by the AC according to location information of the STA stored by the AC or carried in the access request message, from sleeping APs managed by the AC and having access ranges covering the STA, or the target AP is determined by the AC from all or a part of APs managed by the AC, and the part of APs include APs whose distances from the STA are within a preset range; and associating, by the STA, with the target AP according to the information about the target AP.

With reference to the twelfth aspect of the present invention, in a first possible implementation manner, the access request message further includes quality of service QoS requirement information of the STA, where the QoS requirement information of the STA includes an average communication rate expected by the STA.

With reference to the twelfth aspect of the present invention or the first possible implementation manner of the twelfth aspect, in a second possible implementation manner, the access permission message further includes a special value, where the special value indicates that, in a current location of the STA, the STA can associate with the target AP.

With reference to the twelfth aspect of the present invention to the second possible implementation manner of the twelfth aspect, in a third possible implementation manner, the information about the target AP includes a basic service set identifier BSSID of the target AP, a Media Access Control MAC address of the target AP, and location information of the target AP.

A thirteenth aspect of the present invention provides an access point AP sleep method, including:

sending, by an AP, a load notification message to an access controller AC, where the load notification message includes information about communication load between the AP and first stations STAs, where the first STAs are STAs currently associated with the AP;

receiving, by the AP, an offload control message sent by the AC, where the offload control message is sent after the AC determines, according to the information about the communication load, that the AP meets a sleep trigger condition, and the offload control message includes information about a target AP allocated by the AC to the first STA;

sending, by the AP, a reassociation notification message to the first STA, where the reassociation notification message includes the information about the target AP, and the reassociation notification message is used to notify the first STA to associate with the target AP according to the information about the target AP;

sending, by the AP, an offload control response message to the AC after a preset time, where the offload control response message includes identity information of a first STA currently associated with the AP; and receiving, by the AP, a sleep control message sent by the AC, and entering a sleep state, where the sleep control message is sent after the AC determines that the offload control response message does not include identity information of any first STA.

With reference to the thirteenth aspect of the present invention, in a first possible implementation manner, the sleep trigger condition is that an average throughput of the AP within a preset time is less than a preset lower threshold for the average throughput of the AP.

A fourteenth aspect of the present invention provides an overload control method, including:

sending, by an access point AP, a load notification message to an access controller AC, where the load notification message includes information about communication load between the AP and first stations STAs, where the first STAs are STAs currently associated with the AP;

receiving, by the AP, an offload control message sent by the AC, where the offload control message is sent after the AC determines, according to the information about the communication load, that the AP meets an overload trigger condition, and the offload control message includes information about a first target AP allocated to the first STA; and sending, by the AP, a reassociation notification message to the first STA, where the reassociation notification message includes the information about the first target AP allocated to the first STA, and the reassociation notification message is used for the first STA to associate with the first target AP according to the information about the first target AP.

With reference to the fourteenth aspect of the present invention, in a first possible implementation manner, the method further includes:

receiving, by the AP, an offload control message sent by the AC, where the offload control message includes information about a currently allocated second target AP, the offload control message is used for the AP to notify at least one second STA to associate with the currently allocated second target AP according to the information about the currently allocated second target AP, the offload control message is sent after the AC does not successfully allocate a first target AP in active APs to all or a part of the first STAs and the AC determines that the AP still meets the overload trigger condition, and the second STA is a first STA that is not successfully associated with a first target AP.

With reference to the fourteenth aspect of the present invention or the first possible implementation manner of the fourteenth aspect, in a second possible implementation manner, the overload trigger condition is at least one of the following:

an average throughput of the AP within a preset time is greater than a preset upper threshold for the average throughput of the AP; or an average channel access delay of the AP is greater than a preset delay threshold.

A fifteenth aspect of the present invention provides an access controller AC, including a receiver, a processor, and a transmitter, where the receiver is configured to receive an access request message sent by a station STA;

the processor is configured to determine, according to location information of the STA stored by the AC or carried in the access request message received by the receiver, sleeping APs managed by the AC and having access ranges covering the STA as first candidate APs, and allocate the first candidate AP to the STA as a target AP if a quantity of the first candidate APs is 1, or allocate, to the STA, a first candidate AP closest to the STA as a target AP if a quantity of the first candidate APs is greater than 1; and the transmitter is configured to send a wake-up control message to the target AP, where the wake-up control message is used to cause the target AP to enter an active state; and send an access permission message to the STA, where the access permission message includes information about the target AP, and the access permission message is used for the STA to associate with the target AP according to the information about the target AP.

With reference to the fifteenth aspect of the present invention, in a first possible implementation manner, the access request message further includes quality of service QoS requirement information of the STA, where the QoS requirement information of the STA includes an average communication rate expected by the STA; and the processor is further configured to select, after determining, according to the location information of the STA stored by the AC or carried in the access request message, the sleeping APs managed by the AC and having access ranges covering the STA as the first candidate APs, a first candidate AP that meets the following condition:

a preset upper threshold for an average throughput of the first candidate AP is greater than or equal to the average communication rate expected by the STA.

With reference to the fifteenth aspect of the present invention or the first possible implementation manner of the fifteenth aspect, in a second possible implementation manner, the access permission message further includes a special value, where the special value indicates that, in a current location of the STA, the STA can associate with the target AP.

With reference to any one of the fifteenth aspect to the second possible implementation manner of the fifteenth aspect, in a third possible implementation manner, if the quantity of the first candidate APs is 0, the processor is further configured to determine second candidate APs, where the second candidate APs include all or a part of APs that are managed by the AC and whose distances from the STA are within a preset range; calculate suitability of each second candidate AP according to location information of each second candidate AP, load information of each second candidate AP, and the QoS requirement information of the STA; and allocate, to the STA, a second candidate AP with highest suitability as a target AP.

With reference to the third possible implementation manner of the fifteenth aspect, in a fourth possible implementation manner, the processor is further configured to select, before calculating the suitability of each second candidate AP, a second candidate AP that meets at least one of the following conditions:

a preset upper threshold for an average throughput of the second candidate AP is greater than or equal to a sum of a current average throughput of the second candidate AP and the average communication rate expected by the STA; or a current average channel access delay of the second candidate AP is shorter than an average channel access delay expected by the STA.

With reference to any one of the fifteenth aspect of the present invention to the fourth possible implementation manner of the fifteenth aspect, in a fifth possible implementation manner, the information about the target AP includes a basic service set identifier BSSID of the target AP, a Media Access Control MAC address of the target AP, and location information of the target AP.

A sixteenth aspect of the present invention provides an access controller AC, including a receiver, a processor, and a transmitter, where the receiver is configured to receive a load notification message sent by an AP, where the load notification message includes information about communication load between the AP and first stations STAs, where the first STAs are STAs currently associated with the AP;

the processor is configured to allocate at least one target AP to each first STA if the AC determines, according to the information about the communication load, that the AP meets a sleep trigger condition; and the transmitter is configured to send an offload control message to the AP, where the offload control message includes information about the target AP allocated by the AC to the first STA, and the offload control message is used for the first STA to associate with the target AP according to the information about the target AP; and after a preset time, send a sleep control message to the AP, where the sleep control message is used to cause the AP to enter a sleep state.

With reference to the sixteenth aspect of the present invention, in a first possible implementation manner, the processor is specifically configured to:

determine that all active APs managed by the AC and having access ranges covering at least one of the first STAs, except the AP, are candidate APs; and if a quantity of the candidate APs is 1, determine that the candidate AP is a target AP for all the first STAs; or if a quantity of the candidate APs is greater than 1, calculate suitability of each candidate AP according to location information of each candidate AP, load information of each candidate AP, and quality of service QoS requirement information of one of the first STAs, and allocate, to a corresponding first STA, a candidate AP with highest suitability as a target AP.

With reference to the first possible implementation manner of the sixteenth aspect of the present invention, in a second possible implementation manner, the QoS requirement information of the first STA includes at least one of an average communication rate expected by the first STA or an average access delay expected by the first STA; and the processor is specifically further configured to select, before calculating the suitability of each candidate AP, the candidate AP that meets at least one of the following conditions:

a preset upper threshold for an average throughput of the candidate AP is greater than or equal to a sum of a current average throughput of the candidate AP, a Sum, and an average communication rate expected by the corresponding first STA, where the Sum is a sum of average communication rates expected by all first STAs preassociated with the candidate AP; or a current average channel access delay of the candidate AP is shorter than an average channel access delay expected by the first STA.

With reference to the first possible implementation manner or the second possible implementation manner of the sixteenth aspect of the present invention, in a third possible implementation manner, the suitability of the candidate AP is inversely proportional to a distance between the candidate AP and the corresponding first STA; and the suitability of the candidate AP is inversely proportional to load of the candidate AP.

With reference to any one of the sixteenth aspect of the present invention to the third possible implementation manner of the sixteenth aspect, in a fourth possible implementation manner, the sleep trigger condition is that an average throughput of the AP within a preset time is less than a preset lower threshold for the average throughput of the AP.

A seventeenth aspect of the present invention provides an access controller AC, including a receiver, a processor, and a transmitter, where the receiver is configured to receive an access request message sent by a station STA, where the access request message includes associable APs scanned by the STA;

the processor is configured to calculate suitability of each associable AP according to location information of each associable AP, load information of each associable AP, and quality of service QoS requirement information of the STA, and allocate, to the STA, an associable AP with highest suitability as a target AP; and the transmitter is configured to send an access permission message to the STA, where the access permission message includes information about the target AP, and the access permission message is used for the STA to associate with the target AP according to the information about the target AP.

With reference to the seventeenth aspect of the present invention, in a first possible implementation manner, the QoS requirement information of the STA includes at least one of an average communication rate expected by the STA or an average access delay expected by the STA; and the processor is further configured to select, before calculating the suitability of each associable AP, an associable AP that meets at least one of the following conditions:

a preset upper threshold for an average throughput of the associable AP is greater than or equal to a sum of a current average throughput of the associable AP and the average communication rate expected by the STA; or a current average channel access delay of the associable AP is shorter than an average channel access delay expected by the STA.

With reference to the seventeenth aspect of the present invention or the first possible implementation manner of the seventeenth aspect, in a second possible implementation manner, the access permission message further includes a special value, where the special value indicates that, in a current location of the STA, the STA can associate with the target AP.

With reference to the seventeenth aspect of the present invention to the second possible implementation manner of the seventeenth aspect, in a third possible implementation manner, the information about the target AP includes a basic service set identifier BSSID of the target AP, a Media Access Control MAC address of the target AP, and location information of the target AP.

An eighteenth aspect of the present invention provides an access controller AC, including a receiver, a processor, and a transmitter, where the receiver is configured to receive a load notification message sent by an access point AP, where the load notification message includes information about communication load between the AP and first stations STAs, where the first STAs are STAs currently associated with the AP;

the processor is configured to determine, according to the information about the communication load received by the receiver, that the AP meets an overload trigger condition; and allocate a first target AP in active APs to the first STAs one by one according to a preset order; and the transmitter is configured to send an offload control message to the AP, where the offload control message includes information about the first target AP, and the offload control message is used for the AP to notify the corresponding first STA to associate with the first target AP according to the information about the first target AP.

With reference to the eighteenth aspect of the present invention, in a first possible implementation manner, the preset order is a descending order of distances from the first STAs to the AP.

With reference to the eighteenth aspect of the present invention or the first possible implementation manner of the eighteenth aspect, in a second possible implementation manner, the processor is further configured to determine, after a first target AP in the active APs is allocated to a current first STA and the transmitter sends an offload control message to the AP, whether the AP still meets the overload trigger condition; and if yes, the processor is further configured to continue to allocate a first target AP in the active APs to a next first STA; or if no, the processor is further configured to stop allocating a first target AP to the first STAs; where the processor is specifically configured to:

determine candidate APs corresponding to the current first STA, where the candidate APs include all active APs managed by the AC and having access ranges covering the current first STA, except the AP; and allocate, to the current first STA, a candidate AP meeting a preset condition as a first target AP.

With reference to the second possible implementation manner of the eighteenth aspect of the present invention, in a third possible implementation manner, the processor is specifically configured to allocate, to the current first STA, a candidate AP meeting at least one of the following preset conditions as a first target AP:

a preset upper threshold for an average throughput of the candidate AP is greater than or equal to a sum of a current average throughput of the candidate AP and an average communication rate expected by the current first STA; or a current average channel access delay of the candidate AP is shorter than or equal to an average channel access delay expected by the current first STA.

With reference to any one of the eighteenth aspect of the present invention to the third possible implementation manner of the eighteenth aspect, in a fourth possible implementation manner, if the processor does not successfully allocate a first target AP in the active APs to all or a part of the first STAs, and determines that the AP still meets the overload trigger condition, the processor is further configured to allocate a second target AP in sleeping APs to at least one second STA, where the second STA is a first STA that is not successfully associated with a first target AP; after the second target AP is allocated to the at least one second STA and the transmitter sends an offload control message to the AP, determine whether the AP still meets the overload trigger condition; and if yes, continue to allocate a second target AP to other second STAs; or if no, stop allocating a second target AP to the second STAs.

With reference to the fourth possible implementation manner of the eighteenth aspect of the present invention, in a fifth possible implementation manner, the processor is specifically configured to: calculate suitability of each sleeping AP; and allocate, to the at least one second STA, a sleeping AP with highest suitability as a second target AP; and the transmitter is further configured to send a wake-up control message to the currently allocated second target AP, where the wake-up control message is used to cause the currently allocated second target AP to enter an active state; and send an offload control message to the AP, where the offload control message includes information about the currently allocated second target AP, and the offload control message is used for the AP to notify the at least one second STA to associate with the currently allocated second target AP according to the information about the currently allocated second target AP.

With reference to the fifth possible implementation manner of the eighteenth aspect of the present invention, in a sixth possible implementation manner, the suitability of the sleeping AP is proportional to offloadable traffic after the sleeping AP enters the active state, and the suitability of the sleeping AP is proportional to integrated communication quality between the sleeping AP and the at least one second STA.

With reference to the sixth possible implementation manner of the eighteenth aspect of the present invention, in a seventh possible implementation manner, that the suitability of the sleeping AP is proportional to offloadable traffic after the sleeping AP enters the active state, and the suitability of the sleeping AP is proportional to integrated communication quality between the sleeping AP and the at least one second STA includes:

offloadable traffic after an $AP_i$ enters the $$\text{active state} = \sum_{STA \in \{Set\_Pending \cap Set\_Coverage(AP_i)\}}$$

average communication rate expected by the second STA; and integrated communication quality between the $AP_i$ and the second $$STA = \sum_{STA \in \{Set\_Pending \cap Set\_Coverage(AP_i)\}} \frac{1}{Dist(AP_i, STA)^n};$$

where the APi is one of the sleeping APs, the Set_Pending is a set of the second STAs, and the Set_Coverage(APi) is a set of STAs covered by an access range of the APi.

With reference to any one of the eighteenth aspect of the present invention to the seventh possible implementation manner of the eighteenth aspect, in an eighth possible implementation manner, the overload trigger condition is at least one of the following:

an average throughput of the AP within a preset time is greater than a preset upper threshold for the average throughput of the AP; or an average channel access delay of the AP is greater than a preset delay threshold.

A nineteenth aspect of the present invention provides a station STA, including a transmitter, a receiver, and a processor, where the transmitter is configured to send an access request message to an access controller AC;

the receiver is configured to receive an access permission message sent by the AC, where the access permission message includes information about a target AP, and the target AP is determined by the AC according to location information of the STA stored by the AC or carried in the access request message, from sleeping APs managed by the AC and having access ranges covering the STA, or the target AP is determined by the AC from all or a part of APs managed by the AC, and the part of APs include APs whose distances from the STA are within a preset range; and the processor is configured to associate with the target AP according to the information about the target AP received by the receiver.

With reference to the nineteenth aspect of the present invention, in a first possible implementation manner, the access request message further includes quality of service QoS requirement information of the STA, where the QoS requirement information of the STA includes an average communication rate expected by the STA.

With reference to the nineteenth aspect of the present invention or the first possible implementation manner of the nineteenth aspect, in a second possible implementation manner, the access permission message further includes a special value, where the special value indicates that, in a current location of the STA, the STA can associate with the target AP.

With reference to any one of the nineteenth aspect of the present invention to the second possible implementation manner of the nineteenth aspect, in a third possible implementation manner, the information about the target AP includes a basic service set identifier BSSID of the target AP, a Media Access Control MAC address of the target AP, and location information of the target AP.

A twentieth aspect of the present invention provides an access point AP, including a transmitter, a receiver, and a processor, where the transmitter is configured to send a load notification message to an access controller AC, where the load notification message includes information about communication load between the AP and first stations STAs, where the first STAs are STAs currently associated with the AP;

the receiver is configured to receive an offload control message sent by the AC, where the offload control message is sent after the AC determines, according to the information about the communication load, that the AP meets a sleep trigger condition, and the offload control message includes information about a target AP allocated by the AC to the first STA;

the transmitter is further configured to send a reassociation notification message to the first STA, where the reassociation notification message includes the information about the target AP, and the reassociation notification message is used to notify the first STA to associate with the target AP according to the information about the target AP; and send an offload control response message to the AC after a preset time, where the offload control response message includes identity information of a first STA currently associated with the AP;

the receiver is further configured to receive a sleep control message sent by the AC, where the sleep control message is sent after the AC determines that the offload control response message does not include identity information of any first STA; and the processor is configured to enter a sleep state.

With reference to the twentieth aspect of the present invention, in a first possible implementation manner, the sleep trigger condition is that an average throughput of the AP within a preset time is less than a preset lower threshold for the average throughput of the AP.

A twenty-first aspect of the present invention provides an access point AP, including a transmitter and a receiver, where the transmitter is configured to send a load notification message to an access controller AC, where the load notification message includes information about communication load between the AP and first stations STAs, where the first STAs are STAs currently associated with the AP;

the receiver is configured to receive an offload control message sent by the AC, where the offload control message is sent after the AC determines, according to the information about the communication load, that the AP meets an overload trigger condition, and the offload control message includes information about a first target AP allocated to the first STA; and the transmitter is further configured to send a reassociation notification message to the first STA, where the reassociation notification message includes the information about the first target AP allocated to the first STA, and the reassociation notification message is used for the first STA to associate with the first target AP according to the information about the first target AP.

With reference to the twenty-first aspect of the present invention, in a first possible implementation manner, the receiver is further configured to receive an offload control message sent by the AC, where the offload control message includes information about a currently allocated second target AP, the offload control message is used for the AP to notify at least one second STA to associate with the currently allocated second target AP according to the information about the currently allocated second target AP, the offload control message is sent after the AC does not successfully allocate a first target AP in active APs to all or a part of the first STAs and the AC determines that the AP still meets the overload trigger condition, and the second STA is a first STA that is not successfully associated with a first target AP.

With reference to the twenty-first aspect of the present invention or the first possible implementation manner of the twenty-first aspect, in a second possible implementation manner, the overload trigger condition is at least one of the following:

an average throughput of the AP within a preset time is greater than a preset upper threshold for the average throughput of the AP; or an average channel access delay of the AP is greater than a preset delay threshold.

According to an AC, a STA, an AP, and a control method provided by embodiments of the present invention, after an AC receives an access request message sent by a STA, when no active AP having an access range covering the STA exists, the AC may determine, from sleeping APs having access ranges covering the STA, a target AP allocated to the STA, and then wake up the target AP and send an access permission message carrying information about the target AP to the STA. In this case, the STA can associate with the target AP according to the information about the target AP. When no active AP having an access range covering the STA exists, the AC can allocate, to the STA according to the access request message sent by the STA, a target AP in the sleeping APs having access ranges covering the STA, and wake up the target AP in time, so that the STA can access a network in time. Therefore, a problem that a STA located in a coverage hole area of a Wi-Fi network cannot access the Wi-Fi network is solved.

BRIEF DESCRIPTION OF DRAWINGS

To describe the technical solutions in the embodiments of the present invention, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
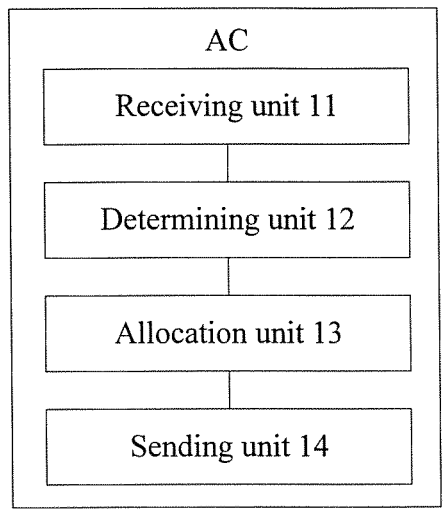
FIG. 1 is a schematic structural diagram of an AC according to an embodiment of the present invention.

An embodiment of the present invention provides an AC. As shown in FIG. 1, the AC may include a receiving unit 11, a determining unit 12, an allocation unit 13, and a sending unit 14.

The receiving unit 11 is configured to receive an access request message sent by a station STA.

The determining unit 12 is configured to determine, according to location information of the STA stored by the AC or carried in the access request message received by the receiving unit 11, sleeping APs managed by the AC and having access ranges covering the STA as first candidate APs.

The allocation unit 13 is configured to allocate the first candidate AP to the STA as a target AP if a quantity of the first candidate APs determined by the determining unit 12 is 1, or allocate, to the STA, a first candidate AP closest to the STA as a target AP if a quantity of the first candidate APs is greater than 1.

The sending unit 14 is configured to send a wake-up control message to the target AP, where the wake-up control message is used to cause the target AP to enter an active state; and send an access permission message to the STA, where the access permission message includes information about the target AP, and the access permission message is used for the STA to associate with the target AP according to the information about the target AP.

Figure 2:
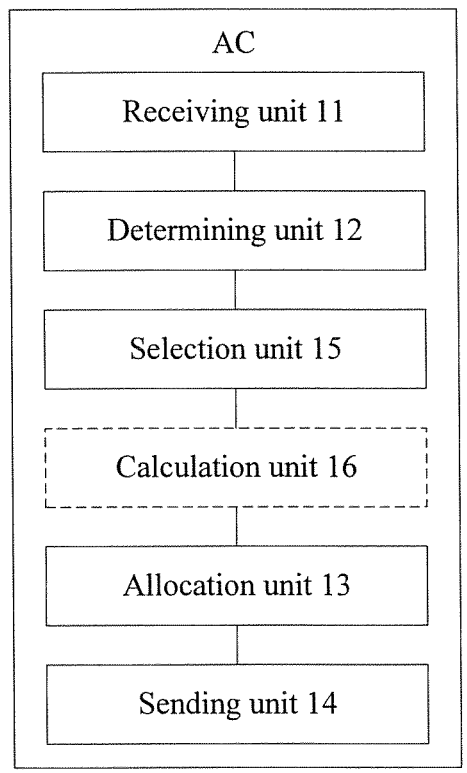
FIG. 2 is a schematic structural diagram of another AC according to an embodiment of the present invention.

Further optionally, the access request message further includes quality of service (English: Quality Of Service, QoS for short) requirement information of the STA, where the QoS requirement information of the STA includes an average communication rate expected by the STA; and as shown in FIG. 2, the AC may further include a selection unit 15.

The selection unit 15 is configured to select, after the determining unit 12 determines, according to the location information of the STA stored by the AC or carried in the access request message, the sleeping APs managed by the AC and having access ranges covering the STA as the first candidate APs, a first candidate AP that meets the following condition:

a preset upper threshold for an average throughput of the first candidate AP is greater than or equal to the average communication rate expected by the STA.

The AC further screens out, from a range of first candidate APs by using the selection unit 15 of the AC, the first candidate AP that meets the foregoing condition, so that the first candidate AP may meet the QoS requirement information of the STA.

Further optionally, the access permission message further includes a special value, where the special value indicates that, in a current location of the STA, the STA can associate with the target AP. In the current location of the STA without moving, the STA can directly associate with the target AP after determining that the access permission message includes the special value.

Further optionally, if the quantity of the first candidate APs is 0, the AC may further include a calculation unit 16.

The determining unit 12 is further configured to determine second candidate APs, where the second candidate APs include all or a part of APs that are managed by the AC and whose distances from the STA are within a preset range.

The calculation unit 16 is configured to calculate suitability of each second candidate AP according to location information of each second candidate AP, load information of each second candidate AP, and the QoS requirement information of the STA.

The allocation unit 13 is further configured to allocate, to the STA, a second candidate AP with highest suitability as a target AP.

Further optionally, the selection unit 15 is further configured to select, before the calculation unit 16 calculates the suitability of each second candidate AP, a second candidate AP that meets at least one of the following conditions:

condition 1: a preset upper threshold for an average throughput of the second candidate AP is greater than or equal to a sum of a current average throughput of the second candidate AP and the average communication rate expected by the STA; or condition 2: a current average channel access delay of the second candidate AP is shorter than an average channel access delay expected by the STA.

The AC further screens out, from a range of second candidate APs by using the selection unit 15 of the AC, a second candidate AP that meets at least one of the condition 1 or the condition 2, so that the second candidate AP may meet the QoS requirement information of the STA.

Further optionally, the information about the target AP includes a basic service set identifier (BSSID) of the target AP, a Media Access Control (MAC) address of the target AP, and location information of the target AP.

After the AC provided by this embodiment of the present invention receives an access request message sent by a STA, when no active AP having an access range covering the STA exists, the AC may determine, from sleeping APs having access ranges covering the STA, a target AP allocated to the STA, and then wake up the target AP and send an access permission message carrying information about the target AP to the STA. In this case, the STA can associate with the target AP according to the information about the target AP. When no active AP having an access range covering the STA exists, the AC can allocate, to the STA according to the access request message sent by the STA, a target AP in the sleeping APs having access ranges covering the STA, and wake up the target AP in time, so that the STA can access a network in time. Therefore, a problem that a STA located in a coverage hole area of a Wi-Fi network cannot access the Wi-Fi network is solved.

In addition, the AC may select, from the sleeping APs according to a QoS requirement of the STA included in the access request message sent by the STA, an AP that meets the QoS requirement of the STA as a target AP for the STA. In addition, if the AC does not determine, from the sleeping APs, a target AP allocated to the STA, the AC may select, from all or a part of APs managed by the AC, an AP that meets the QoS requirement of the STA as a target AP for the STA. In this way, a problem that a STA located in a coverage hole area of a Wi-Fi network cannot access the Wi-Fi network is solved, and a QoS requirement is also ensured after the STA accesses the network.

Figure 3:
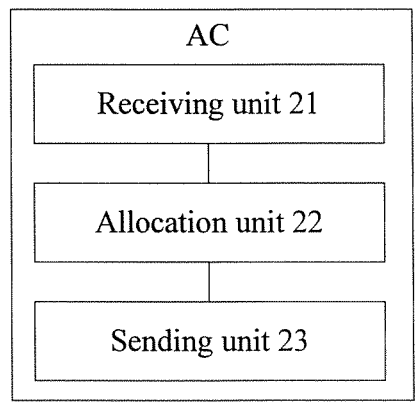
FIG. 3 is a schematic structural diagram of an AC according to another embodiment of the present invention.

Another embodiment of the present invention provides an AC. As shown in FIG. 3, the AC may include a receiving unit 21, an allocation unit 22, and a sending unit 23.

The receiving unit 21 is configured to receive a load notification message sent by an AP, where the load notification message includes information about communication load between the AP and first stations STAs, where the first STAs are STAs currently associated with the AP.

The allocation unit 22 is configured to allocate at least one target AP to each first STA if the AC determines, according to the information about the communication load, that the AP meets a sleep trigger condition.

The sending unit 23 is configured to send an offload control message to the AP, where the offload control message includes information about the target AP allocated by the AC to the first STA, and the offload control message is used for the first STA to associate with the target AP according to the information about the target AP; and after a preset time, send a sleep control message to the AP, where the sleep control message is used to cause the AP to enter a sleep state.

Figure 4:
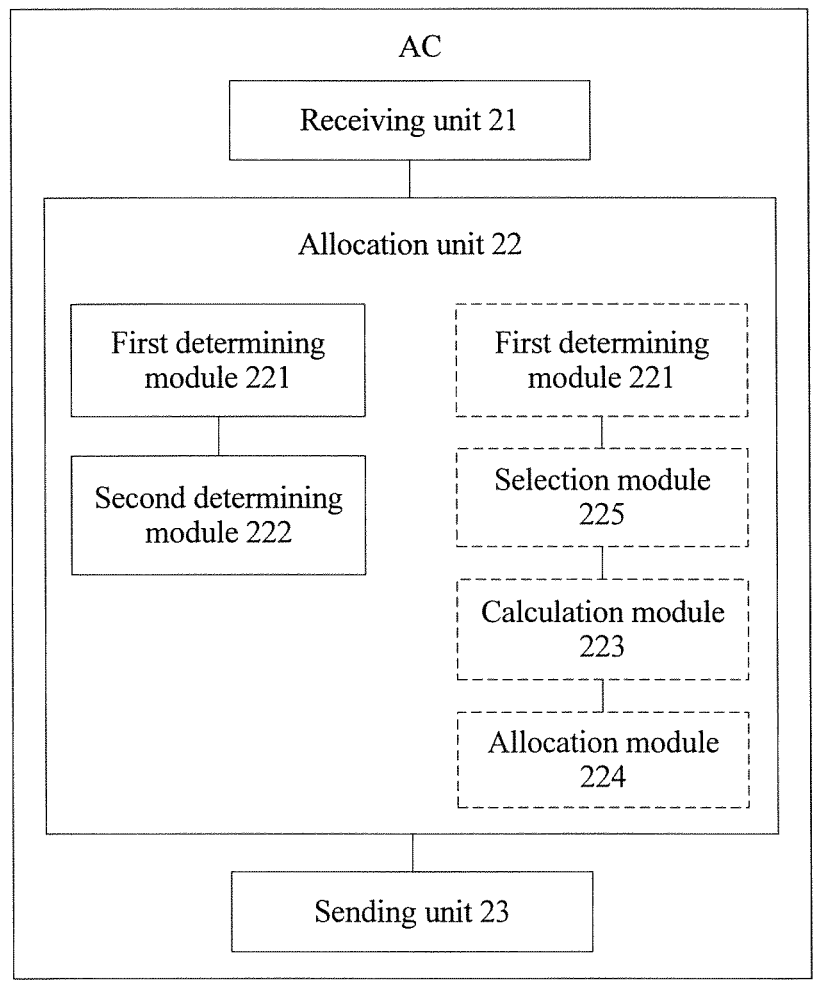
FIG. 4 is a schematic structural diagram of another AC according to another embodiment of the present invention.

Further optionally, as shown in FIG. 4, the allocation unit 22 may include a first determining module 221 and a second determining module 222; or the allocation unit may include a first determining module 221, a calculation module 223, and an allocation module 224.

The first determining module 221 is configured to determine that all active APs managed by the AC and having access ranges covering at least one of the first STAs, except the AP, are candidate APs.

If a quantity of the candidate APs determined by the first determining module 221 is 1, the second determining module 222 is configured to determine, that the candidate AP is a target AP for all the first STAs.

If a quantity of the candidate APs determined by the first determining module 221 is greater than 1, the calculation module 223 is configured to calculate suitability of each candidate AP according to location information of each candidate AP, load information of each candidate AP, and quality of service QoS requirement information of one of the first STAs. The allocation module 224 is configured to allocate, to a corresponding first STA, a candidate AP with highest suitability as a target AP.

Further optionally, the QoS requirement information of the first STA includes at least one of an average communication rate expected by the first STA or an average access delay expected by the first STA.

The allocation unit 22 may further include a selection module 225.

The selection module 225 is configured to select, before the calculation module 223 calculates the suitability of each candidate AP, a candidate AP that meets at least one of the following conditions:

condition 1: a preset upper threshold for an average throughput of the candidate AP is greater than or equal to a sum of a current average throughput of the candidate AP, a Sum, and an average communication rate expected by the corresponding first STA, where the Sum is a sum of average communication rates expected by all first STAs preassociated with the candidate AP; or condition 2: a current average channel access delay of the candidate AP is shorter than an average channel access delay expected by the first STA.

The AC further screens out, from a range of candidate APs by using the selection module 225 of the AC, a candidate AP that meets at least one of the condition 1 or the condition 2, so that the candidate AP may meet the QoS requirement information of the corresponding first STA.

Further optionally, the suitability of the candidate AP is inversely proportional to a distance between the candidate AP and the corresponding first STA; and the suitability of the candidate AP is inversely proportional to load of the candidate AP. That is, if the distance between the candidate AP and the corresponding first STA is shorter, the suitability of the candidate AP for the corresponding first STA is higher; if the load of the candidate AP is lower, the suitability of the candidate AP is higher.

Further optionally, the sleep trigger condition is that an average throughput of the AP within a preset time is less than a preset lower threshold for the average throughput of the AP.

It should be noted that, the sleep trigger condition is only an example illustrated in this embodiment, and is not limited in this embodiment. Any condition for determining that the AP should sleep may be applied to this embodiment.

After the AC provided by this embodiment of the present invention determines, according to information about communication load in a received load notification message sent by an AP, that the AP meets a sleep trigger condition, the AC first allocates a target AP to each first STA currently associated with the AP, and after each first STA is associated with the target AP, sends a sleep control message to the AP, so as to instruct the AP to enter a sleep state. After determining that the AP meets the sleep trigger condition, the AC first allocates the target AP to each first STA currently associated with the AP, and after each first STA is associated with the target AP, controls the AP to enter the sleep state. This not only solves a resource waste problem when load of the AP is light, but also ensures that a service of each first STA can be continued normally after the AP enters the sleep state.

In addition, when allocating the target AP to each first STA currently associated with the AP, the AC selects, from active APs according to a stored QoS requirement of the first STA, an AP that meets the QoS requirement of the first STA and has highest suitability as a target AP. This further ensures the QoS requirement of each first STA after the AP enters the sleep state.

Figure 5:
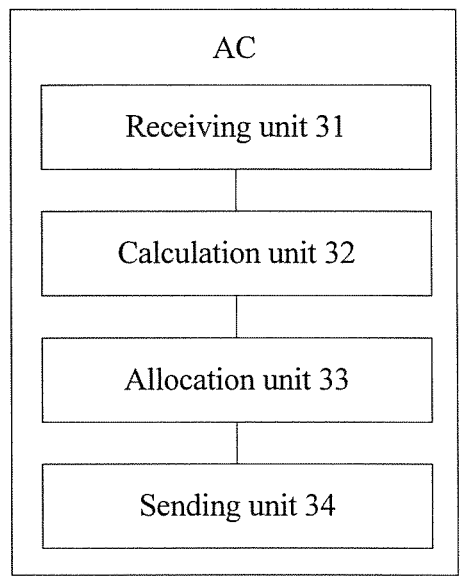
FIG. 5 is a schematic structural diagram of an AC according to another embodiment of the present invention.

Another embodiment of the present invention provides an AC. As shown in FIG. 5, the AC may include a receiving unit 31, a calculation unit 32, an allocation unit 33, and a sending unit 34.

The receiving unit 31 is configured to receive an access request message sent by a station STA, where the request message includes associable APs scanned by the STA.

The calculation unit 32 is configured to calculate suitability of each associable AP according to location information of each associable AP, load information of each associable AP, and quality of service QoS requirement information of the STA.

The allocation unit 33 is configured to allocate, to the STA, an associable AP with highest suitability as a target AP.

The sending unit 34 is configured to send an access permission message to the STA, where the access permission message includes information about the target AP, and the access permission message is used for the STA to associate with the target AP according to the information about the target AP.

Figure 6:
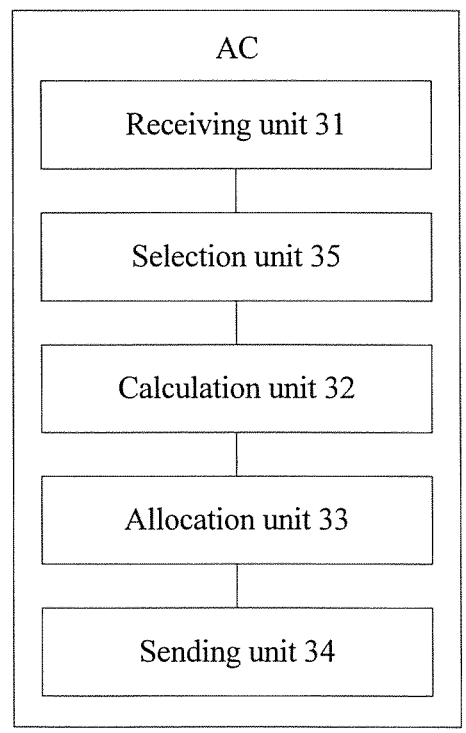
FIG. 6 is a schematic structural diagram of another AC according to another embodiment of the present invention.

Further optionally, the QoS requirement information of the STA includes at least one of an average communication rate expected by the STA or an average access delay expected by the STA; and as shown in FIG. 6, the AC may further include a selection unit 35.

The selection unit 35 is configured to select, before the calculation unit 32 calculates the suitability of each associable AP, an associable AP that meets at least one of the following conditions:

condition 1: a preset upper threshold for an average throughput of the associable AP is greater than or equal to a sum of a current average throughput of the associable AP and the average communication rate expected by the STA; or condition 2: a current average channel access delay of the associable AP is shorter than an average channel access delay expected by the STA.

The AC further screens out, from a range of associable APs by using the selection unit 35 of the AC, an associable AP that meets at least one of the condition 1 or the condition 2, so that the associable AP may meet the QoS requirement information of the STA.

Further optionally, the access permission message further includes a special value, where the special value indicates that, in a current location of the STA, the STA can associate with the target AP. In the current location of the STA without moving, the STA can directly associate with the target AP after determining that the access permission message includes the special value.

Further optionally, the information about the target AP includes a basic service set identifier BSSID of the target AP, a Media Access Control MAC address of the target AP, and location information of the target AP.

After the AC provided by this embodiment of the present invention receives an access request message sent by a STA, the AC first calculates suitability of each associable AP according to location information of each associable AP, load information of each associable AP, and QoS requirement information of the STA, allocates, to the STA, an associable AP with highest suitability that is obtained through calculation as a target AP, and then sends an access permission message carrying information about the target AP to the STA, so as to instruct the STA to associate with the target AP according to the information about the target AP. Because the target AP allocated by the AC to the STA is obtained through calculation according to the location information of each associable AP, the load information of each associable AP, and the QoS requirement information of the STA, and is the AP with the highest suitability and allocated to the STA, a QoS requirement of the STA may be ensured after the STA accesses the target AP.

Figure 7:
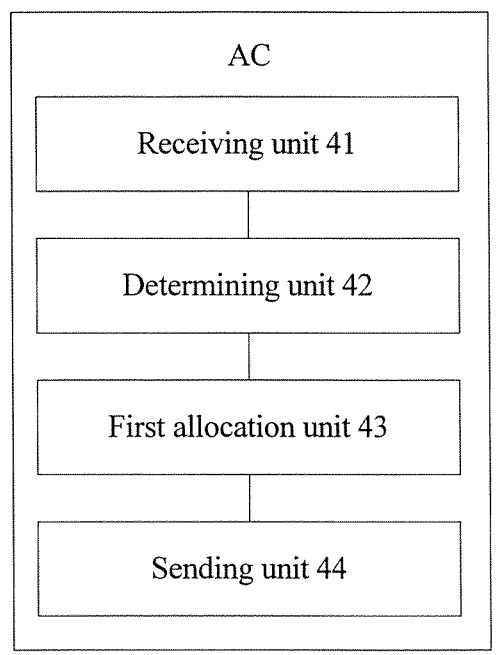
FIG. 7 is a schematic structural diagram of an AC according to another embodiment of the present invention.

Another embodiment of the present invention provides an AC. As shown in FIG. 7, the AC may include a receiving unit 41, a determining unit 42, a first allocation unit 43, and a sending unit 44.

The receiving unit 41 is configured to receive a load notification message sent by an access point AP, where the load notification message includes information about communication load between the AP and first stations STAs, where the first STAs are STAs currently associated with the AP.

The determining unit 42 is configured to determine, according to the information about the communication load received by the receiving unit 41, that the AP meets an overload trigger condition.

The first allocation unit 43 is configured to allocate a first target AP in active APs to the first STAs one by one according to a preset order.

The sending unit 44 is configured to send an offload control message to the AP, where the offload control message includes information about the first target AP, and the offload control message is used for the AP to notify the corresponding first STA to associate with the first target AP according to the information about the first target AP.

Figure 8:
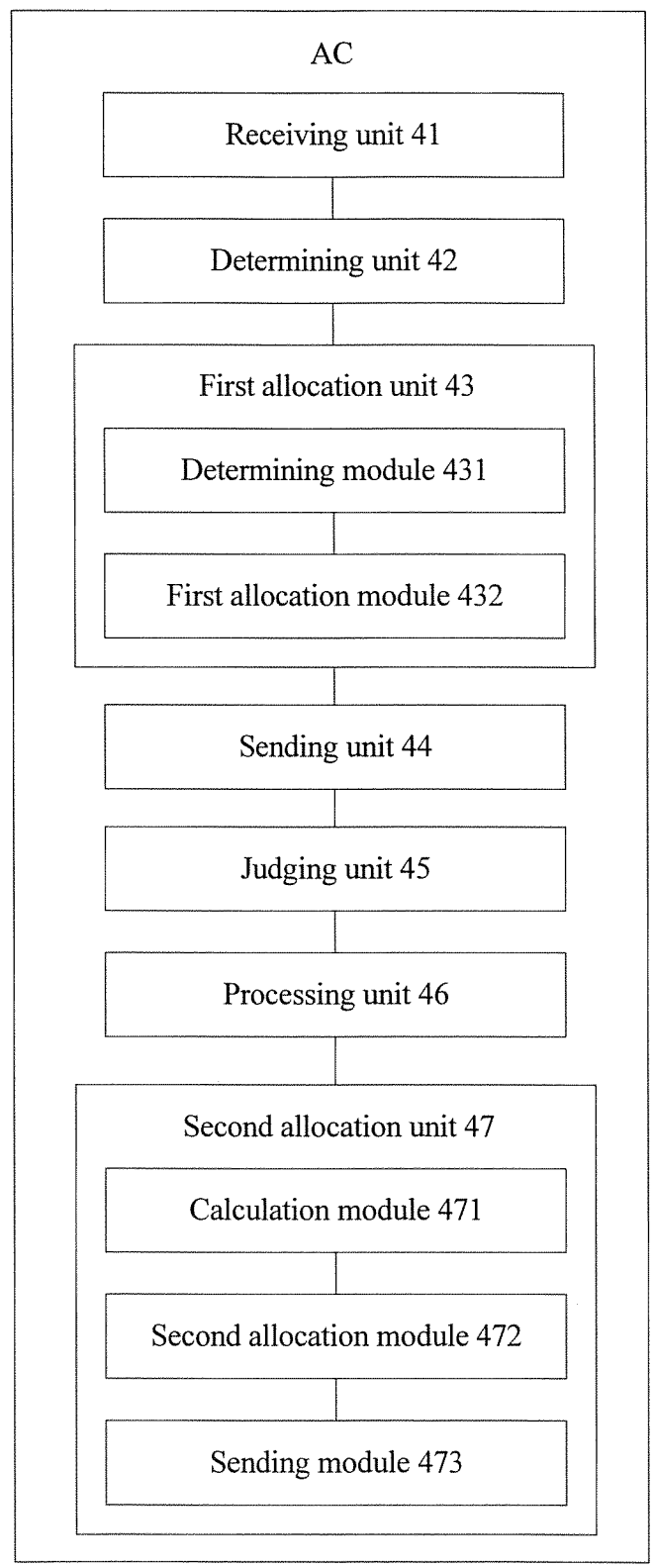
FIG. 8 is a schematic structural diagram of another AC according to another embodiment of the present invention.

Further optionally, as shown in FIG. 8, the preset order is a descending order of distances from the first STAs to the AP.

Further optionally, the AC may further include a judging unit 45 and a processing unit 46.

The judging unit 45 is configured to determine, after the first allocation unit 43 allocates a first target AP in the active APs to a current first STA and the sending unit 44 sends an offload control message to the AP, whether the AP still meets the overload trigger condition.

If yes, the first allocation unit 43 is further configured to continue to allocate a first target AP in the active APs to a next first STA.

If no, the processing unit 46 is configured to stop allocating a first target AP to the first STAs or terminate an overload control method.

The first allocation unit 43 includes a determining module 431 and a first allocation module 432.

The determining module 431 is configured to determine candidate APs corresponding to the current first STA, where the candidate APs include all active APs managed by the AC and having access ranges covering the current first STA, except the AP.

The first allocation module 432 is configured to allocate, to the current first STA, a candidate AP meeting a preset condition as a first target AP.

Further optionally, the first allocation module 432 is specifically configured to allocate, to the current first STA, a candidate AP meeting at least one of the following preset conditions as a first target AP:

condition 1: a preset upper threshold for an average throughput of the candidate AP is greater than or equal to a sum of a current average throughput of the candidate AP and an average communication rate expected by the current first STA; or condition 2: a current average channel access delay of the candidate AP is shorter than or equal to an average channel access delay expected by the current first STA.

The AC further screens out, from a range of candidate APs by using the first allocation module 432 of the AC, a candidate AP that meets at least one of the condition 1 or the condition 2, and uses the candidate AP as a first target AP allocated to the current first STA, so that the first target AP may meet QoS requirement information of the current first STA.

Further optionally, the AC may further include a second allocation unit 47.

If the first allocation unit 43 does not successfully allocate a first target AP in the active APs to all or a part of the first STAs, and the judging unit 45 determines that the AP still meets the overload trigger condition, the second allocation unit 47 is configured to allocate a second target AP in sleeping APs to at least one second STA, where the second STA is a first STA that is not successfully associated with a first target AP.

The judging unit 45 is further configured to determine, after the second allocation unit 47 allocates the second target AP to the at least one second STA and the sending unit 44 sends an offload control message to the AP, whether the AP still meets the overload trigger condition.

If yes, the second allocation unit 47 is further configured to continue to allocate a second target AP to other second STAs.

If no, the processing unit 46 is further configured to stop allocating a second target AP to the second STAs or terminate an overload control method.

Further optionally, the second allocation unit 47 may include a calculation module 471, a second allocation module 472, and a sending module 473.

The calculation module 471 is configured to calculate suitability of each sleeping AP.

The second allocation module 472 is configured to allocate, to the at least one second STA, a sleeping AP with highest suitability as a second target AP.

The sending module 473 is configured to send a wake-up control message to the currently allocated second target AP, where the wake-up control message is used to cause the currently allocated second target AP to enter an active state; and send an offload control message to the AP, where the offload control message includes information about the currently allocated second target AP, and the offload control message is used for the AP to notify the at least one second STA to associate with the currently allocated second target AP according to the information about the currently allocated second target AP.

Further optionally, the suitability of the sleeping AP is proportional to offloadable traffic after the sleeping AP enters the active state, and the suitability of the sleeping AP is proportional to integrated communication quality between the sleeping AP and the at least one second STA.

Further optionally, that the suitability of the sleeping AP is proportional to offloadable traffic after the sleeping AP enters the active state, and the suitability of the sleeping AP is proportional to integrated communication quality between the sleeping AP and the at least one second STA includes:

offloadable traffic after an $AP_i$ enters the $$\text{active state} = \sum_{STA \in \{Set\_Pending \cap Set\_Coverage(AP_i)\}}$$

average communication rate expected by the second STA; and integrated communication quality between the $AP_i$ and the second $$STA = \sum_{STA \in \{Set\_Pending \cap Set\_Coverage(AP_i)\}} \frac{1}{Dist(AP_i, STA)^n};$$

where the APi is one of the sleeping APs, the Set_Pending is a set of the second STAs, and the Set_Coverage(APi) is a set of STAs covered by an access range of the APi.

Further optionally, the overload trigger condition is at least one of the following:

condition 1: an average throughput of the AP within a preset time is greater than a preset upper threshold for the average throughput of the AP; or condition 2: an average channel access delay of the AP is greater than a preset delay threshold.

It should be noted that, the overload trigger condition is only an example illustrated in this embodiment, and is not limited in this embodiment. Any condition for determining that the AP is overloaded may be applied to this embodiment.

After the AC provided by this embodiment of the present invention determines, according to information about communication load in a received load notification message sent by an AP, that the AP meets an overload trigger condition, the AC allocates, one by one according to a preset order, a first target AP in active APs to first STAs associated with the AP, and sends an offload control message carrying information about the allocated first target AP to the AP, so that the AP instructs the first STAs to associate with the first target AP, thereby achieving an objective of mitigating overload of the AP. After determining that the AP meets the overload trigger condition, the AC does not share load (the first STAs associated with the AP) of the AP by waking up a sleeping AP having an access range covering the first STAs associated with the AP, but allocates a first target AP in the active APs to the first STAs, and instructs the first STAs to associate with the first target AP, to share the load of the AP. Therefore, resources of an existing Wi-Fi network can be fully used, and the AP exits an overload state. This not only improves utilization of active APs in the Wi-Fi network, but also avoids a power waste problem caused by too light load after a sleeping AP is waked up.

In addition, after a current first STA is associated with a first target AP allocated by the AC to the current first STA, if the AC determines that the AP still meets the overload trigger condition, the AC allocates a first target AP to a next first STA, so that the AP instructs the first STA to associate with the first target AP. If the AC does not successfully allocate a first target AP to all or a part of the first STAs, and the AC determines that the AP still meets the overload trigger condition, the AC needs to wake up a sleeping AP and allocate the sleeping AP as a second target AP to a second STA, so that the second STA is associated with the second target AP, and that the AP exits the overload state. When allocating a target AP to a STA currently associated with the AP, the AC selects, according to a stored QoS requirement of the STA, an AP that meets the QoS requirement of the first STA and has highest suitability as a target AP. This ensures the QoS requirement of the STA associated with the AP.

Figure 9:
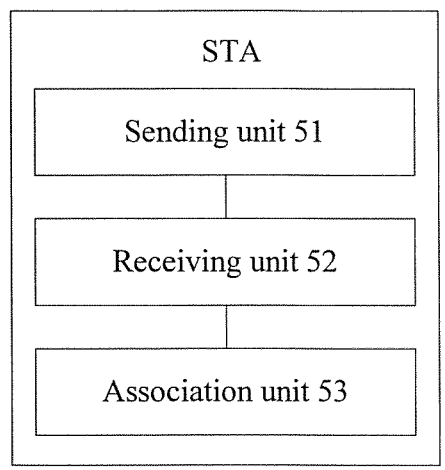
FIG. 9 is a schematic structural diagram of a STA according to another embodiment of the present invention.

Another embodiment of the present invention provides a STA. As shown in FIG. 9, the STA may include a sending unit 51, a receiving unit 52, and an association unit 53.

The sending unit 51 is configured to send an access request message to an access controller AC.

The receiving unit 52 is configured to receive an access permission message sent by the AC, where the access permission message includes information about a target AP, and the target AP is determined by the AC according to location information of the STA stored by the AC or carried in the access request message, from sleeping APs managed by the AC and having access ranges covering the STA, or the target AP is determined by the AC from all or a part of APs managed by the AC, and the part of APs include APs whose distances from the STA are within a preset range.

The association unit 53 is configured to associate with the target AP according to the information about the target AP received by the receiving unit 52.

Further optionally, the access request message further includes quality of service QoS requirement information of the STA, where the QoS requirement information of the STA includes an average communication rate expected by the STA.

Further optionally, the access permission message further includes a special value, where the special value indicates that, in a current location of the STA, the STA can associate with the target AP. In the current location of the STA without moving, the STA can directly associate with the target AP after determining that the access permission message includes the special value.

Further optionally, the information about the target AP includes a basic service set identifier BSSID of the target AP, a Media Access Control MAC address of the target AP, and location information of the target AP.

The STA provided by this embodiment of the present invention sends an access request message to an AC, so that after the AC receives the access request message sent by the STA, when no active AP having an access range covering the STA exists, the AC may determine, from sleeping APs having access ranges covering the STA, a target AP allocated to the STA, and then wake up the target AP and send an access permission message carrying information about the target AP to the STA. In this case, the STA can associate with the target AP according to the information about the target AP. When no active AP having an access range covering the STA exists, the AC can allocate, to the STA according to the access request message sent by the STA, a target AP in the sleeping APs having access ranges covering the STA, and wake up the target AP in time, so that the STA can access a network in time. Therefore, a problem that a STA located in a coverage hole area of a Wi-Fi network cannot access the Wi-Fi network is solved.

In addition, the AC may select, from the sleeping APs according to a QoS requirement of the STA included in the access request message sent by the STA, an AP that meets the QoS requirement of the STA as a target AP for the STA. In addition, if the AC does not determine, from the sleeping APs, a target AP allocated to the STA, the AC may select, from all or a part of APs managed by the AC, an AP that meets the QoS requirement of the STA as a target AP for the STA. In this way, a problem that a STA located in a coverage hole area of a Wi-Fi network cannot access the Wi-Fi network is solved, and a QoS requirement is also ensured after the STA accesses the network.

Figure 10:
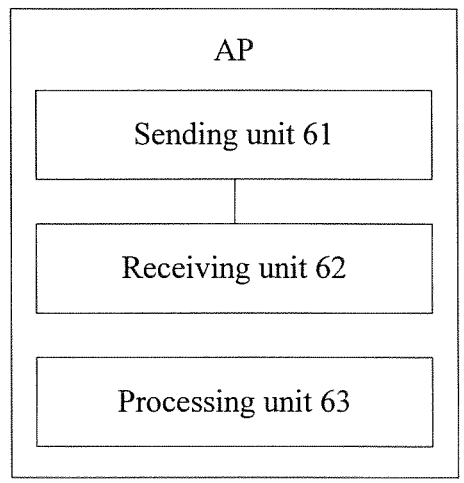
FIG. 10 is a schematic structural diagram of an AP according to another embodiment of the present invention.

Another embodiment of the present invention provides an AP. As shown in FIG. 10, the AP may include a sending unit 61, a receiving unit 62, and a processing unit 63.

The sending unit 61 is configured to send a load notification message to an access controller AC, where the load notification message includes information about communication load between the AP and first stations STAs, where the first STAs are STAs currently associated with the AP.

The receiving unit 62 is configured to receive an offload control message sent by the AC, where the offload control message is sent after the AC determines, according to the information about the communication load, that the AP meets a sleep trigger condition, and the offload control message includes information about a target AP allocated by the AC to the first STA.

The sending unit 61 is further configured to send a reassociation notification message to the first STA, where the reassociation notification message includes the information about the target AP, and the reassociation notification message is used to notify the first STA to associate with the target AP according to the information about the target AP; and send an offload control response message to the AC after a preset time, where the offload control response message includes identity information of a first STA currently associated with the AP.

The receiving unit 62 is further configured to receive a sleep control message sent by the AC, where the sleep control message is sent after the AC determines that the offload control response message does not include identity information of any first STA.

The processing unit 63 is configured to enter a sleep state.

Further optionally, the sleep trigger condition is that an average throughput of the AP within a preset time is less than a preset lower threshold for the average throughput of the AP.

It should be noted that, the sleep trigger condition is only an example illustrated in this embodiment, and is not limited in this embodiment. Any condition for determining that the AP sleeps may be applied to this embodiment.

The AP provided by this embodiment of the present invention sends a load notification message to an AC, so that after the AC determines, according to information about communication load in the received load notification message sent by the AP, that the AP meets a sleep trigger condition, the AC first allocates a target AP to each first STA currently associated with the AP, and sends a sleep control message to the AP after each first STA is associated with the target AP, so as to instruct the AP to enter a sleep state. After determining that the AP meets the sleep trigger condition, the AC first allocates the target AP to each first STA currently associated with the AP, and after each first STA is associated with the target AP, controls the AP to enter the sleep state. This not only solves a resource waste problem when load of the AP is light, but also ensures that a service of each first STA can be continued normally after the AP enters the sleep state.

In addition, when allocating the target AP to each first STA currently associated with the AP, the AC selects, from active APs according to a stored QoS requirement of the first STA, an AP that meets the QoS requirement of the first STA and has highest suitability as a target AP. This further ensures the QoS requirement of each first STA after the AP enters the sleep state.

Figure 11:
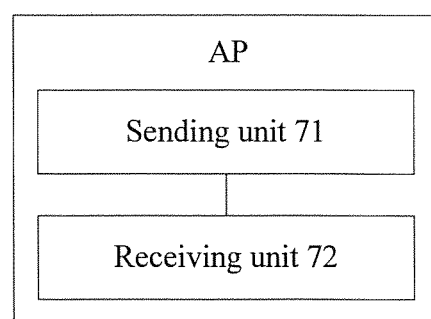
FIG. 11 is a schematic structural diagram of an AP according to another embodiment of the present invention.

Another embodiment of the present invention provides an AP. As shown in FIG. 11, the AP may include a sending unit 71 and a receiving unit 72.

The sending unit 71 is configured to send a load notification message to an access controller AC, where the load notification message includes information about communication load between the AP and first stations STAs, where the first STAs are STAs currently associated with the AP.

The receiving unit 72 is configured to receive an offload control message sent by the AC, where the offload control message is sent after the AC determines, according to the information about the communication load, that the AP meets an overload trigger condition, and the offload control message includes information about a first target AP allocated to the first STA.

The sending unit 71 is further configured to send a reassociation notification message to the first STA, where the reassociation notification message includes the information about the first target AP allocated to the first STA, and the reassociation notification message is used for the first STA to associate with the first target AP according to the information about the first target AP.

Further optionally, the receiving unit 72 is further configured to receive an offload control message sent by the AC, where the offload control message includes information about a currently allocated second target AP, the offload control message is used for the AP to notify at least one second STA to associate with the currently allocated second target AP according to the information about the currently allocated second target AP, the offload control message is sent after the AC does not successfully allocate a first target AP in active APs to all or a part of the first STAs and the AC determines that the AP still meets the overload trigger condition, and the second STA is a first STA that is not successfully associated with a first target AP.

Further optionally, the overload trigger condition is at least one of the following:

condition 1: an average throughput of the AP within a preset time is greater than a preset upper threshold for the average throughput of the AP; or condition 2: an average channel access delay of the AP is greater than a preset delay threshold.

It should be noted that, the overload trigger condition is only an example illustrated in this embodiment, and is not limited in this embodiment. Any condition for determining that the AP is overloaded may be applied to this embodiment.

The AP provided by this embodiment of the present invention sends a load notification message to an AC, so that after the AC determines, according to information about communication load in the received load notification message sent by the AP, that the AP meets an overload trigger condition, the AC allocates, one by one according to a preset order, a first target AP in active APs to first STAs associated with the AP, and sends an offload control message carrying information about the allocated first target AP to the AP, so that the AP instructs the first STAs to associate with the first target AP, thereby achieving an objective of mitigating overload of the AP. After determining that the AP meets the overload trigger condition, the AC does not share load (the first STAs associated with the AP) of the AP by waking up a sleeping AP having an access range covering the first STAs associated with the AP, but allocates a first target AP in the active APs to the first STAs, and instructs the first STAs to associate with the first target AP, to share the load of the AP. Therefore, resources of an existing Wi-Fi network can be fully used, and the AP exits an overload state. This not only improves utilization of active APs in the Wi-Fi network, but also avoids a power waste problem caused by too light load after a sleeping AP is waked up.

In addition, after a current first STA is associated with a first target AP allocated by the AC to the current first STA, if the AC determines that the AP still meets the overload trigger condition, the AC allocates a first target AP to a next first STA, so that the AP instructs the first STA to associate with the first target AP. If the AC does not successfully allocate a first target AP to all or a part of the first STAs, and the AC determines that the AP still meets the overload trigger condition, the AC needs to wake up a sleeping AP and allocate the sleeping AP as a second target AP to a second STA, so that the second STA is associated with the second target AP, and that the AP exits the overload state. When allocating a target AP to a STA currently associated with the AP, the AC selects, according to a stored QoS requirement of the STA, an AP that meets the QoS requirement of the first STA and has highest suitability as a target AP. This ensures the QoS requirement of the STA associated with the AP.

Figure 12:
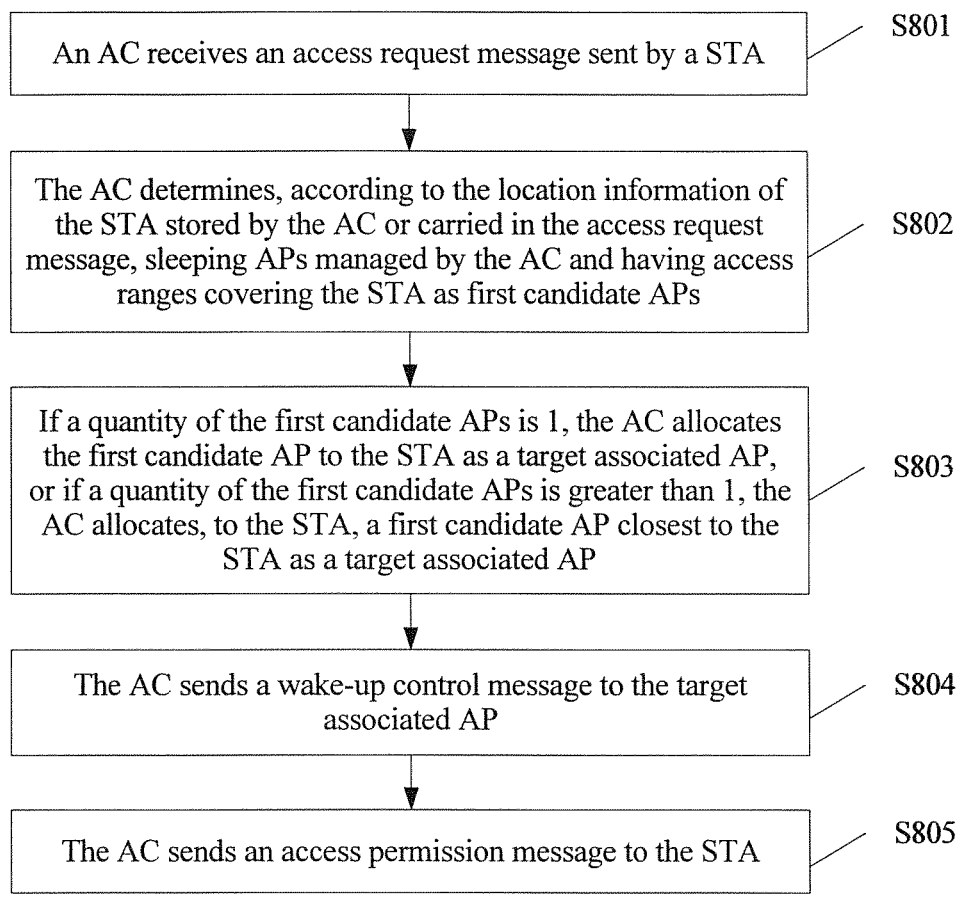
FIG. 12 is a flowchart of an AP wake-up method according to another embodiment of the present invention.

Another embodiment of the present invention provides an AP wake-up method. As shown in FIG. 12, the method may include the following steps:

S801. An AC receives an access request message sent by a STA.

The access request message may include a unique identity (English: Identity, ID for short) of the STA, or the access request message may include a unique ID of the STA and location information of the STA.

S802. The AC determines, according to location information of the STA stored by the AC or carried in the access request message, sleeping APs managed by the AC and having access ranges covering the STA as first candidate APs.

After the AC receives the access request message sent by the STA, when the access request message sent by the STA includes the unique ID of the STA, the AC may obtain, according to the unique ID of the STA, the location information of the STA from a STA local information table managed by the AC, and then determine, according to the obtained location information of the STA, that the sleeping APs managed by the AC and having access ranges covering the STA are the first candidate APs. The unique ID of the STA and the location information that is of the STA and is corresponding to the unique ID of the STA exist in the STA local information table managed by the AC. When the access request message sent by the STA includes the location information of the STA, the AC may directly determine, according to the location information of the STA, the sleeping APs managed by the AC and having access ranges covering the STA as the first candidate APs.

S803. If a quantity of the first candidate APs is 1, the AC allocates the first candidate AP to the STA as a target AP, or if a quantity of the first candidate APs is greater than 1, the AC allocates, to the STA, a first candidate AP closest to the STA as a target AP.

After determining the first candidate APs, the AC may allocate a target AP to the STA according to the quantity of the first candidate APs. Specifically, if the quantity of the first candidate APs is 1, the AC may directly allocate the first candidate AP to the STA as the target AP, or if the quantity of the first candidate APs is greater than 1, the AC may allocate, to the STA, the first candidate AP closest to the STA as the target AP.

S804. The AC sends a wake-up control message to the target AP.

The wake-up control message is used to cause the target AP to enter an active state. Specifically, after the AC allocates the target AP from the first candidate APs to the STA, the AC may send the wake-up control message to the target AP, so that the AP enters the active state after receiving the wake-up control message.

S805. The AC sends an access permission message to the STA.

After the AC sends the wake-up control message to the target AP, so that the target AP enters the active state, the AC may send the access permission message including information about the target AP to the STA, so that the STA associates with the target AP according to the information about the target AP.

In the AP wake-up method provided by this embodiment of the present invention, after an AC receives an access request message sent by a STA, when no active AP having an access range covering the STA exists, the AC may determine, from sleeping APs having access ranges covering the STA, a target AP allocated to the STA, and then wake up the target AP and send an access permission message carrying information about the target AP to the STA. In this case, the STA can associate with the target AP according to the information about the target AP. When no active AP having an access range covering the STA exists, the AC can allocate, to the STA according to the access request message sent by the STA, a target AP in the sleeping APs having access ranges covering the STA, and wake up the target AP in time, so that the STA can access a network in time. Therefore, a problem that a STA located in a coverage hole area of a Wi-Fi network cannot access the Wi-Fi network is solved.

Figure 13:
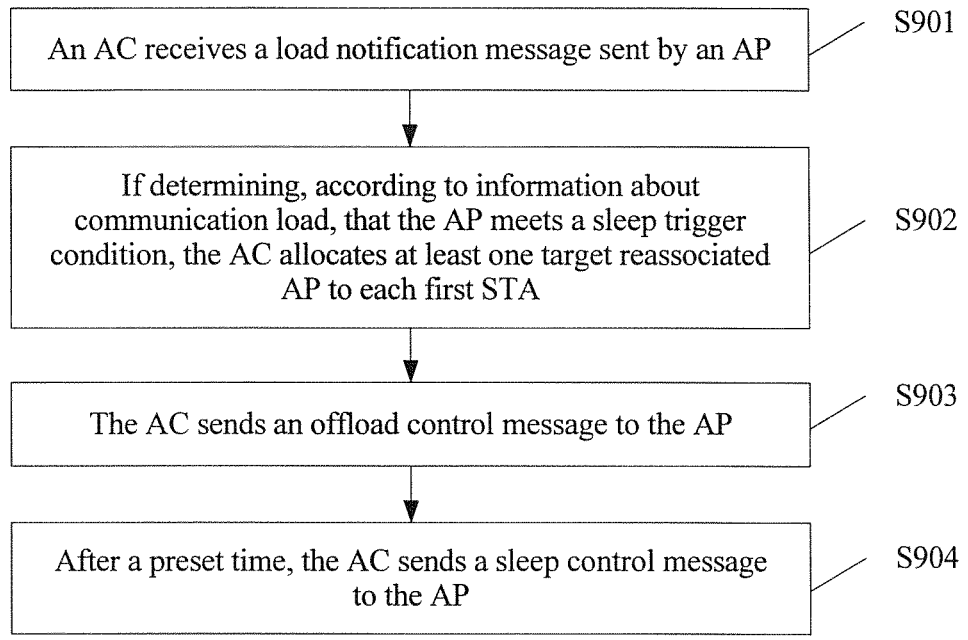
FIG. 13 is a flowchart of an AP sleep method according to another embodiment of the present invention.

Another embodiment of the present invention provides an AP sleep method. As shown in FIG. 13, the method may include the following steps:

S901. An AC receives a load notification message sent by an AP.

The load notification message includes information about communication load between the AP and first stations STAs, where the first STAs are STAs currently associated with the AP.

S902. If determining, according to information about communication load, that the AP meets a sleep trigger condition, the AC allocates at least one target AP to each first STA.

The information about the communication load includes average communication rates between the AP and the currently associated STAs. After receiving the load notification message sent by the AP, the AC may determine, according to the information about the communication load in the load notification message, whether the AP meets the sleep trigger condition, and when determining that the AP meets the sleep trigger condition, allocate at least one target AP to each first STA currently associated with the AP. That is, in this embodiment, the AC needs to offload all STAs associated with the AP to other target APs, and then can instruct the AP to enter a sleep state.

Exemplarily, the sleep trigger condition may be that an average throughput of the AP within a preset time is less than a preset lower threshold for the average throughput of the AP. That is, when the AC determines, according to the information about the communication load in the load notification message, that the average throughput (a numeric value of the average throughput of the AP within the preset time is equal to a sum of the average communication rates between the AP and the currently associated STAs) of the AP within the preset time is less than the preset lower threshold for the average throughput of the AP, the AC may determine that the AP meets the sleep trigger condition. It should be noted that, in this embodiment of the present invention, the sleep trigger condition is described only by using an example herein and the sleep trigger condition of the AP is not limited. The sleep trigger condition of the AP may be specifically set according to a requirement in an actual application scenario.

S903. The AC sends an offload control message to the AP.

The offload control message may include information about the target AP allocated by the AC to each first STA, and the offload control message is used for the first STA to associate with the target AP according to the information about the target AP. Specifically, after the AC allocates the at least one target AP to each first STA, the AC may send, to the AP, the offload control message including the information about the target AP allocated by the AC to each first STA, so that each first STA currently associated with the AP associates with the target AP.

S904. After a preset time, the AC sends a sleep control message to the AP.

The sleep control message is used to cause the AP to enter the sleep state. After the AC sends the offload control message to the AP and waits for the preset time, the AC may receive an offload control response message sent by the AP, and extract information about communication load from the offload control response message. If the information about the communication load is null, the AC sends the sleep control message to the AP, so as to instruct the AP to enter the sleep state.

In the AP sleep method provided by this embodiment of the present invention, after an AC determines, according to information about communication load in a received load notification message sent by an AP, that the AP meets a sleep trigger condition, the AC first allocates a target AP to each first STA currently associated with the AP, and after each first STA is associated with the target AP, sends a sleep control message to the AP, so as to instruct the AP to enter a sleep state. After determining that the AP meets the sleep trigger condition, the AC first allocates the target AP to each first STA currently associated with the AP, and after each first STA is associated with the target AP, controls the AP to enter the sleep state. This not only solves a resource waste problem when load of the AP is light, but also ensures that a service of each first STA can be continued normally after the AP enters the sleep state.

Figure 14:
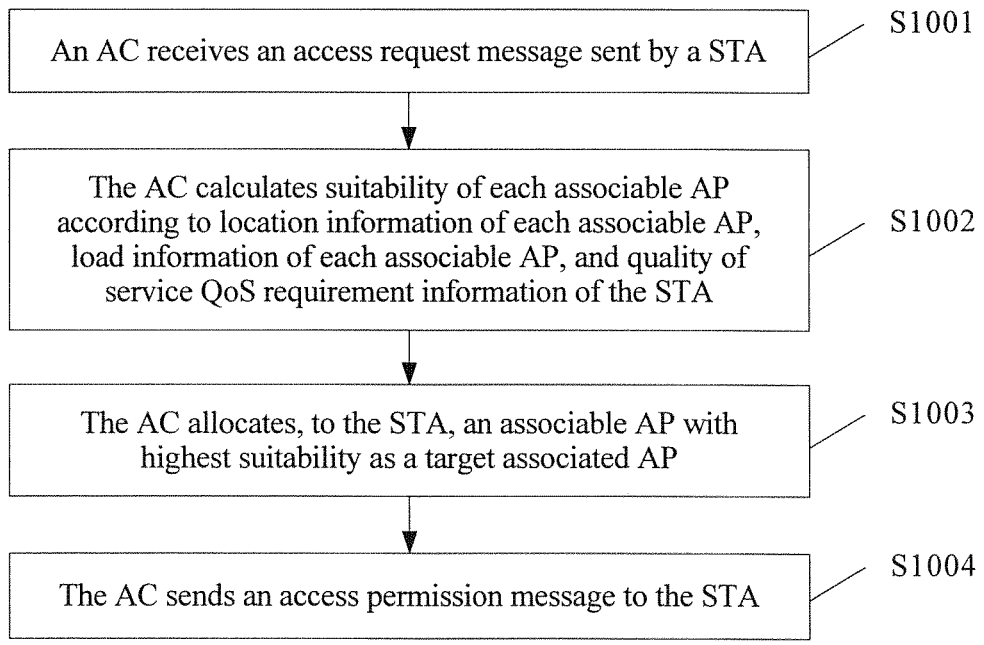
FIG. 14 is a flowchart of an AP selection method according to another embodiment of the present invention.

Another embodiment of the present invention provides an AP selection method. As shown in FIG. 14, the method may include the following steps:

S1001. An AC receives an access request message sent by a STA.

The access request message includes associable APs scanned by the STA.

S1002. The AC calculates suitability of each associable AP according to location information of each associable AP, load information of each associable AP, and quality of service QoS requirement information of the STA.

After receiving the access request message sent by the STA, the AC may calculate the suitability of each associable AP according to the location information of each associable AP, the load information of each associable AP, and the QoS requirement information of the STA, for the associable APs scanned by the STA and included in the access request message.

S1003. The AC allocates, to the STA, an associable AP with highest suitability as a target AP.

S1004. The AC sends an access pen fission message to the STA.

The access permission message includes information about the target AP, and is used for the STA to associate with the target AP according to the information about the target AP. After the AC calculates the suitability of each associable AP and allocates, to the STA, the associable AP with the highest suitability as the target AP, the AC may send the access permission message including the information about the target AP to the STA, so that the STA associates with the target AP according to the information about the target AP.

In the AP selection method provided by this embodiment of the present invention, for associable APs scanned by a STA and included in an access request message sent by the STA, an AC first calculates suitability of each associable AP according to location information of each associable AP, load information of each associable AP, and QoS requirement information of the STA, allocates, to the STA, an associable AP with highest suitability as a target AP, and then sends an access permission message carrying information about the target AP to the STA, so as to instruct the STA to associate with the target AP according to the information about the target AP. Because the target AP allocated by the AC to the STA is obtained through calculation according to the location information of each associable AP, the load information of each associable AP, and the QoS requirement information of the STA, and is the AP with the highest suitability and allocated to the STA, a QoS requirement of the STA may be ensured after the STA accesses the target AP.

Figure 15:
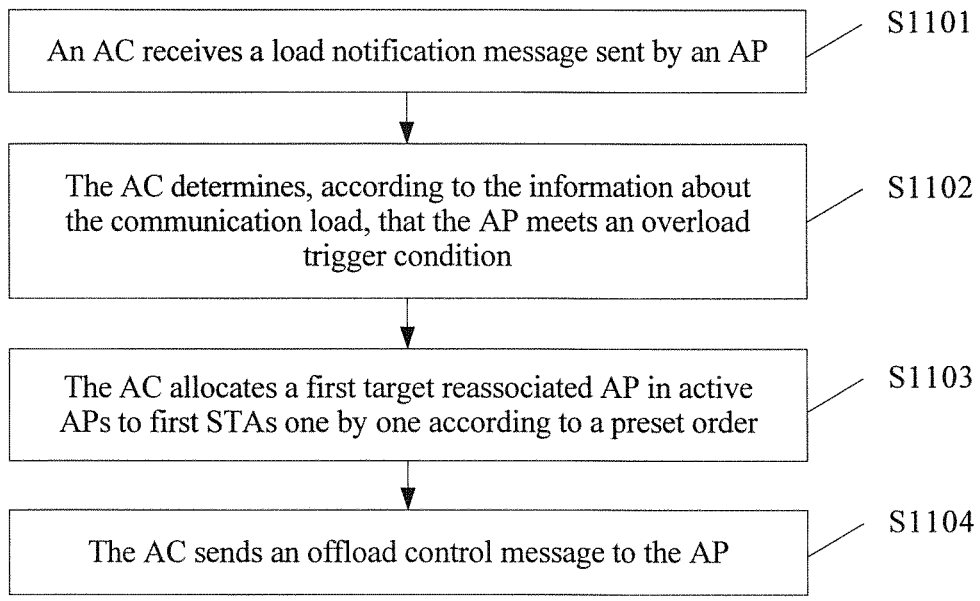
FIG. 15 is a flowchart of an overload control method according to another embodiment of the present invention.

Another embodiment of the present invention provides an overload control method. As shown in FIG. 15, the method may include the following steps:

S1101. An AC receives a load notification message sent by an AP.

The load notification message includes information about communication load between the AP and first stations STAs, where the first STAs are STAs currently associated with the AP.

S1102. The AC determines, according to the information about the communication load, that the AP meets an overload trigger condition.

The information about the communication load includes average communication rates between the AP and the currently associated first STAs. After receiving the load notification message sent by the AP, the AC may determine, according to the information about the communication load included in the load notification message, whether the AP meets the overload trigger condition, and perform step S1103 when determining that the AP meets the overload trigger condition.

Exemplarily, the overload trigger condition of the AP may be at least one of the following conditions:

Condition 1: An average throughput of the AP within a preset time is greater than a preset upper threshold for the average throughput of the AP.

The average throughput of the AP within the preset time refers to an average communication rate of the AP (for the AP, the throughput of the AP refers to received traffic generated from each STA associated with the AP to the AP and sent traffic generated from the AP to each STA associated with the AP) within the preset time, and a numeric value of the average throughput is equal to a sum of the average communication rates of all the first STAs associated with the AP. The preset upper threshold for the average throughput of the AP may be obtained from an AP local information table managed by the AC.

Condition 2: An average channel access delay of the AP is greater than a preset delay threshold.

A numeric value of the average channel access delay of the AP may be equal to an average value of access delays of all the first STAs associated with the AP. The preset delay threshold of the AP may be obtained from the AP local information table managed by the AC.

When the AP meets at least one of the foregoing conditions, the AC considers that the AP is already in an overload state. Because the AP in the overload state has too high load, communication data transmission of the STAs associated with the AP may be affected. Therefore, some STAs associated with the AP need to be offloaded to other target APs, so that load of the AP recovers to normal.

It should be noted that, in this embodiment of the present invention, the overload trigger condition is described only by using an example herein and the overload trigger condition of the AP is not limited. The overload trigger condition of the AP may be specifically set according to a requirement in an actual application scenario.

S1103. The AC allocates a first target AP in active APs to first STAs one by one according to a preset order.

After the AC determines, according to the information about the communication load, that the AP meets the overload trigger condition, the AC may allocate a first target AP in the active APs to each first STA one by one according to a descending order of distances.

S1104. The AC sends an offload control message to the AP.

The offload control message includes information about the first target AP, and is used for the AP to notify the corresponding first STA to associate with the first target AP according to the information about the first target AP. Specifically, after the AC allocates the first target AP in the active APs to the first STAs according to the preset order, the AC sends the offload control message including the information about the first target AP to the AP, so that the AP instructs the first STAs to associate with the first target AP according to the information about the first target AP.

In the overload control method provided by this embodiment of the present invention, after an AC determines, according to information about communication load included in a load notification message sent by an AP, that the AP meets an overload trigger condition, the AC allocates, one by one according to a preset order, a first target AP in active APs to first STAs associated with the overloaded AP, and sends an offload control message carrying information about the allocated first target AP to the AP, so that the AP instructs the first STAs to associate with the first target AP, thereby achieving an objective of mitigating overload of the AP. After determining that the AP meets the overload trigger condition, the AC does not share load (the first STAs associated with the AP) of the AP by waking up a sleeping AP having an access range covering the first STAs associated with the AP, but allocates a first target AP in the active APs to the first STAs, and instructs the first STAs to associate with the first target AP, to share the load of the AP. Therefore, resources of an existing Wi-Fi network can be fully used, and the AP exits an overload state. This not only improves utilization of active APs in the Wi-Fi network, but also avoids a power waste problem caused by too light load after a sleeping AP is waked up.

Figure 16:
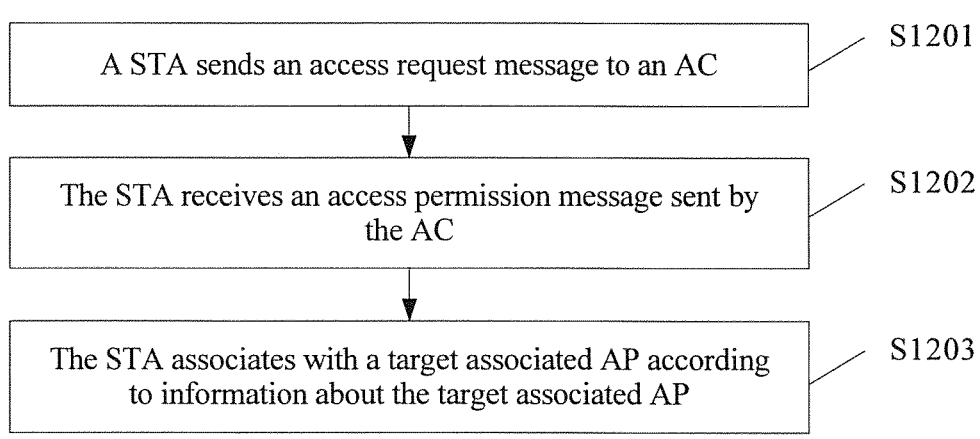
FIG. 16 is a flowchart of an AP wake-up method according to another embodiment of the present invention.

Another embodiment of the present invention provides an AP wake-up method. As shown in FIG. 16, the method may include the following steps:

S1201. A STA sends an access request message to an AC.

The access request message may include a unique ID of the STA, or the access request message may include a unique ID of the STA and location information of the STA.

S1202. The STA receives an access permission message sent by the AC.

The access permission message includes information about a target AP, and the target AP is determined by the AC according to location information of the STA stored by the AC or carried in the access request message, from sleeping APs managed by the AC and having access ranges covering the STA, or the target AP is determined by the AC from all or a part of APs managed by the AC, and the part of APs include APs whose distances from the STA are within a preset range.

When the access request message sent by the STA carries the unique ID of the STA, the AC may obtain, according to the unique ID of the STA carried in the access request message, the location information of the STA from a STA local information table managed by the AC, then determine, according to the obtained location information of the STA, a sleeping AP managed by the AC and having an access range covering the STA as a target AP, wake up the target AP, and send the access permission message to the STA. A correspondence between the unique ID of the STA and the location information of the STA exists in the STA local information table managed by the AC. When the access request message sent by the STA carries the location information of the STA, the AC may determine, according to the location information of the STA carried in the access request message, a sleeping AP managed by the AC and having an access range covering the STA as a target AP, wake up the target AP, and send the access permission message to the STA. Alternatively, when the AC does not determine a target AP having an access range covering the STA, the AC may determine a target AP from all or a part of APs managed by the AC, and send the access permission message carrying the information about the determined target AP to the STA.

S1203. The STA associates with a target AP according to information about the target AP.

After receiving the access permission message sent by the AC, the STA associates with the target AP according to the information about the target AP included in the access permission message.

In the AP wake-up method provided by this embodiment of the present invention, an access request message is sent to an AC, so that after the AC receives an access request message sent by a STA, when no active AP having an access range covering the STA exists, the AC may determine, from sleeping APs having access ranges covering the STA, a target AP allocated to the STA, and then wake up the target AP and send an access permission message carrying information about the target AP to the STA. In this case, the STA can associate with the target AP according to the information about the target AP. When no active AP having an access range covering the STA exists, the AC can allocate, to the STA according to the access request message sent by the STA, a target AP in the sleeping APs having access ranges covering the STA, and wake up the target AP in time, so that the STA can access a network in time. Therefore, a problem that a STA located in a coverage hole area of a Wi-Fi network cannot access the Wi-Fi network is solved.

In addition, the AC may select, from the sleeping APs according to a QoS requirement of the STA included in the access request message sent by the STA, an AP that meets the QoS requirement of the STA as a target AP for the STA. In addition, if the AC does not determine, from the sleeping APs, a target AP allocated to the STA, the AC may select, from all or a part of APs managed by the AC, an AP that meets the QoS requirement of the STA as a target AP for the STA. In this way, a problem that a STA located in a coverage hole area of a Wi-Fi network cannot access the Wi-Fi network is solved, and a QoS requirement is also ensured after the STA accesses the network.

Figure 17:
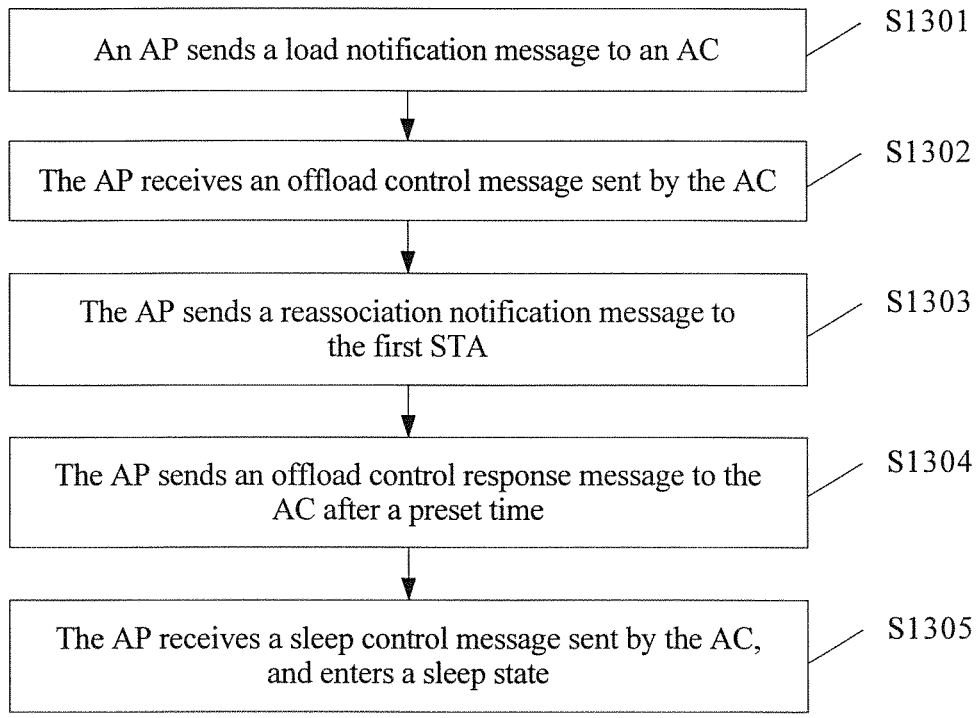
FIG. 17 is a flowchart of an AP sleep method according to another embodiment of the present invention.

Another embodiment of the present invention provides an AP sleep method. As shown in FIG. 17, the method may include the following steps:

S1301. An AP sends a load notification message to an AC.

The load notification message includes information about communication load between the AP and first stations STAs, where the first STAs are STAs currently associated with the AP.

S1302. The AP receives an offload control message sent by the AC.

The offload control message is sent after the AC determines, according to the information about the communication load, that the AP meets a sleep trigger condition, and the offload control message includes information about a target AP allocated by the AC to the first STA.

Specifically, after the AP sends the load notification message to the AC, if the AC determines that the AP meets the sleep trigger condition, the AC allocates at least one target AP to each first STA associated with the AP, and sends the offload control message carrying the information about the allocated target AP to the AP. In this case, the AP may receive the offload control message that carries the information about the target AP and is sent by the AC.

S1303. The AP sends a reassociation notification message to the first STA.

The reassociation notification message includes the information about the target AP, and is used to notify the first STA to associate with the target AP according to the information about the target AP. Specifically, after the AP receives the offload control message sent by the AC, the AP may send the reassociation notification message carrying the information about the target AP to the first STA, so as to instruct the first STA to associate with the target AP according to the information about the target AP.

S1304. The AP sends an offload control response message to the AC after a preset time.

The offload control response message includes identity information of a first STA currently associated with the AP. After the preset time, the AP first detects the first STA currently associated with the AP, and sends the offload control response message carrying the identity information of the detected first STA to the AC, so that the AC determines, according to the received offload control response message, whether the AP needs to be controlled to enter a sleep state. If the offload control message received by the AC does not include identity information of any first STA, the AC may send a sleep control message to the AP. If the offload control message received by the AC includes identity information of a first STA, the AC terminates the sleep control method.

S1305. The AP receives a sleep control message sent by the AC, and enters a sleep state.

In the AP sleep method provided by this embodiment of the present invention, a load notification message is sent to an AC, so that after the AC determines, according to information about communication load in a received load notification message sent by an AP, that the AP meets a sleep trigger condition, the AC first allocates a target AP to each first STA currently associated with the AP, and sends a sleep control message to the AP after each first STA is associated with the target AP, so as to instruct the AP to enter a sleep state. After determining that the AP meets the sleep trigger condition, the AC first allocates the target AP to each first STA currently associated with the AP, and after each first STA is associated with the target AP, controls the AP to enter the sleep state. This not only solves a resource waste problem when load of the AP is light, but also ensures that a service of each first STA can be continued normally after the AP enters the sleep state.

Figure 18:
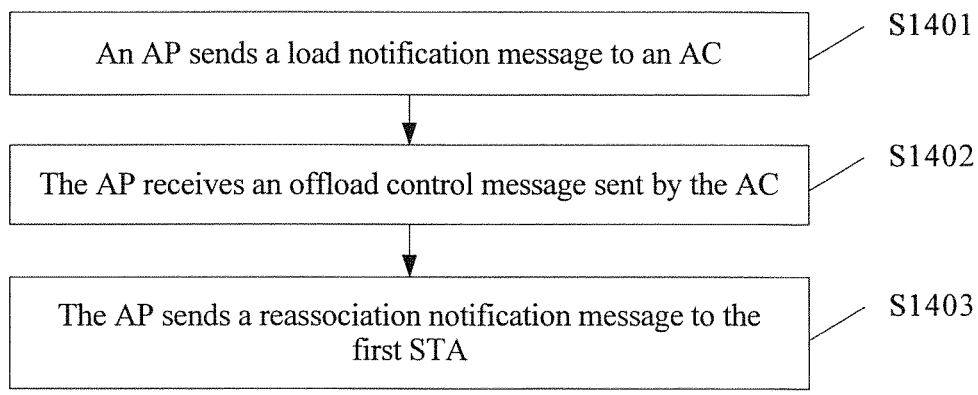
FIG. 18 is a flowchart of an overload control method according to another embodiment of the present invention.

Another embodiment of the present invention provides an overload control method. As shown in FIG. 18, the method may include the following steps:

S1401. An AP sends a load notification message to an AC.

The load notification message includes information about communication load between the AP and first stations STAs, where the first STAs are STAs currently associated with the AP.

S1402. The AP receives an offload control message sent by the AC.

The offload control message includes information about a first target AP allocated to the first STA. After the AC determines, according to the load notification message sent by the AP, that the AP meets an overload trigger condition, and determines the first target AP from active APs for the first STA currently associated with the AP, the AC may send the offload control message carrying the information about the first target AP to the AP. In this case, the AP may receive the offload control message that carries the information about the first target AP and is sent by the AC.

S1403. The AP sends a reassociation notification message to the first STA.

The reassociation notification message includes the information about the first target AP allocated to the first STA, and is used for the first STA to associate with the first target AP according to the information about the first target AP.

Specifically, after the AP receives the offload control message sent by the AC, the AP may send the reassociation notification message carrying the information about the first target AP to the currently associated first STA, so as to instruct the first STA to associate with the first target AP.

In the overload control method provided by this embodiment of the present invention, a load notification message is sent to an AC, so that after the AC determines, according to information about communication load in a received load notification message sent by an AP, that the AP meets an overload trigger condition, the AC allocates, one by one according to a preset order, a first target AP in active APs to first STAs associated with the AP, and sends an offload control message carrying information about the allocated first target AP to the AP, so that the AP instructs the first STAs to associate with the first target AP, thereby achieving an objective of mitigating overload of the AP. After determining that the AP meets the overload trigger condition, the AC does not share load (the first STAs associated with the AP) of the AP by waking up a sleeping AP having an access range covering the first STAs associated with the AP, but allocates a first target AP in the active APs to the first STAs, and instructs the first STAs to associate with the first target AP, to share the load of the AP. Therefore, resources of an existing Wi-Fi network can be fully used, and the AP exits an overload state. This not only improves utilization of active APs in the Wi-Fi network, but also avoids a power waste problem caused by too light load after a sleeping AP is waked up.

Figure 19A:
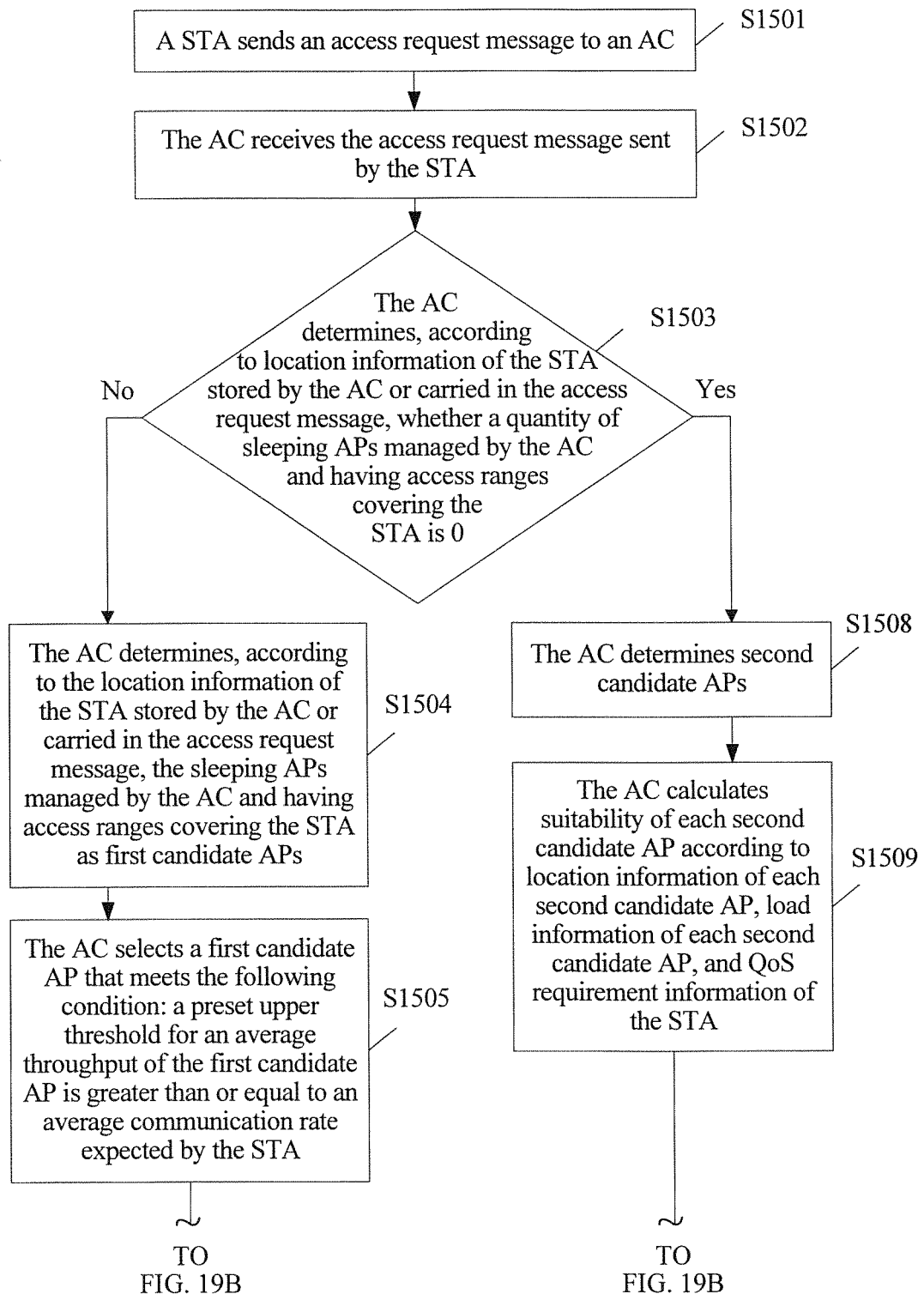
FIG. 19A and FIG. 19B are a flowchart of an AP wake-up method according to another embodiment of the present invention.
Figure 19B:
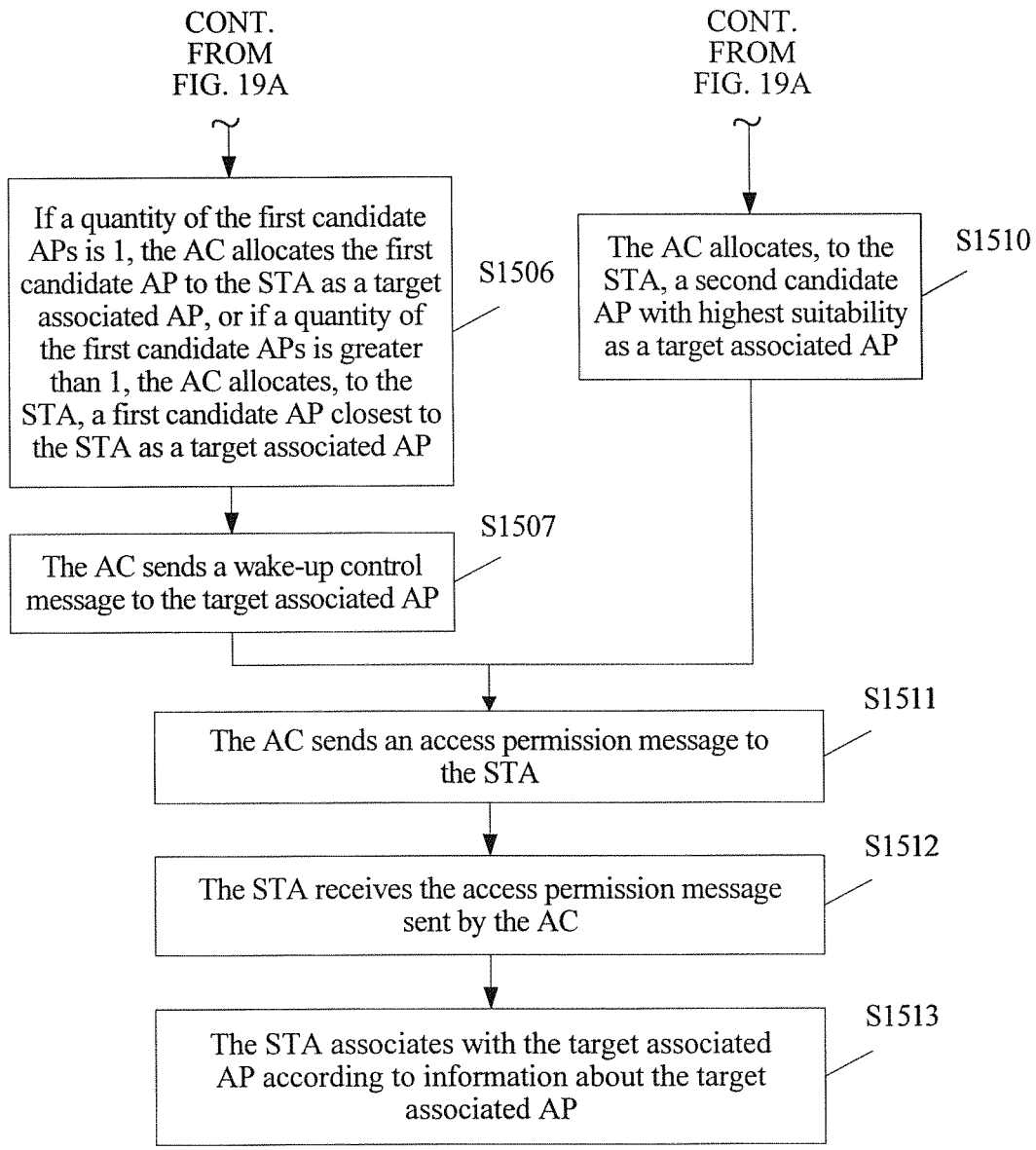

Another embodiment of the present invention provides an AP wake-up method. As shown in FIG. 19A and FIG. 19B, the method may include the following steps:

S1501. A STA sends an access request message to an AC.

The access request message may include a unique ID of the STA and a list of associable APs for the STA, or may include a unique ID of the STA, location information of the STA, and a list of associable APs for the STA. The list of associable APs for the STA may include unique IDs of the associable APs for the STA and signal quality of beacon frames from the associable APs for the STA to the STA.

Further optionally, the access request message may further include QoS requirement information of the STA, where the QoS requirement information of the STA may include an average communication rate expected by the STA.

S1502. The AC receives the access request message sent by the STA.

After receiving the access request message sent by the STA, the AC may determine whether the list of associable APs for the STA included in the access request message is null. If the list of associable APs for the STA included in the access request message is not null, a target AP may be allocated from the list of associable APs for the STA to the STA. If the list of associable APs for the STA included in the access request message is null, step S1503 to step S1513 may be performed.

When the list of associable APs for the STA included in the access request message is not null, the AC may directly allocate, to the STA, any AP from all APs included in the list of associable APs for the STA as a target AP. Further, to ensure that the target AP allocated to the STA can provide a better service for the STA, the AC allocates the target AP from the list of associable APs for the STA to the STA. Specifically, the AC may select, from the list of associable APs for the STA, APs meeting a condition, and allocate a target AP to the STA according to a quantity of the selected APs meeting the condition. Specifically, if the quantity of the APs that meet the condition and are selected by the AC is equal to 1, the AC may directly allocate, to the STA, the AP that meets the condition as a target AP; if the quantity of the APs that meet the condition and are selected by the AC is greater than 1, the AC may calculate, for each AP that meets the condition, according to location information of the AP, load information of the AP, and QoS requirement information of the STA, suitability of the AP that meets the condition, and allocate, to the STA, an AP with highest suitability as a target AP. Certainly, when the quantity of the APs that meet the condition and are selected by the AC is equal to 0, it indicates that, in all the APs included in the list of associable APs for the STA, there is no AP that can provide a better service for the STA. In this case, the AC may attempt to allocate, to the STA, an AP that can provide a better service for the STA, from sleeping APs or all APs managed by the AC or a part of APs managed by the AC. That is, step S1503 to step S1513 may be performed.

When an AP meets at least one of the following conditions, it may be considered that the AP is an AP that meets the condition:

Condition 1: A preset upper threshold for an average throughput of the AP is greater than or equal to a sum of a current average throughput of the AP and the average communication rate expected by the STA. The preset upper threshold for the average throughput of the AP and the current average throughput of the AP may be obtained from an AP local information table managed by the AC.

Condition 2: A current average channel access delay of the AP is shorter than an average channel access delay expected by the STA. The current average channel access delay of the AP may be obtained from the AP local information table managed by the AC.

S1503. The AC determines, according to location information of the STA stored by the AC or carried in the access request message, whether a quantity of sleeping APs managed by the AC and having access ranges covering the STA is 0. If the quantity of the sleeping APs managed by the AC and having access ranges covering the STA is not 0, step S1504 to step S1507 are performed. If the quantity of the sleeping APs managed by the AC and having access ranges covering the STA is 0, step S1508 to step S1510 are performed.

The unique ID of the STA and the location information that is of the STA and is corresponding to the unique ID exist in a STA local information table managed by the AC. When the access request message sent by the STA includes the unique ID of the STA, the AC may obtain, according to the unique ID of the STA, the location information of the STA from the STA local information table managed by the AC, then count the quantity of the sleeping APs managed by the AC and having access ranges covering the STA, and determine whether the counted quantity of the sleeping APs managed by the AC and having access ranges covering the STA is 0. When the access request message sent by the STA includes the location information of the STA, the AC may count, according to the location information of the STA, the quantity of the sleeping APs managed by the AC and having access ranges covering the STA, and determine whether the counted quantity of the sleeping APs managed by the AC and having access ranges covering the STA is 0.

S1504. The AC determines, according to the location information of the STA stored by the AC or carried in the access request message, the sleeping APs managed by the AC and having access ranges covering the STA as first candidate APs.

Further optionally, to ensure that a target AP allocated from the first candidate APs to the STA can provide a better service for the STA, after the AC determines, according to the location information of the STA stored by the AC or carried in the access request message, the sleeping APs managed by the AC and having access ranges covering the STA as the first candidate APs, step S1505 may be performed.

S1505. The AC selects a first candidate AP that meets the following condition: a preset upper threshold for an average throughput of the first candidate AP is greater than or equal to an average communication rate expected by the STA.

The AP local information table managed by the AC includes the preset upper threshold for the average throughput of the AP. When the access request message includes the average communication rate expected by the STA, after the AC determines, according to the location information of the STA, the sleeping APs managed by the AC and having access ranges covering the STA as the first candidate APs, the AC first obtains, according to the managed AP local information table, preset upper thresholds for average throughputs of the determined first candidate APs, and then selects an AP whose preset upper threshold for an average throughput is greater than or equal to the average communication rate expected by the STA, as the first candidate AP that meets the condition.

In this embodiment, the AC screens out, from the first candidate APs, the first candidate AP that meets the foregoing condition, so that the first candidate AP may meet the QoS requirement information of the STA. Step S1505 is an optional step. The AC may skip this step and directly allocate the target AP from the first candidate APs to the STA.

S1506. If a quantity of the first candidate APs is 1, the AC allocates the first candidate AP to the STA as a target AP, or if a quantity of the first candidate APs is greater than 1, the AC allocates, to the STA, a first candidate AP closest to the STA as a target AP.

Specifically, if the quantity of the first candidate APs that meet the condition is 1, the AC directly allocates the first candidate AP to the STA as a target AP, or if the quantity of the first candidate APs that meet the condition is greater than 1, the AC allocates, to the STA, the first candidate AP closest to the STA as a target AP.

S1507. The AC sends a wake-up control message to the target AP.

After the AC allocates, to the STA, the target AP from the first candidate APs that meet the condition, the AC may send the wake-up control message to the target AP, where the wake-up control message is used to cause the AP to enter an active state.

S1508. The AC determines second candidate APs.

When the quantity of the first candidate APs is 0, it indicates that the AC cannot find an appropriate target AP for the STA from the sleeping APs managed by the AC and having access ranges covering the STA. In this case, the AC needs to expand a search range, and search for an appropriate target AP for the STA in all or a part of APs that are managed by the AC and whose distances from the STA are within a preset range.

The second candidate APs include all or the part of APs that are managed by the AC and whose distances from the STA are within the preset range. When the second candidate APs include all or the part of APs that are managed by the AC and whose distances from the STA are within the preset range, for example, the AC may determine, according to the location information of the STA, by using the STA as a center and the preset range as a radius, all or the part of APs within the preset range as the second candidate APs. After the AC determines all or the part of APs within the preset range as the second candidate APs, the AC may directly select any AP from the second candidate APs, and allocate the AP to the STA as a target AP. Certainly, after the AC determines the second candidate APs, to ensure that the target AP allocated from the second candidate APs to the STA can provide a better service for the STA, further optionally, the AC may select a second candidate AP that meets at least one of the following conditions, and use the second candidate AP that meets the condition as a finally determined second candidate AP.

Condition 1: A preset upper threshold for an average throughput of the second candidate AP is greater than or equal to a sum of a current average throughput of the second candidate AP and the average communication rate expected by the STA. The preset upper threshold for the average throughput of the second candidate AP and the current average throughput of the second candidate AP may be obtained from the AP local information table managed by the AC.

Condition 2: A current average channel access delay of the second candidate AP is shorter than an average channel access delay expected by the STA. The current average channel access delay of the second candidate AP may be obtained from the AP local information table managed by the AC.

If the second candidate AP that meets the condition does not exist in the second candidate APs, the AC may expand the preset range, and then select, from the expanded preset range, the second candidate AP that meets the condition, until the second candidate AP is determined.

Certainly, the second candidate APs may also include all the APs managed by the AC. When the second candidate APs include all the APs managed by the AC, after the AC determines the second candidate APs, the AC may directly select any AP from the second candidate APs, and allocate the AP to the STA as a target AP. To ensure that the target AP allocated from the second candidate APs to the STA can provide a better service for the STA, further optionally, the AC may also select a second candidate AP that meets at least one of the foregoing conditions as a finally determined second candidate AP.

S1509. The AC calculates suitability of each second candidate AP according to location information of each second candidate AP, load information of each second candidate AP, and QoS requirement information of the STA.

The suitability of the second candidate AP is inversely proportional to a distance between the second candidate AP and the STA, and the suitability of the second candidate AP is inversely proportional to load of the second candidate AP. That is, if the distance between the second candidate AP and the STA is shorter, and the load of the second candidate AP is lighter, the suitability of the second candidate AP is higher; otherwise, if the distance between the second candidate AP and the STA is longer, and the load of the second candidate AP is heavier, the suitability of the second candidate AP is lower. In addition, a method for calculating the suitability is not limited in this embodiment of the present invention, and an appropriate calculation method may be selected according to a requirement in an actual application scenario.

S1510. The AC allocates, to the STA, a second candidate AP with highest suitability as a target AP.

If the second candidate AP allocated by the AC to the STA as a target AP is a sleeping AP, the AC needs to send a wake-up control message to the target AP, so that the target AP enters the active state.

S1511. The AC sends an access permission message to the STA.

After the AC sends the wake-up control message to the target AP, so that the target AP enters the active state, the AC may send the access permission message to the STA, where the access permission message includes information about the target AP and is used for the STA to associate with the target AP according to the information about the target AP. The information about the target AP includes a BSSID of the target AP, a MAC address of the target AP, and location information of the target AP.

Further optionally, the access permission message may further include a special value, where the special value indicates that, in a current location of the STA, the STA can associate with the target AP.

S1512. The STA receives the access permission message sent by the AC.

S1513. The STA associates with the target AP according to information about the target AP.

After the STA receives the access permission message sent by the AC, if the access permission message includes the information about the target AP, the STA may associate with the target AP according to the information about the target AP. A specific association process may be: when the access permission message includes the special value, the STA can associate, in the current location of the STA, with the target AP according to the BSSID of the target AP, the MAC address of the target AP, and the location information of the target AP that are included in the information about the target AP. When the access permission message does not include the special value, the STA can move to a coverage range of the target AP according to the BSSID of the target AP, the MAC address of the target AP, and the location information of the target AP that are included in the information about the target AP, and then associate with the target AP. If the access permission message does not include any information, the AP wake-up process is terminated.

In the AP wake-up method provided by this embodiment of the present invention, after an AC receives an access request message sent by a STA, when no active AP having an access range covering the STA exists, the AC may determine, from sleeping APs having access ranges covering the STA, a target AP allocated to the STA, and then wake up the target AP and send an access permission message carrying information about the target AP to the STA. In this case, the STA can associate with the target AP according to the information about the target AP. When no active AP having an access range covering the STA exists, the AC can allocate, to the STA according to the access request message sent by the STA, a target AP in the sleeping APs having access ranges covering the STA, and wake up the target AP in time, so that the STA can access a network in time. Therefore, a problem that a STA located in a coverage hole area of a Wi-Fi network cannot access the Wi-Fi network is solved.

In addition, the AC may select, from the sleeping APs according to a QoS requirement of the STA included in the access request message sent by the STA, an AP that meets the QoS requirement of the STA as a target AP for the STA. In addition, if the AC does not determine, from the sleeping APs, a target AP allocated to the STA, the AC may select, from all or a part of APs managed by the AC, an AP that meets the QoS requirement of the STA as a target AP for the STA. In this way, a problem that a STA located in a coverage hole area of a Wi-Fi network cannot access the Wi-Fi network is solved, and a QoS requirement is also ensured after the STA accesses the network.

Figure 20:
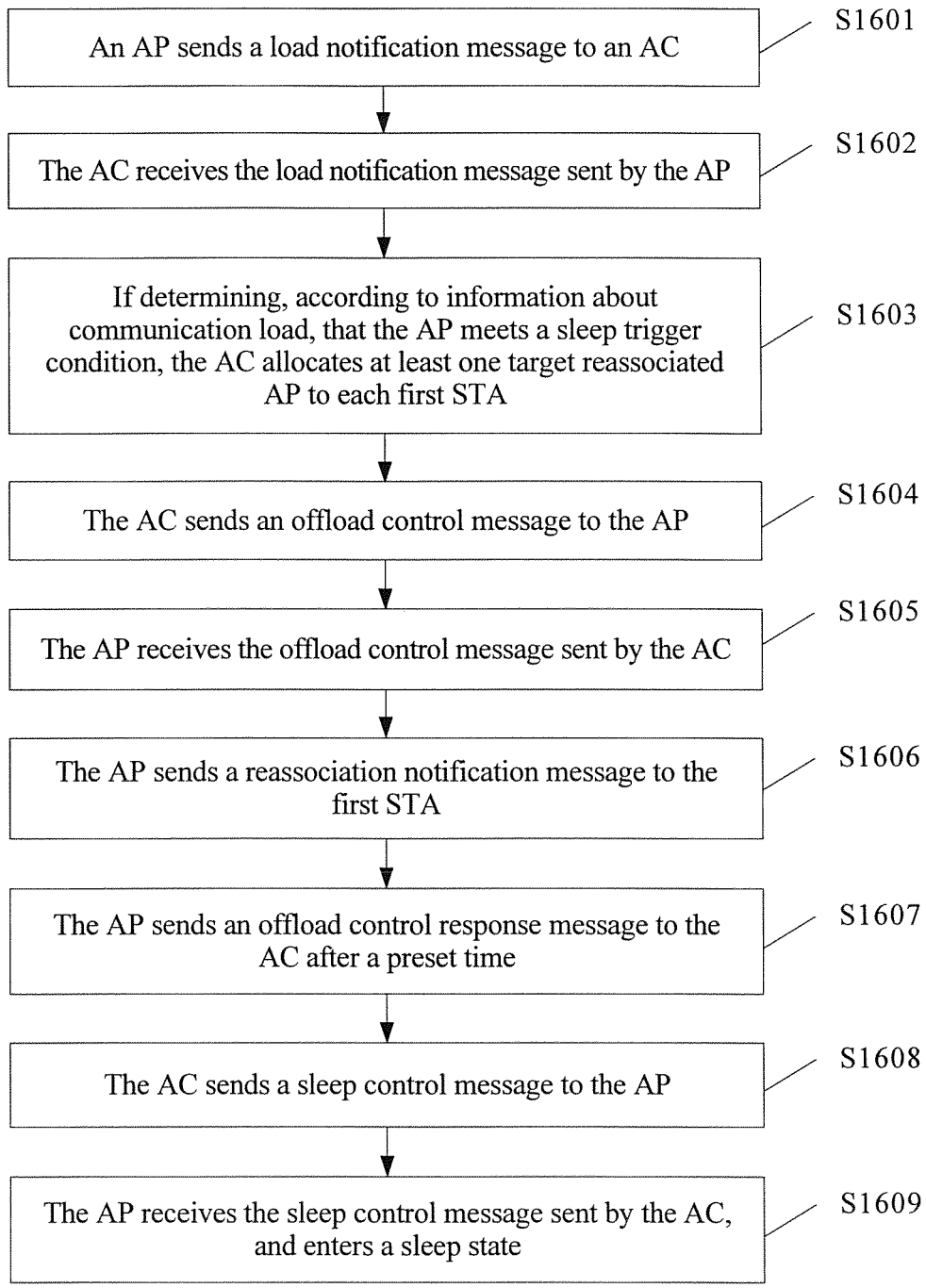
FIG. 20 is a flowchart of an AP sleep method according to another embodiment of the present invention.

Another embodiment of the present invention provides an AP sleep method. As shown in FIG. 20, the method may include the following steps:

S1601. An AP sends a load notification message to an AC.

The load notification message includes information about communication load between the AP and first stations STAs, where the first STAs are STAs currently associated with the AP. The information about the communication load may include identity information of the first STAs, and may further include average communication rates between the first STAs and the AP.

S1602. The AC receives the load notification message sent by the AP.

After the AC receives the load notification message sent by the AP, the AC may first determine whether the information about the communication load includes the identity information of the first STAs. If the information about the communication load does not include the identity information of the first STAs, the AC may directly send a sleep control message to the AP, so that the AP enters a sleep state, and the AC terminates a sleep control process. If the information about the communication load includes the identity information of the first STAs, the AC may perform the following steps S1603 to S1609.

S1603. If determining, according to information about communication load, that the AP meets a sleep trigger condition, the AC allocates at least one target AP to each first STA.

After receiving the load notification message sent by the AP, the AC may determine, according to the information about the communication load in the load notification message sent by the AP, whether the AP meets the sleep trigger condition, and allocate the at least one target AP to each first STA when determining that the AP meets the sleep trigger condition.

The sleep trigger condition of the AP may be that an average throughput of the AP within a preset time is less than a preset lower threshold for the average throughput of the AP. The average throughput of the AP within the preset time refers to an average communication rate of the AP within the preset time, and a numeric value of the average throughput is equal to a sum of average communication rates of all STAs associated with the AP.

It should be noted that, the sleep trigger condition is only an example illustrated in this embodiment, and is not limited in this embodiment. Any condition for determining that the AP should sleep may be applied to this embodiment.

When the AC determines that the AP meets the sleep trigger condition, that the AC allocates at least one target AP to each first STA in step S1603 may include the following steps S1603a1 to S1603a4.

S1603a1. The AC determines that all active APs managed by the AC and having access ranges covering at least one of the first STAs, except the AP, are candidate APs.

The AC may determine, according to location information in a STA local information table and an AP local information table that are locally maintained, that all the active APs managed by the AC and having access ranges covering the at least one of the first STAs, except the AP, are the candidate APs. If a quantity of the determined candidate APs is 0, the sleep control process is terminated; or if a quantity of the determined candidate APs is greater than 0, step S1603a2 to step S1603a4 may be performed.

S1603a2. If a quantity of the candidate APs is 1, the AC determines that the candidate AP is a target AP for all the first STAs.

S1603a3. If the quantity of the candidate APs is greater than 1, the AC calculates suitability of each candidate AP according to location information of each candidate AP, load information of each candidate AP, and QoS requirement information of one of the first STAs.

The location information and the load information of the candidate AP may be obtained from the AP local information table managed by the AC, and the QoS requirement information of the first STA may be obtained from the STA local information table managed by the AC. The QoS requirement information of the first STA may include at least one of an average communication rate expected by the first STA or an average channel access delay expected by the first STA.

To ensure that a target AP allocated from the candidate APs to a corresponding first STA can provide a better service for the first STA, further optionally, before performing step S1603a3 in which the AC calculates the suitability of each candidate AP according to the location information of each candidate AP, the load information of each candidate AP, and the QoS requirement information of one of the first STAs, the AC may select a candidate AP that meets at least one of the following conditions, and then calculate the suitability of each candidate AP according to the location information of each candidate AP, the load information of each candidate AP, and the QoS requirement information of one of the first STAs.

Condition 1: A preset upper threshold for an average throughput of the candidate AP is greater than or equal to a sum of a current average throughput of the candidate AP, a Sum, and an average communication rate expected by the corresponding first STA, where the Sum is a sum of average communication rates expected by all first STAs preassociated with the candidate AP. The preset upper threshold for the average throughput of the candidate AP and the current average throughput of the candidate AP may be obtained from the AP local information table managed by the AC, and the average communication rate expected by the first STA may be obtained from the STA local information table managed by the AC.

Condition 2: A current average channel access delay of the candidate AP is shorter than an average channel access delay expected by the first STA. The current average channel access delay of the candidate AP may be obtained from the AP local information table managed by the AC, and the average channel access delay expected by the first STA may be obtained from the STA local information table managed by the AC.

Certainly, after performing step S1603a1 in which the AC determines that all the active APs managed by the AC and having access ranges covering the at least one of the first STAs, except the AP, are the candidate APs, the AC may also select, from the determined candidate APs, candidate APs that meet a condition, and then when a quantity of the selected candidate APs that meet the condition is 1, directly determine that the candidate AP is a target AP for all the first STAs, or when a quantity of the selected candidate APs that meet the condition is greater than 1, for the candidate APs that meet the condition, calculate the suitability of each candidate AP according to the location information of each candidate AP, the load information of each candidate AP, and the QoS requirement information of one of the first STAs.

S1603a4. The AC allocates, to a corresponding first STA, a candidate AP with highest suitability as a target AP.

The suitability of the candidate AP is inversely proportional to a distance between the candidate AP and the corresponding first STA; and the suitability of the candidate AP is inversely proportional to load of the candidate AP. For example, if the distance between the candidate AP and the corresponding first STA is shorter, and the load of the candidate AP is lighter, the suitability of the candidate AP is higher; otherwise, if the distance between the candidate AP and the corresponding first STA is longer, and the load of the candidate AP is heavier, the suitability of the candidate AP is lower.

After steps S1603a3 and S1603a4 are performed, that is, a target AP is allocated to one of the first STAs, steps S1603a3 and S1603a4 may be performed repeatedly, so that a target AP is allocated to each first STA currently associated with the AP, and step S1604 is performed after the target AP is allocated to each first STA currently associated with the AP.

S1604. The AC sends an offload control message to the AP.

The offload control message includes information about the target AP allocated by the AC to all the first STAs associated with the AP, and the offload control message is used for each first STA associated with the AP to associate with the corresponding target AP according to the information about the corresponding target AP.

S1605. The AP receives the offload control message sent by the AC.

S1606. The AP sends a reassociation notification message to the first STA.

The reassociation notification message includes the information about the target AP, and the reassociation notification message is used to notify the first STA to associate with the target AP according to the information about the target AP. After the AP receives the offload control message sent by the AC, for each first STA, the AP may send, to the first STA, according to the information included in the offload control message about the target AP allocated by the AC to all the first STAs associated with the AP, a reassociation notification message that includes the information about the target AP allocated by the AC to the first STA, so that the first STA associates with the target AP according to the information about the target AP. In addition, after sending a reassociation notification message to all the first STAs associated with the AP, the AP may perform step S1607.

S1607. The AP sends an offload control response message to the AC after a preset time.

The offload control response message includes identity information of a first STA currently associated with the AP. After the preset time, the AP first detects the first STA currently associated with the AP, and sends the offload control response message carrying the identity information of the detected first STA to the AC. In this case, the AC can determine, according to the identity information of the first STA included in the received offload control response message, whether the AP needs to be controlled to enter the sleep state. If the AC detects that the offload control response message sent by the AP does not include identity information of any first STA currently associated with the AP, steps S1608 and S1609 may be performed. If the AC detects that the offload control response message sent by the AP includes identity information of at least one STA currently associated with the AP, the sleep control process of the AP is terminated.

S1608. The AC sends a sleep control message to the AP.

The sleep control message is used to cause the AP to enter the sleep state.

S1609. The AP receives the sleep control message sent by the AC, and enters a sleep state.

In the AP sleep method provided by this embodiment of the present invention, after an AC determines, according to information about communication load in a received load notification message sent by an AP, that the AP meets a sleep trigger condition, the AC first allocates a target AP to each first STA currently associated with the AP, and after each first STA is associated with the target AP, sends a sleep control message to the AP, so as to instruct the AP to enter a sleep state. After determining that the AP meets the sleep trigger condition, the AC first allocates the target AP to each first STA currently associated with the AP, and after each first STA is associated with the target AP, controls the AP to enter the sleep state. This not only solves a resource waste problem when load of the AP is light, but also ensures that a service of each first STA can be continued normally after the AP enters the sleep state.

In addition, when allocating the target AP to each first STA currently associated with the AP, the AC selects, from active APs according to a stored QoS requirement of the first STA, an AP that meets the QoS requirement of the first STA and has highest suitability as a target AP. This further ensures the QoS requirement of each first STA after the AP enters the sleep state.

Figure 21:
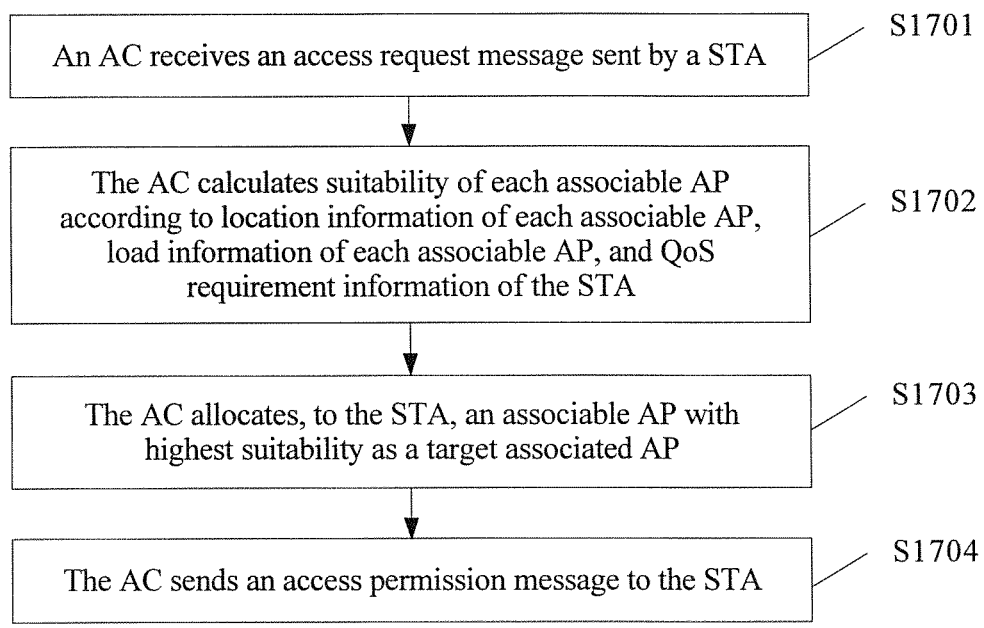
FIG. 21 is a flowchart of an AP selection method according to another embodiment of the present invention.

Another embodiment of the present invention provides an AP selection method. As shown in FIG. 21, the method may include the following steps:

S1701. An AC receives an access request message sent by a STA.

The access request message includes associable APs scanned by the STA and QoS requirement information of the STA.

S1702. The AC calculates suitability of each associable AP according to location information of each associable AP, load information of each associable AP, and QoS requirement information of the STA.

The suitability of the associable AP is inversely proportional to a distance between the associable AP and the STA; and the suitability of the associable AP is inversely proportional to load of the associable AP. The location information and the load information of the associable AP may be obtained from an AP local information table managed by the AC, and the QoS requirement information of the STA may be obtained from a STA local information table managed by the AC. The QoS requirement information of the STA may include at least one of an average communication rate expected by the STA or an average channel access delay expected by the STA.

To ensure that a target AP allocated from the associable APs to the STA can provide a better service for the STA, further optionally, before performing step S1702 in which the AC calculates the suitability of each associable AP according to the location information of each associable AP, the load information of each associable AP, and the QoS requirement information of the STA, the AC may select an associable AP meeting at least one of the following conditions, and then calculate the suitability of each associable AP according to the location information of each associable AP, the load information of each associable AP, and the QoS requirement information of the STA:

Condition 1: A preset upper threshold for an average throughput of the associable AP is greater than or equal to a sum of a current average throughput of the associable AP and the average communication rate expected by the STA. The preset upper threshold for the average throughput of the associable AP and the current average throughput of the associable AP may be obtained from the AP local information table managed by the AC.

Condition 2: A current average channel access delay of the associable AP is shorter than the average channel access delay expected by the STA. The current average channel access delay of the associable AP may be obtained from the AP local information table managed by the AC.

S1703. The AC allocates, to the STA, an associable AP with highest suitability as a target AP.

S1704. The AC sends an access permission message to the STA.

The access permission message includes information about the target AP, where the information about the target AP includes a BSSID of the target AP, a MAC address of the target AP, and location information of the target AP, and the access permission message is used for the STA to associate with the target AP according to the information about the target AP.

Further optionally, the access permission message may further include a special value, where the special value indicates that, in a current location of the STA, the STA can associate with the target AP.

A specific association process in which the STA associates with the target AP according to the information about the target AP after the STA receives the access permission message is: when the access permission message includes the special value, the STA can associate, in the current location of the STA, with the target AP according to the BSSID of the target AP, the MAC address of the target AP, and the location information of the target AP that are included in the information about the target AP. When the access permission message does not include the special value, the STA can move to a coverage range of the target AP according to the BSSID of the target AP, the MAC address of the target AP, and the location information of the target AP that are included in the information about the target AP, and then associate with the target AP.

In the AP selection method provided by this embodiment of the present invention, for associable APs scanned by a STA and included in an access request message sent by the STA, an AC first calculates suitability of each associable AP according to location information of each associable AP, load information of each associable AP, and QoS requirement information of the STA, allocates, to the STA, an associable AP with highest suitability that is obtained through calculation as a target AP, and then sends an access permission message carrying information about the target AP to the STA, so as to instruct the STA to associate with the target AP according to the target AP. In the AP selection process, because the target AP allocated by the AC to the STA is obtained through calculation according to the location information of each associable AP, the load information of each associable AP, and the QoS requirement information of the STA, and is the AP with the highest suitability and allocated to the STA, a QoS requirement of the STA may be ensured after the STA accesses the target AP.

Figure 22A:
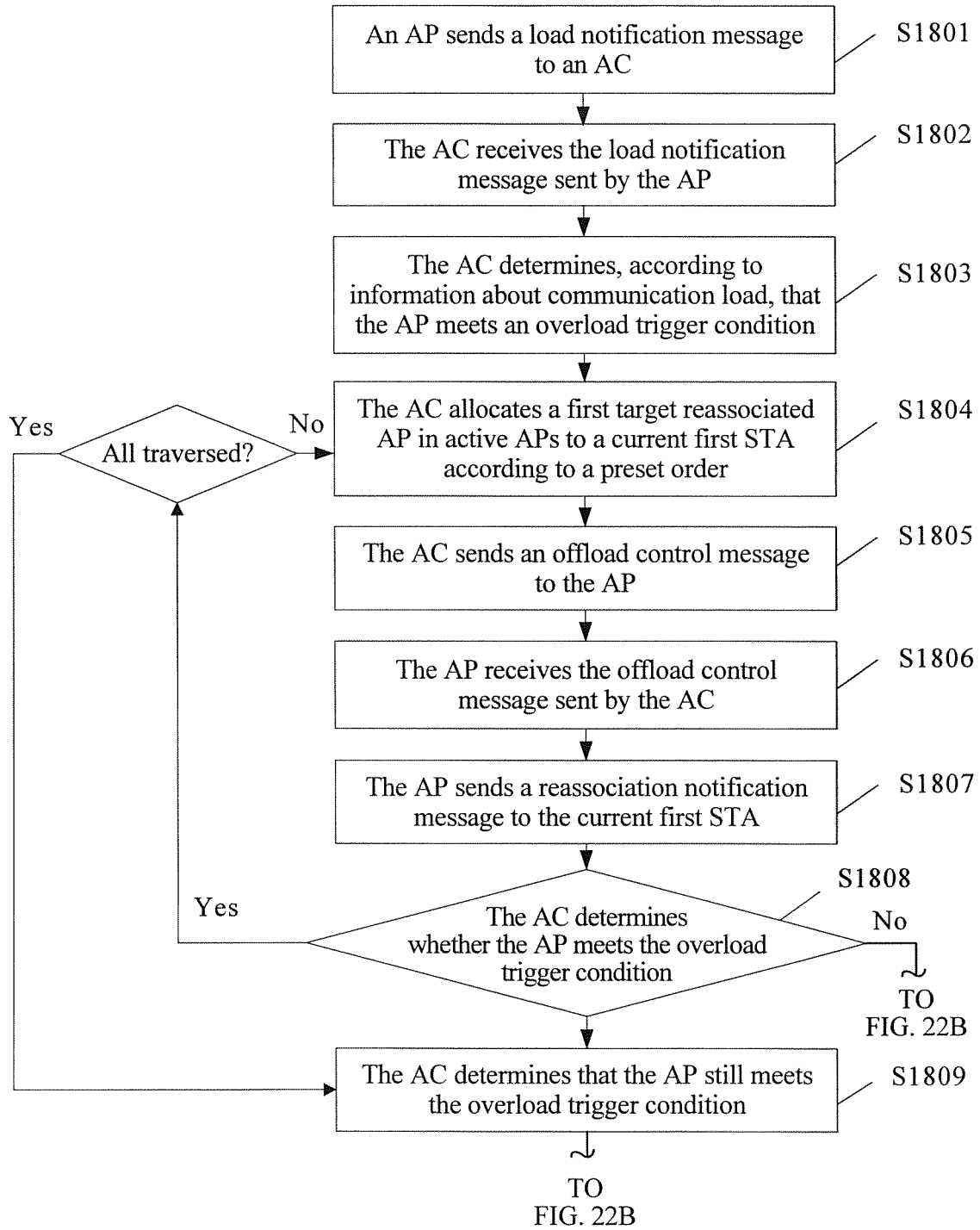
FIG. 22A and FIG. 22B are a flowchart of an overload control method according to another embodiment of the present invention.
Figure 22B:
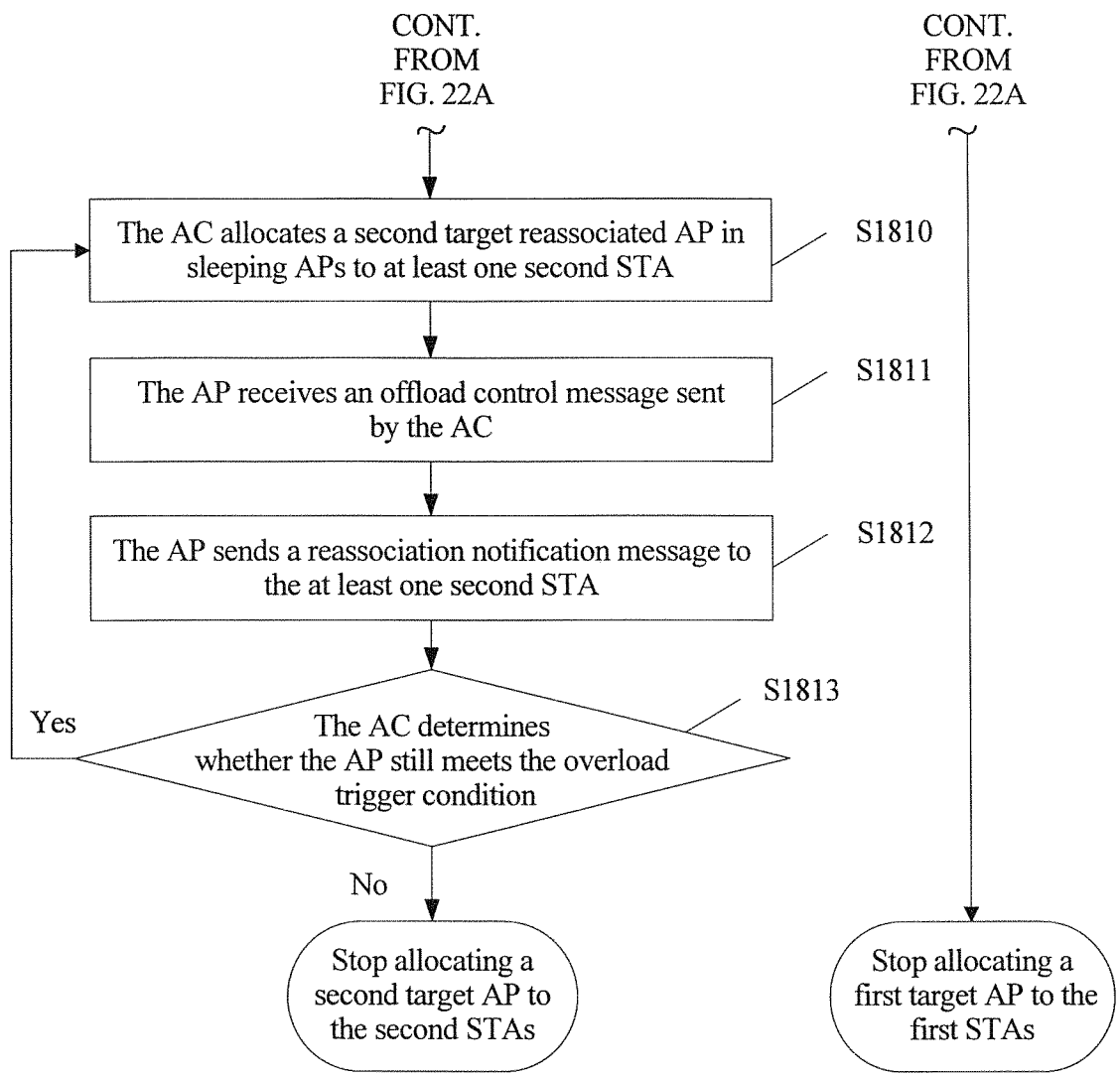

Another embodiment of the present invention provides an overload control method. As shown in FIG. 22A and FIG. 22B, the method may include the following steps:

S1801. An AP sends a load notification message to an AC.

The load notification message includes information about communication load between the AP and first stations STAs, where the first STAs are STAs currently associated with the AP.

S1802. The AC receives the load notification message sent by the AP.

S1803. The AC determines, according to information about communication load, that the AP meets an overload trigger condition.

The information about the communication load in the load notification message sent by the AP may include information about average communication rates between the AP and the currently associated first STAs and average channel access delays of the first STAs currently associated with the AP. The overload trigger condition of the AP may be at least one of the following conditions:

Condition 1: An average throughput of the AP within a preset time is greater than a preset upper threshold for the average throughput of the AP. The average throughput of the AP within the preset time refers to an average communication rate of the AP (for the AP, the throughput of the AP refers to received traffic generated from each STA associated with the AP to the AP and sent traffic generated from the AP to each STA associated with the AP) within the preset time, and a numeric value of the average throughput is equal to a sum of the average communication rates of all the first STAs associated with the AP. The preset upper threshold for the average throughput of the AP may be obtained from an AP local information table managed by the AC.

Condition 2: An average channel access delay of the AP is greater than a preset delay threshold. A numeric value of the average channel access delay of the AP may be equal to an average value of access delays of all the first STAs associated with the AP. The preset delay threshold of the AP may be obtained from the AP local information table managed by the AC.

It should be noted that, the overload trigger condition is only an example illustrated in this embodiment, and is not limited in this embodiment. Any condition for determining that the AP is overloaded may be applied to this embodiment.

After determining that the AP meets the overload trigger condition, for all the first STAs associated with the AP, the AC allocates a first target AP in active APs to the first STAs one by one according to a preset order. The preset order may be a descending order of distances from the first STAs to the AP. That the AC allocates a first target AP in active APs to the first STAs one by one according to a preset order may specifically include the following steps.

S1804. The AC allocates a first target AP in active APs to a current first STA according to a preset order.

Specifically, that the AC allocates a first target AP in active APs to the current first STA according to a preset order may include steps S1804a1 and S1804a2.

S1804a1. The AC determines candidate APs corresponding to the current first STA.

The candidate APs include all active APs managed by the AC and having access ranges covering the current first STA, except the AP.

S1804a2. The AC allocates, to the current first STA, a candidate AP meeting a preset condition as a first target AP.

The AC may allocate, to the current first STA, a candidate AP meeting at least one of the following preset conditions as a first target AP:

Condition 1: A preset upper threshold for an average throughput of the candidate AP is greater than or equal to a sum of a current average throughput of the candidate AP and an average communication rate expected by the current first STA. The preset upper threshold for the average throughput of the candidate AP and the current average throughput of the candidate AP may be obtained from the AP local information table managed by the AC. The average communication rate expected by the current first STA may be obtained from a STA local information table managed by the AC.

Condition 2: A current average channel access delay of the candidate AP is shorter than or equal to an average channel access delay expected by the current first STA. The current average channel access delay of the candidate AP may be obtained from the AP local information table managed by the AC. The average channel access delay expected by the current first STA may be obtained from the STA local information table managed by the AC.

S1805. The AC sends an offload control message to the AP.

The offload control message includes information about the first target AP, and the offload control message is used for the AP to notify the current first STA to associate with the first target AP according to the information about the first target AP.

S1806. The AP receives the offload control message sent by the AC.

S1807. The AP sends a reassociation notification message to the current first STA.

The reassociation notification message includes the information about the first target AP allocated to the first STA, and the reassociation notification message is used for the current first STA to associate with the first target AP according to the information about the first target AP. After the current first STA receives the reassociation notification message sent by the AP, the current first STA can associate with the first target AP according to the information about the first target AP included in the reassociation notification message.

After the AC allocates the first target AP in the active APs to the current first STA, and sends the offload control message to the AP, step S1808 may be performed.

S1808. The AC determines whether the AP meets the overload trigger condition, and if yes, continues to allocate a first target AP in the active APs to a next first STA, that is, steps S1804 to S1807 are performed repeatedly, until all the first STAs associated with the AP are traversed. After a first target AP in the active APs is allocated to all the first STAs associated with the AP, and the first target AP is allocated to all the first STAs, step S1809 is performed. Otherwise, the AC stops allocating a first target AP to the first STAs or terminates the overload control method.

S1809. The AC determines that the AP still meets the overload trigger condition.

After the AC allocates a first target AP in all the active APs to all the first STAs, if the AC does not successfully allocate a first target AP in the active APs to all or a part of the first STAs and the AC determines that the AP still meets the overload trigger condition, it indicates that the AP is not caused to exit an overload state after the AC allocates the first target AP to all the first STAs and the first STAs that are allocated the first target AP are associated with the corresponding first target AP. In this case, the AC needs to select an appropriate AP from nearby sleeping APs and associate the first STAs that are not successfully associated with the first target AP, with the AP that is waked up, so that the AP exits the overload state. A specific process may be the following steps S1810 to S1813.

S1810. The AC allocates a second target AP in sleeping APs to at least one second STA.

The second STA is a first STA that is not successfully associated with the first target AP, and the at least one second STA is a first STA that may be offloaded to the second target AP, that is, a first STA covered by an access range of the second target AP.

Specifically, that the AC allocates a second target AP in sleeping APs to at least one second STA may include steps S1810a1 to S1810a4.

S1810a1. The AC calculates suitability of each sleeping AP.

The suitability of the sleeping AP is proportional to offloadable traffic after the sleeping AP enters an active state, and the suitability of the sleeping AP is proportional to integrated communication quality between the sleeping AP and the at least one second STA.

Specifically, that the suitability of the sleeping AP is proportional to offloadable traffic after the sleeping AP enters an active state, and the suitability of the sleeping AP is proportional to integrated communication quality between the sleeping AP and the at least one second STA may include:

offloadable traffic after an $AP_i$ enters the $$\text{active state} = \sum_{STA \in \{Set\_Pending \cap Set\_Coverage(AP_i)\}}$$

average communication rate expected by the second STA; and integrated communication quality between the $AP_i$ and the second $$STA = \sum_{STA \in \{Set\_Pending \cap Set\_Coverage(AP_i)\}} \frac{1}{Dist(AP_i, STA)^n};$$

where the APi is one of the sleeping APs, the Set_Pending is a set of the second STAs, and the Set_Coverage(APi) is a set of STAs covered by an access range of the APi.

As can be seen from the foregoing formula, the offloadable traffic after the sleeping AP enters the active state is equal to a sum of the average communication rate expected by the at least one second STA; the integrated communication quality between the sleeping AP and the at least one second STA is inversely proportional to the distance between the sleeping AP and the at least one second STA, where a value of n may be a corresponding value selected according to a radio environment change. When the STA is within a line-of-sight range of the APi, n may be 2. When the STA is not within the line-of-sight range of the APi, n may be any one of 3, 4, or 5. Specifically, when an environment of a radio channel is relatively poor, n may be a relatively large value (for example, n may be 5), and when an environment of a radio channel is relatively good, n may be a relatively small value (for example, n may be 3).

S1810a2. The AC allocates, to the at least one second STA, a sleeping AP with highest suitability as a second target AP.

S1810a3. The AC sends a wake-up control message to the currently allocated second target AP.

The wake-up control message is used to cause the currently allocated second target AP to enter the active state.

S1810a4. The AC sends an offload control message to the AP.

The offload control message includes information about the currently allocated second target AP, and the offload control message is used for the AP to notify the corresponding second STA to associate with the currently allocated second target AP according to the information about the currently allocated second target AP.

S1811. The AP receives an offload control message sent by the AC.

S1812. The AP sends a reassociation notification message to the at least one second STA.

After receiving the offload control message sent by the AC, the AP sends the reassociation notification message to the currently associated corresponding second STA, to instruct the corresponding second STA to associate with the second target AP. The reassociation notification message includes the information about the second target AP that is allocated to the corresponding second STA currently associated with the AP.

S1813. The AC determines whether the AP still meets the overload trigger condition.

After allocating the second target AP to the at least one second STA, the AC determines whether the AP still meets the overload trigger condition, and if yes, continues to allocate a second target AP to other second STAs, or if no, stops allocating a second target AP to the second STAs or terminates the overload control method.

The other second STAs are all STAs except the at least one second STA in the second STAs currently associated with the AP. After the AC allocates the second target AP to the at least one second STA and still determines that the AP meets the overload trigger condition, the AC needs to continue to allocate a second target AP to at least one second STA in the other second STAs, that is, steps S1810 to S1813 are performed repeatedly, until the AP exits the overload state.

In the overload control method provided by this embodiment of the present invention, after an AC determines, according to information about communication load in a received load notification message sent by an AP, that the AP meets an overload trigger condition, the AC allocates, one by one according to a preset order, a first target AP in active APs to first STAs associated with the AP, and sends an offload control message carrying information about the allocated first target AP to the AP, so that the AP instructs the first STAs to associate with the first target AP, thereby achieving an objective of mitigating overload of the AP. After determining that the AP meets the overload trigger condition, the AC does not share load (the first STAs associated with the AP) of the AP by waking up a sleeping AP having an access range covering the first STAs associated with the AP, but allocates a first target AP in the active APs to the first STAs, and instructs the first STAs to associate with the first target AP, to share the load of the AP. Therefore, resources of an existing Wi-Fi network can be fully used, and the AP exits an overload state. This not only improves utilization of active APs in the Wi-Fi network, but also avoids a power waste problem caused by too light load after a sleeping AP is waked up.

In addition, after a current first STA is associated with a first target AP allocated by the AC to the current first STA, if the AC determines that the AP still meets the overload trigger condition, the AC allocates a first target AP to a next first STA, so that the AP instructs the first STA to associate with the first target AP. If the AC does not successfully allocate a first target AP to all or a part of the first STAs, and the AC determines that the AP still meets the overload trigger condition, the AC needs to wake up a sleeping AP and allocate the sleeping AP as a second target AP to a second STA, so that the second STA is associated with the second target AP, and that the AP exits the overload state. When allocating a target AP to a STA currently associated with the AP, the AC selects, according to a stored QoS requirement of the STA, an AP that meets the QoS requirement of the first STA and has highest suitability as a target AP. This ensures the QoS requirement of the STA associated with the AP.

Figure 23:
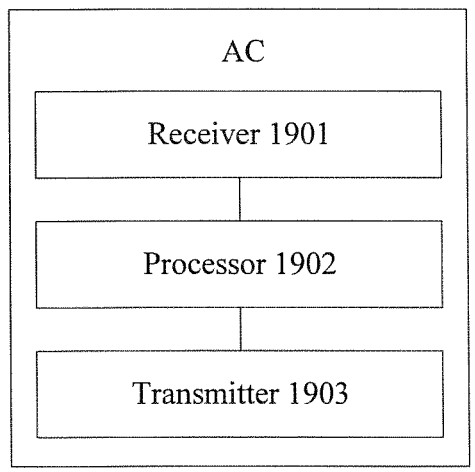
FIG. 23 is a schematic structural diagram of an AC according to another embodiment of the present invention.

Another embodiment of the present invention provides an AC. As shown in FIG. 23, the AC may include a receiver 1901, a processor 1902, and a transmitter 1903.

The receiver 1901 is configured to receive an access request message sent by a station STA.

The processor 1902 is configured to determine, according to location information of the STA stored by the AC or carried in the access request message received by the receiver 191, sleeping APs managed by the AC and having access ranges covering the STA as first candidate APs, and allocate the first candidate AP to the STA as a target AP if a quantity of the first candidate APs is 1, or allocate, to the STA, a first candidate AP closest to the STA as a target AP if a quantity of the first candidate APs is greater than 1.

The transmitter 1903 is configured to send a wake-up control message to the target AP, where the wake-up control message is used to cause the target AP to enter an active state; and send an access permission message to the STA, where the access permission message includes information about the target AP, and the access permission message is used for the STA to associate with the target AP according to the information about the target AP.

Further optionally, the access request message further includes quality of service QoS requirement information of the STA, where the QoS requirement information of the STA includes an average communication rate expected by the STA.

The processor 1902 is further configured to select, after determining, according to the location information of the STA stored by the AC or carried in the access request message, the sleeping APs managed by the AC and having access ranges covering the STA as the first candidate APs, a first candidate AP that meets the following condition:

a preset upper threshold for an average throughput of the first candidate AP is greater than or equal to the average communication rate expected by the STA.

The AC further screens out, from a range of first candidate APs by using the processor 1902 of the AC, the first candidate AP that meets the foregoing condition, so that the first candidate AP may meet the QoS requirement information of the STA.

Further optionally, the access permission message further includes a special value, where the special value indicates that, in a current location of the STA, the STA can associate with the target AP. In the current location of the STA without moving, the STA can directly associate with the target AP after determining that the access permission message includes the special value.

Further optionally, if the quantity of the first candidate APs is 0, the processor 1902 is further configured to determine second candidate APs, where the second candidate APs include all or a part of APs that are managed by the AC and whose distances from the STA are within a preset range; then calculate suitability of each second candidate AP according to location information of each second candidate AP, load information of each second candidate AP, and the QoS requirement information of the STA; and allocate, to the STA, a second candidate AP with highest suitability as a target AP.

Further optionally, the processor 1902 is further configured to select, before calculating the suitability of each second candidate AP, a second candidate AP that meets at least one of the following conditions:

condition 1: a preset upper threshold for an average throughput of the second candidate AP is greater than or equal to a sum of a current average throughput of the second candidate AP and the average communication rate expected by the STA; or condition 2: a current average channel access delay of the second candidate AP is shorter than an average channel access delay expected by the STA.

The AC further screens out, from a range of second candidate APs by using the processor 1902 of the AC, a second candidate AP that meets at least one of the condition 1 or the condition 2, so that the second candidate AP may meet the QoS requirement information of the STA.

Further optionally, the information about the target AP includes a basic service set identifier BSSID of the target AP, a Media Access Control MAC address of the target AP, and location information of the target AP.

After the AC provided by this embodiment of the present invention receives an access request message sent by a STA, when no active AP having an access range covering the STA exists, the AC may determine, from sleeping APs having access ranges covering the STA, a target AP allocated to the STA, and then wake up the target AP and send an access permission message carrying information about the target AP to the STA. In this case, the STA can associate with the target AP according to the information about the target AP. When no active AP having an access range covering the STA exists, the AC can allocate, to the STA according to the access request message sent by the STA, a target AP in the sleeping APs having access ranges covering the STA, and wake up the target AP in time, so that the STA can access a network in time. Therefore, a problem that a STA located in a coverage hole area of a Wi-Fi network cannot access the Wi-Fi network is solved.

In addition, the AC may select, from the sleeping APs according to a QoS requirement of the STA included in the access request message sent by the STA, an AP that meets the QoS requirement of the STA as a target AP for the STA. In addition, if the AC does not determine, from the sleeping APs, a target AP allocated to the STA, the AC may select, from all or a part of APs managed by the AC, an AP that meets the QoS requirement of the STA as a target AP for the STA. In this way, a problem that a STA located in a coverage hole area of a Wi-Fi network cannot access the Wi-Fi network is solved, and a QoS requirement is also ensured after the STA accesses the network.

In the foregoing embodiment, each record in an AP local information table managed by the AC may include the following key information:

a unique ID of an AP, a MAC address of the AP, a BSSID of the AP, location information of the AP, communication coverage area information of the AP, a preset upper threshold for an average throughput of the AP, a preset lower threshold for the average throughput of the AP, a preset delay threshold of the AP, a current running status of the AP (active or sleep), an ID set of STAs currently associated with the AP, a current average throughput of the AP, and a current average channel access delay of the AP.

The AC may update, in real time according to the load notification message sent by the AP, key information of the corresponding record in the AP local information table managed by the AC.

Each record in a STA local information table managed by the AC may include the following key information:

a unique ID of a STA, location information of the STA, a QoS requirement of the STA (an average communication rate expected by the STA and an average channel access delay expected by the STA), and current running parameters of the STA (a current average communication rate of the STA and a current average channel access delay of the STA).

The AC may create, according to an access request message sent by a STA, a record of the corresponding STA in the STA local information table managed by the AC. When a QoS requirement of the STA changes, the AC may update the QoS requirement of the STA in real time according to a QoS requirement update message sent by the STA. When location information of the STA changes, the AC may update the location information of the STA in real time according to a location update message sent by the STA.

In addition, due to mobility of STAs, there is a phenomenon that STAs continuously enter a Wi-Fi network and that STAs exit the Wi-Fi network, and therefore, the STA local information table managed by the AC needs to have a function for aging expired STA records. That is, for any STA in the STA local information table managed by the AC, if the AC does not receive, within a preset time, any message sent by the STA, and does not find a record related to the STA in a received load notification message, the AC deletes a corresponding record of the STA from the managed STA local information table.

Figure 24:
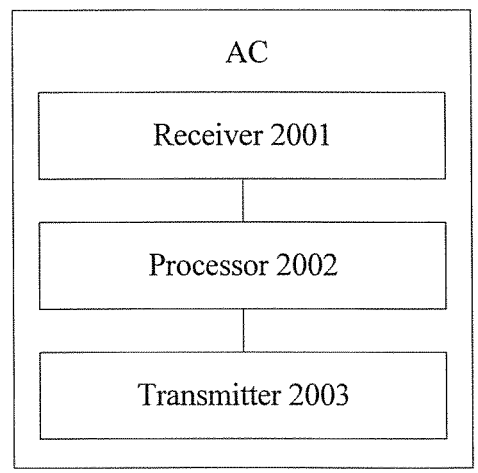
FIG. 24 is a schematic structural diagram of an AC according to another embodiment of the present invention.

Another embodiment of the present invention provides an AC. As shown in FIG. 24, the AC may include a receiver 2001, a processor 2002, and a transmitter 2003.

The receiver 2001 is configured to receive a load notification message sent by an AP, where the load notification message includes information about communication load between the AP and first stations STAs, where the first STAs are STAs currently associated with the AP.

The processor 2002 is configured to allocate at least one target AP to each first STA if the AC determines, according to the information about the communication load, that the AP meets a sleep trigger condition.

The transmitter 2003 is configured to send an offload control message to the AP, where the offload control message includes information about the target AP allocated by the AC to the first STA, and the offload control message is used for the first STA to associate with the target AP according to the information about the target AP; and after a preset time, send a sleep control message to the AP, where the sleep control message is used to cause the AP to enter a sleep state.

Further optionally, the processor 2002 is specifically configured to:

determine that all active APs managed by the AC and having access ranges covering at least one of the first STAs, except the AP, are candidate APs; and if a quantity of the candidate APs is 1, determine that the candidate AP is a target AP for all the first STAs; or if a quantity of the candidate APs is greater than 1, calculate suitability of each candidate AP according to location information of each candidate AP, load information of each candidate AP, and quality of service QoS requirement information of one of the first STAs, and allocate, to a corresponding first STA, a candidate AP with highest suitability as a target AP.

Further optionally, the QoS requirement information of the first STA includes at least one of an average communication rate expected by the first STA or an average access delay expected by the first STA.

The processor 2002 is specifically further configured to select, before calculating the suitability of each candidate AP, a candidate AP that meets at least one of the following conditions:

condition 1: a preset upper threshold for an average throughput of the candidate AP is greater than or equal to a sum of a current average throughput of the candidate AP, a Sum, and an average communication rate expected by the corresponding first STA, where the Sum is a sum of average communication rates expected by all first STAs preassociated with the candidate AP; or condition 2: a current average channel access delay of the candidate AP is shorter than an average channel access delay expected by the first STA.

The AC further screens out, from a range of candidate APs by using the processor 2002 of the AC, a candidate AP that meets at least one of the condition 1 or the condition 2, so that the candidate AP may meet the QoS requirement information of the corresponding first STA.

Further optionally, the suitability of the candidate AP is inversely proportional to a distance between the candidate AP and the corresponding first STA; and the suitability of the candidate AP is inversely proportional to load of the candidate AP. That is, if the distance between the candidate AP and the corresponding first STA is shorter, the suitability of the candidate AP for the corresponding first STA is higher; if the load of the candidate AP is lower, the suitability of the candidate AP for the corresponding first STA is higher.

Further optionally, the sleep trigger condition is that an average throughput of the AP within a preset time is less than a preset lower threshold for the average throughput of the AP.

It should be noted that, the sleep trigger condition is only an example illustrated in this embodiment, and is not limited in this embodiment. Any condition for determining that the AP should sleep may be applied to this embodiment.

After the AC provided by this embodiment of the present invention determines, according to information about communication load in a received load notification message sent by an AP, that the AP meets a sleep trigger condition, the AC first allocates a target AP to each first STA currently associated with the AP, and after each first STA is associated with the target AP, sends a sleep control message to the AP, so as to instruct the AP to enter a sleep state. After determining that the AP meets the sleep trigger condition, the AC first allocates the target AP to each first STA currently associated with the AP, and after each first STA is associated with the target AP, controls the AP to enter the sleep state. This not only solves a resource waste problem when load of the AP is light, but also ensures that a service of each first STA can be continued normally after the AP enters the sleep state.

In addition, when allocating the target AP to each first STA currently associated with the AP, the AC selects, from active APs according to a stored QoS requirement of the first STA, an AP that meets the QoS requirement of the first STA and has highest suitability as a target AP. This further ensures the QoS requirement of each first STA after the AP enters the sleep state.

Figure 25:
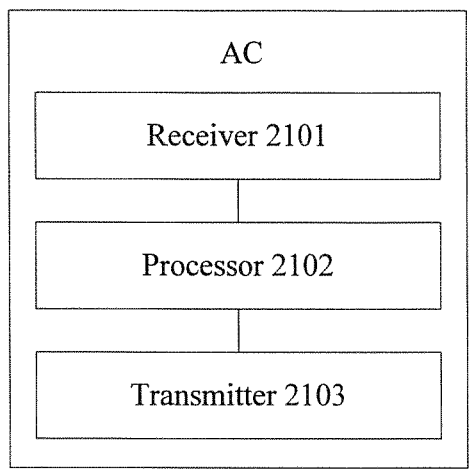
FIG. 25 is a schematic structural diagram of an AC according to another embodiment of the present invention.

Another embodiment of the present invention provides an AC. As shown in FIG. 25, the AC may include a receiver 2101, a processor 2102, and a transmitter 2103.

The receiver 2101 is configured to receive an access request message sent by a station STA, where the request message includes associable APs scanned by the STA.

The processor 2102 is configured to calculate suitability of each associable AP according to location information of each associable AP, load information of each associable AP, and quality of service QoS requirement information of the STA, and allocate, to the STA, an associable AP with highest suitability as a target AP.

The transmitter 2103 is configured to send an access permission message to the STA, where the access permission message includes information about the target AP, and the access permission message is used for the STA to associate with the target AP according to the information about the target AP.

Further optionally, the QoS requirement information of the STA includes at least one of an average communication rate expected by the STA or an average access delay expected by the STA.

The processor 2102 is further configured to select, before calculating the suitability of each associable AP, an associable AP that meets at least one of the following conditions:

condition 1: a preset upper threshold for an average throughput of the associable AP is greater than or equal to a sum of a current average throughput of the associable AP and the average communication rate expected by the STA; or condition 2: a current average channel access delay of the associable AP is shorter than an average channel access delay expected by the STA.

The AC further screens out, from a range of associable APs by using the processor 2102 of the AC, an associable AP that meets at least one of the condition 1 or the condition 2, so that the associable AP may meet the QoS requirement information of the STA.

Further optionally, the access permission message further includes a special value, where the special value indicates that, in a current location of the STA, the STA can associate with the target AP. In the current location of the STA without moving, the STA can directly associate with the target AP after determining that the access permission message includes the special value.

Further optionally, the information about the target AP includes a basic service set identifier BSSID of the target AP, a Media Access Control MAC address of the target AP, and location information of the target AP.

After the AC provided by this embodiment of the present invention receives an access request message sent by a STA, the AC first calculates suitability of each associable AP according to location information of each associable AP, load information of each associable AP, and QoS requirement information of the STA, allocates, to the STA, an associable AP with highest suitability that is obtained through calculation as a target AP, and then sends an access permission message carrying information about the target AP to the STA, so as to instruct the STA to associate with the target AP according to the target AP. Because the target AP allocated by the AC to the STA is obtained through calculation according to the location information of each associable AP, the load information of each associable AP, and the QoS requirement information of the STA, and is the AP with the highest suitability and allocated to the STA, a QoS requirement of the STA may be ensured after the STA accesses the target AP.

Figure 26:
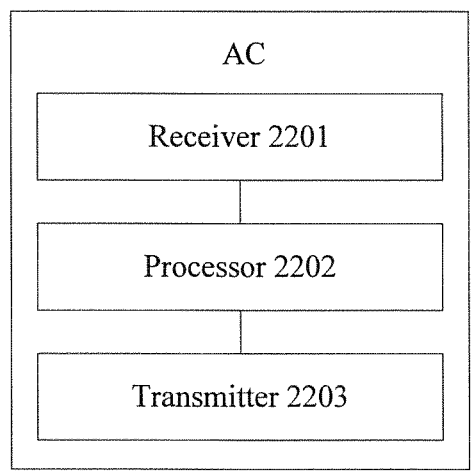
FIG. 26 is a schematic structural diagram of an AC according to another embodiment of the present invention.

Another embodiment of the present invention provides an AC. As shown in FIG. 26, the AC may include a receiver 2201, a processor 2202, and a transmitter 2203.

The receiver 2201 is configured to receive a load notification message sent by an access point AP, where the load notification message includes information about communication load between the AP and first stations STAs, where the first STAs are STAs currently associated with the AP.

The processor 2202 is configured to determine, according to the information about the communication load received by the receiver 2201, that the AP meets an overload trigger condition; and then allocate a first target AP in active APs to the first STAs one by one according to a preset order.

The transmitter 2203 is configured to send an offload control message to the AP, where the offload control message includes information about the first target AP, and the offload control message is used for the AP to notify the corresponding first STA to associate with the first target AP according to the information about the first target AP.

Further optionally, the preset order is a descending order of distances from the first STAs to the AP.

Further optionally, the processor 2202 is further configured to determine, after a first target AP in the active APs is allocated to a current first STA and the transmitter 2203 sends an offload control message to the AP, whether the AP still meets the overload trigger condition.

If yes, the processor 2202 is further configured to continue to allocate a first target AP in the active APs to a next first STA.

If no, the processor 2202 is further configured to stop allocating a first target AP to the first STAs or terminate an overload control method.

The processor 2202 is specifically configured to:

determine candidate APs corresponding to the current first STA, where the candidate APs include all active APs managed by the AC and having access ranges covering the current first STA, except the AP; and allocate, to the current first STA, a candidate AP meeting a preset condition as a first target AP.

Further optionally, the processor 2202 is specifically configured to allocate, to the current first STA, a candidate AP meeting at least one of the following preset conditions as a first target AP:

condition 1: a preset upper threshold for an average throughput of the candidate AP is greater than or equal to a sum of a current average throughput of the candidate AP and an average communication rate expected by the current first STA; or condition 2: a current average channel access delay of the candidate AP is shorter than or equal to an average channel access delay expected by the current first STA.

The AC further screens out, from a range of candidate APs by using the processor 2202 of the AC, a candidate AP that meets at least one of the condition 1 or the condition 2, and uses the candidate AP as a first target AP allocated to the current first STA, so that the first target AP may meet QoS requirement information of the current first STA.

Further optionally, if the processor 2202 does not successfully allocate a first target AP in the active APs to all or a part of the first STAs, and determines that the AP still meets the overload trigger condition, the processor 2202 is further configured to allocate a second target AP in sleeping APs to at least one second STA, where the second STA is a first STA that is not successfully associated with a first target AP; after the second target AP is allocated to the at least one second STA and the transmitter 2203 sends an offload control message to the AP, determine whether the AP still meets the overload trigger condition; and if yes, continue to allocate a second target AP to other second STAs; or if no, stop allocating a second target AP to the second STAs or terminate the overload control method.

Further optionally, the processor 2202 is specifically configured to calculate suitability of each sleeping AP, and allocate, to the at least one second STA, a sleeping AP with highest suitability as a second target AP.

The transmitter 2203 is further configured to send a wake-up control message to the currently allocated second target AP, where the wake-up control message is used to cause the currently allocated second target AP to enter an active state; and send an offload control message to the AP, where the offload control message includes information about the currently allocated second target AP, and the offload control message is used for the AP to notify the at least one second STA to associate with the currently allocated second target AP according to the information about the currently allocated second target AP.

Further optionally, the suitability of the sleeping AP is proportional to offloadable traffic after the sleeping AP enters the active state, and the suitability of the sleeping AP is proportional to integrated communication quality between the sleeping AP and the at least one second STA.

Further optionally, that the suitability of the sleeping AP is proportional to offloadable traffic after the sleeping AP enters the active state, and the suitability of the sleeping AP is proportional to integrated communication quality between the sleeping AP and the at least one second STA includes:

offloadable traffic after an $AP_i$ enters the $$\text{active state} = \sum_{STA \in \{Set\_Pending \cap Set\_Coverage(AP_i)\}}$$

average communication rate expected by the second STA; and integrated communication quality between the $AP_i$ and the second $$STA = \sum_{STA \in \{Set\_Pending \cap Set\_Coverage(AP_i)\}} \frac{1}{Dist(AP_i, STA)^n};$$

where the APi is one of the sleeping APs, the Set_Pending is a set of the second STAs, and the Set_Coverage(APi) is a set of STAs covered by an access range of the APi.

Further optionally, the overload trigger condition is at least one of the following:

condition 1: an average throughput of the AP within a preset time is greater than a preset upper threshold for the average throughput of the AP; or condition 2: an average channel access delay of the AP is greater than a preset delay threshold.

It should be noted that, the overload trigger condition is only an example illustrated in this embodiment, and is not limited in this embodiment. Any condition for determining that the AP is overloaded may be applied to this embodiment.

After the AC provided by this embodiment of the present invention determines, according to information about communication load in a received load notification message sent by an AP, that the AP meets an overload trigger condition, the AC allocates, one by one according to a preset order, a first target AP in active APs to first STAs associated with the AP, and sends an offload control message carrying information about the allocated first target AP to the AP, so that the AP instructs the first STAs to associate with the first target AP, thereby achieving an objective of mitigating overload of the AP. After determining that the AP meets the overload trigger condition, the AC does not share load (the first STAs associated with the AP) of the AP by waking up a sleeping AP having an access range covering the first STAs associated with the AP, but allocates a first target AP in the active APs to the first STAs, and instructs the first STAs to associate with the first target AP, to share the load of the AP. Therefore, resources of an existing Wi-Fi network can be fully used, and the AP exits an overload state. This not only improves utilization of active APs in the Wi-Fi network, but also avoids a power waste problem caused by too light load after a sleeping AP is waked up.

In addition, after a current first STA is associated with a first target AP allocated by the AC to the current first STA, if the AC determines that the AP still meets the overload trigger condition, the AC allocates a first target AP to a next first STA, so that the AP instructs the first STA to associate with the first target AP. If the AC does not successfully allocate a first target AP to all or a part of the first STAs, and the AC determines that the AP still meets the overload trigger condition, the AC needs to wake up a sleeping AP and allocate the sleeping AP as a second target AP to a second STA, so that the second STA is associated with the second target AP, and that the AP exits the overload state. When allocating a target AP to a STA currently associated with the AP, the AC selects, according to a stored QoS requirement of the STA, an AP that meets the QoS requirement of the first STA and has highest suitability as a target AP. This ensures the QoS requirement of the STA associated with the AP.

Figure 27:
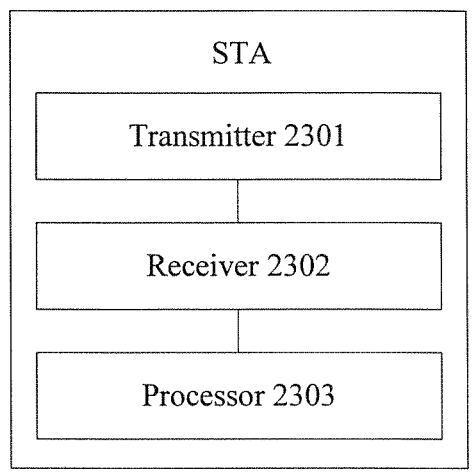
FIG. 27 is a schematic structural diagram of a STA according to another embodiment of the present invention.

Another embodiment of the present invention provides a STA. As shown in FIG. 27, the STA may include a transmitter 2301, a receiver 2302, and a processor 2303.

The transmitter 2301 is configured to send an access request message to an access controller AC.

The receiver 2302 is configured to receive an access permission message sent by the AC, where the access permission message includes information about a target AP, and the target AP is determined by the AC according to location information of the STA stored by the AC or carried in the access request message, from sleeping APs managed by the AC and having access ranges covering the STA, or the target AP is determined by the AC from all or a part of APs managed by the AC, and the part of APs include APs whose distances from the STA are within a preset range.

The processor 2303 is configured to associate with the target AP according to the information about the target AP received by the receiver.

Further optionally, the access request message further includes quality of service QoS requirement information of the STA, where the QoS requirement information of the STA includes an average communication rate expected by the STA.

Further optionally, the access permission message further includes a special value, where the special value indicates that, in a current location of the STA, the STA can associate with the target AP. In the current location of the STA without moving, the STA can directly associate with the target AP after determining that the access permission message includes the special value.

Further optionally, the information about the target AP includes a basic service set identifier BSSID of the target AP, a Media Access Control MAC address of the target AP, and location information of the target AP.

The STA provided by this embodiment of the present invention sends an access request message to an AC, so that after the AC receives the access request message sent by the STA, when no active AP having an access range covering the STA exists, the AC may determine, from sleeping APs having access ranges covering the STA, a target AP allocated to the STA, and then wake up the target AP and send an access permission message carrying information about the target AP to the STA. In this case, the STA can associate with the target AP according to the information about the target AP. When no active AP having an access range covering the STA exists, the AC can allocate, to the STA according to the access request message sent by the STA, a target AP in the sleeping APs having access ranges covering the STA, and wake up the target AP in time, so that the STA can access a network in time. Therefore, a problem that a STA located in a coverage hole area of a Wi-Fi network cannot access the Wi-Fi network is solved.

In addition, the AC may select, from the sleeping APs according to a QoS requirement of the STA included in the access request message sent by the STA, an AP that meets the QoS requirement of the STA as a target AP for the STA. In addition, if the AC does not determine, from the sleeping APs, a target AP allocated to the STA, the AC may select, from all or a part of APs managed by the AC, an AP that meets the QoS requirement of the STA as a target AP for the STA. In this way, a problem that a STA located in a coverage hole area of a Wi-Fi network cannot access the Wi-Fi network is solved, and a QoS requirement is also ensured after the STA accesses the network.

Figure 28:
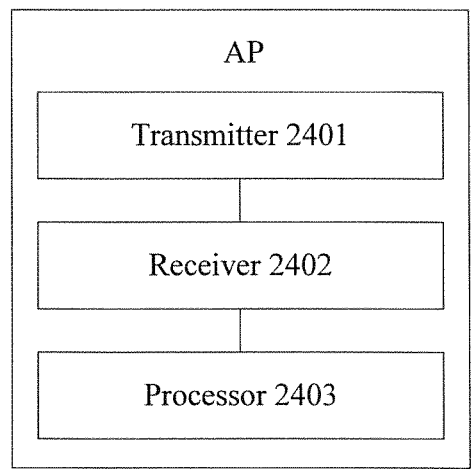
FIG. 28 is a schematic structural diagram of an AP according to another embodiment of the present invention.

Another embodiment of the present invention provides an AP. As shown in FIG. 28, the AP may include a transmitter 2401, a receiver 2402, and a processor 2403.

The transmitter 2401 is configured to send a load notification message to an access controller AC, where the load notification message includes information about communication load between the AP and first stations STAs, where the first STAs are STAs currently associated with the AP.

The receiver 2402 is configured to receive an offload control message sent by the AC, where the offload control message is sent after the AC determines, according to the information about the communication load, that the AP meets a sleep trigger condition, and the offload control message includes information about a target AP allocated by the AC to the first STA.

The transmitter 2401 is further configured to send a reassociation notification message to the first STA, where the reassociation notification message includes the information about the target AP, and the reassociation notification message is used to notify the first STA to associate with the target AP according to the information about the target AP; and send an offload control response message to the AC after a preset time, where the offload control response message includes identity information of a first STA currently associated with the AP.

The receiver 2402 is further configured to receive a sleep control message sent by the AC, where the sleep control message is sent after the AC determines that the offload control response message does not include identity information of any first STA.

The processor 2403 is configured to enter a sleep state.

Further optionally, the sleep trigger condition is that an average throughput of the AP within a preset time is less than a preset lower threshold for the average throughput of the AP.

It should be noted that, the sleep trigger condition is only an example illustrated in this embodiment, and is not limited in this embodiment. Any condition for determining that the AP should sleep may be applied to this embodiment.

The AP provided by this embodiment of the present invention sends a load notification message to an AC, so that after the AC determines, according to information about communication load in the received load notification message sent by the AP, that the AP meets a sleep trigger condition, the AC first allocates a target AP to each first STA currently associated with the AP, and sends a sleep control message to the AP after each first STA is associated with the target AP, so as to instruct the AP to enter a sleep state. After determining that the AP meets the sleep trigger condition, the AC first allocates the target AP to each first STA currently associated with the AP, and after each first STA is associated with the target AP, controls the AP to enter the sleep state. This not only solves a resource waste problem when load of the AP is light, but also ensures that a service of each first STA can be continued normally after the AP enters the sleep state.

In addition, when allocating the target AP to each first STA currently associated with the AP, the AC selects, from active APs according to a stored QoS requirement of the first STA, an AP that meets the QoS requirement of the first STA and has highest suitability as a target AP. This further ensures the QoS requirement of each first STA after the AP enters the sleep state.

Figure 29:
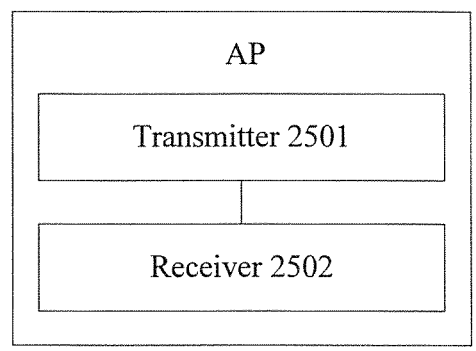
FIG. 29 is a schematic structural diagram of an AP according to another embodiment of the present invention.

Another embodiment of the present invention provides an AP. As shown in FIG. 29, the AP may include a transmitter 2501 and a receiver 2502.

The transmitter 2501 is configured to send a load notification message to an access controller AC, where the load notification message includes information about communication load between the AP and first stations STAs, where the first STAs are STAs currently associated with the AP.

The receiver 2502 is configured to receive an offload control message sent by the AC, where the offload control message is sent after the AC determines, according to the information about the communication load, that the AP meets an overload trigger condition, and the offload control message includes information about a first target AP allocated to the first STA.

The transmitter 2501 is further configured to send a reassociation notification message to the first STA, where the reassociation notification message includes the information about the first target AP allocated to the first STA, and the reassociation notification message is used for the first STA to associate with the first target AP according to the information about the first target AP.

Further optionally, the receiver 2502 is further configured to receive an offload control message sent by the AC, where the offload control message includes information about a currently allocated second target AP, the offload control message is used for the AP to notify at least one second STA to associate with the currently allocated second target AP according to the information about the currently allocated second target AP, the offload control message is sent after the AC does not successfully allocate a first target AP in active APs to all or a part of the first STAs and the AC determines that the AP still meets the overload trigger condition, and the second STA is a first STA that is not successfully associated with a first target AP.

Further optionally, the overload trigger condition is at least one of the following:

condition 1: an average throughput of the AP within a preset time is greater than a preset upper threshold for the average throughput of the AP; or condition 2: an average channel access delay of the AP is greater than a preset delay threshold.

It should be noted that, the overload trigger condition is only an example illustrated in this embodiment, and is not limited in this embodiment. Any condition for determining that the AP is overloaded may be applied to this embodiment.

The AP provided by this embodiment of the present invention sends a load notification message to an AC, so that after the AC determines, according to information about communication load in the received load notification message sent by the AP, that the AP meets an overload trigger condition, the AC allocates, one by one according to a preset order, a first target AP in active APs to first STAs associated with the AP, and sends an offload control message carrying information about the allocated first target AP to the AP, so that the AP instructs the first STAs to associate with the first target AP, thereby achieving an objective of mitigating overload of the AP. After determining that the AP meets the overload trigger condition, the AC does not share load (the first STAs associated with the AP) of the AP by waking up a sleeping AP having an access range covering the first STAs associated with the AP, but allocates a first target AP in the active APs to the first STAs, and instructs the first STAs to associate with the first target AP, to share the load of the AP. Therefore, resources of an existing Wi-Fi network can be fully used, and the AP exits an overload state. This not only improves utilization of active APs in the Wi-Fi network, but also avoids a power waste problem caused by too light load after a sleeping AP is waked up.

In addition, after a current first STA is associated with a first target AP allocated by the AC to the current first STA, if the AC determines that the AP still meets the overload trigger condition, the AC allocates a first target AP to a next first STA, so that the AP instructs the first STA to associate with the first target AP. If the AC does not successfully allocate a first target AP to all or a part of the first STAs, and the AC determines that the AP still meets the overload trigger condition, the AC needs to wake up a sleeping AP and allocate the sleeping AP as a second target AP to a second STA, so that the second STA is associated with the second target AP, and that the AP exits the overload state. When allocating a target AP to a STA currently associated with the AP, the AC selects, according to a stored QoS requirement of the STA, an AP that meets the QoS requirement of the first STA and has highest suitability as a target AP. This ensures the QoS requirement of the STA associated with the AP.

The foregoing descriptions about implementation manners allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above. For a detailed working process of the foregoing apparatus, reference may be made to a corresponding process in the foregoing method embodiments, and details are not described herein.

In the several embodiments provided in the present application, it should be understood that the disclosed apparatus and method may be implemented in other manners. For example, the described apparatus embodiment is merely exemplary. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the four of a software functional unit and sold or used as an independent product, the integrated unit may be stored in a readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of the present invention. The foregoing storage medium includes: any medium that can store program code, such as a USB flash drive, a removable hard disk, a read-only memory (English: Read-Only Memory, ROM for short), a random access memory (English: Random Access Memory, RAM for short), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An access controller (AC), comprising:
a receiver configured to receive an access request message sent by a station (STA);
at least one processor configured to:
determine, according to location information of the STA stored by the at least one processor or carried in the access request message received by the receiver, whether one or more sleeping access points (APs) managed by the at least one processor are one or more first candidate APs based on whether access ranges of each of the one or more sleeping APs cover the STA,
when none of the one or more sleeping APs are the one or more first candidate APs:
determine one or more second candidate APs, wherein the one or more second candidate APs comprise at least one AP that is managed by the at least one processor and has a distance from the STA that is within a preset range;
calculate a suitability of each of the one or more second candidate AP according to location information of each of the one or more second candidate AP, load information of each of the one or more second candidate AP, and quality of service (QoS) requirement information of the STA, and
allocate, to the STA, a second candidate AP of the one or more second candidate APs with a highest suitability as a target AP,
when the one or more first candidate APs include only a single first candidate AP, allocate the single first candidate AP to the STA as an target access point (AP), and
when the one or more first candidate APs include a plurality of first candidate APs, allocate, to the STA, a first candidate AP of the plurality of first candidate APs that is closest to the STA as the target AP; and
a transmitter configured to:
send a wake-up control message to the target AP, wherein the wake-up control message is used to cause the target AP to enter an active state, and
send an access permission message to the STA, wherein the access permission message comprises information about the target AP, and wherein the access permission message is used to associate the STA with the target AP according to the information about the target AP.

2. The AC according to claim 1, wherein:
the access request message further comprises quality of service (QoS) requirement information of the STA, wherein the QoS requirement information of the STA comprises an average communication rate expected by the STA;
when the one or more first candidate APs include only the single first candidate AP, the at least one processor is further configured to select, after determining the one or more sleeping APs as the one or more first candidate APs, the single first candidate AP when a preset upper threshold for an average throughput of the first single candidate AP is greater than or equal to the average communication rate expected by the STA; and
when the one or more first candidate APs include the plurality of first candidate APs, the at least one processor is further configured to select, after determining the one or more sleeping APs as the one or more first candidate APs, the first candidate AP of the plurality of first candidate APs when a preset upper threshold for an average throughput of the first candidate AP of the plurality of first candidate APs is greater than or equal to the average communication rate expected by the STA.

3. The AC according to claim 1, wherein the access permission message further comprises a special value indicating that, in a current location of the STA, the STA can associate with the target AP.

4. The AC according to claim 1, wherein the at least one processor is further configured to select, before calculating the suitability of each of the one or more second candidate APs, the second candidate AP when at least one of:
a preset upper threshold for an average throughput of the second candidate AP is greater than or equal to a sum of a current average throughput of the second candidate AP and an average communication rate expected by the STA; or a current average channel access delay of the second candidate AP is shorter than an average channel access delay expected by the STA.

5. The AC according to claim 1, wherein the information about the target AP comprises at least one of a basic service set identifier (BSSID) of the target AP, a Media Access Control (MAC) address of the target AP, or location information of the target AP.

6. An access controller (AC), comprising:
a receiver configured to receive a load notification message sent by an access point (AP), wherein the load notification message comprises information about communication load between the AP and one or more first stations (STAs) currently associated with the AP;
a transmitter; and
at least one processor configured to:
determine, according to the information about the communication load received by the receiver, that the AP meets an overload trigger condition,
allocate at least one first target AP of one or more first target APs of one or more active APs to at least one initial first STA of the one or more first STAs individually according to a preset sequential order,
determine, after allocating the at least one first target AP of the one or more first target APs of the one or more active APs to the at least one initial first STA of the one or more first STAs and after the transmitter of the AC sends an offload control message to the AP, whether the AP still meets the overload trigger condition,
continue allocating at least one first target AP of the one or more first target APs of the one or more active APs to at least one subsequent first STA of the one or more first STAs when the AP meets the overload trigger condition,
stop allocating the one or more first target APs to the one or more first STAs when the AP does not meet the overload trigger condition,
determine one or more candidate APs corresponding to the at least one initial first STA of the one or more first STAs, wherein the one or more candidate APs comprise all active APs that are managed by the at least one processor and that have access ranges covering the at least one initial first STA, and wherein the access ranges do not cover the AP, and
allocate, to the at least one initial first STA of the one or more first STAs, at least one candidate AP of the one or more candidate APs meeting a preset condition as a first target AP,
wherein the transmitter is configured to send the offload control message to the AP, wherein the offload control message comprises information about the at least one first target AP of the one or more first target APs, and wherein the offload control message is for enabling the AP to notify the at least one initial first STA of the one or more first STAs to associate with the at least one first target AP according to the information about the at least one first target AP.

7. The AC according to claim 6, wherein the preset sequential order is a descending order of distances from each of the one or more first STAs to the AP.

8. The AC according to claim 6, wherein the at least one processor is further configured to allocate, to the at least one initial first STA, the at least one candidate AP meeting at least one of the following preset conditions as the first target AP:
a preset upper threshold for an average throughput of the at least one candidate AP is greater than or equal to a sum of a current average throughput of the at least one candidate AP and an average communication rate expected by the at least one initial first STA; or
a current average channel access delay of the at least one candidate AP is shorter than or equal to an average channel access delay expected by the at least one initial first STA.

9. The AC according to claim 6, wherein the at least one processor is further configured to:
allocate at least one second target AP of one or more sleeping APs to at least one second STA of one or more second STAs when the at least one processor does not successfully allocate the first target AP of the one or more first target APs of the one or more active APs to the at least one initial first STA of the one or more first STAs and the at least one processor determines that the AP still meets the overload trigger condition, wherein each of the at least one second STA is a first STA that is not successfully associated with the first target AP;
determine, after the at least one processor allocates the at least one second target AP to the at least one second STA of the one or more second STAs and the transmitter sends the offload control message to the AP, whether the AP still meets the overload trigger condition;
continue allocating the at least one second target AP to at least one other second STAs of the one or more second STAs when the AP meets the overload trigger condition; and
stop allocating the at least one second target AP to the at least one other second STAs of the one or more second STAs when the AP does not meet the overload trigger condition.

* * * * *